US007197528B2

(12) United States Patent
Arita

(10) Patent No.: US 7,197,528 B2
(45) Date of Patent: Mar. 27, 2007

(54) JACOBIAN GROUP ELEMENT ADDER

(75) Inventor: Seigo Arita, Tokyo (JP)

(73) Assignee: NEC Corporation, Tokyo (JP)

( * ) Notice: Subject to any disclaimer, the term of this patent is extended or adjusted under 35 U.S.C. 154(b) by 691 days.

(21) Appl. No.: 10/643,972

(22) Filed: Aug. 20, 2003

(65) Prior Publication Data

US 2004/0039768 A1 Feb. 26, 2004

(30) Foreign Application Priority Data

Aug. 21, 2002 (JP) ............................. 2002-240034

(51) Int. Cl.
*G06F 7/50* (2006.01)
*G06F 7/00* (2006.01)
*H04L 9/28* (2006.01)
(52) U.S. Cl. ...................................... 708/670; 708/492
(58) Field of Classification Search ................ 708/670, 708/491–492; 380/28, 30
See application file for complete search history.

(56) References Cited

U.S. PATENT DOCUMENTS

| 6,560,336 B1 * | 5/2003 | Arita ............................ 380/28 |
| 6,611,597 B1 * | 8/2003 | Futa et al. ..................... 380/30 |
| 7,003,537 B1 * | 2/2006 | Tamura ........................ 708/492 |
| 7,020,776 B2 * | 3/2006 | Lauter et al. ................ 713/176 |
| 7,023,990 B1 * | 4/2006 | Arita ............................ 380/28 |
| 7,043,015 B2 * | 5/2006 | Lauter et al. .................. 380/28 |

OTHER PUBLICATIONS

S. Arita, "Algorithms for Computations in Jacobian Group of $C_{ab}$ Curve and Their Application to Discrete-Log Based Public Key Cryptosystems", Japanese-version collection of The Institute of Electronics, Information and Communication Engineers, vol. J82-A, No. 8, (1999), pp. 1291-1299.
R. Harasawa et al., "A Fast Jacobian Group Arithmetic Scheme for Algebraic Curve Cryptography", IEICE Trans. Fundamentals, vol. E84-A, No. 1, Jan. 2001, pp. 130-139.

* cited by examiner

*Primary Examiner*—Tan V. Mai
(74) *Attorney, Agent, or Firm*—Sughrue Mion, PLLC

(57) ABSTRACT

An objective is to obtain a Jacobian group element adder that can calculate addition in a Jacobian group of a $C_{ab}$ curve at a high speed, and can enhance practicality of the $C_{ab}$ curve.

An algebraic curve parameter file A 10, and Groebner bases $I_1$ and $I_2$ of ideals of a coordinate ring of an algebraic curve designated by this file A are input into an ideal composition section 11 to perform arithmetic of producing a Groebner basis J of an ideal product of the ideal generated by I1 and ideal generated by I2. In a first ideal reduction section 12, arithmetic is performed of producing a Groebner basis J* of an ideal that is smallest in a monomial order designated by the file A among ideals equivalent to an inverse ideal of an ideal that J in the coordinate ring of the algebraic curve designated by the file A generates. In a second ideal reduction section 13, arithmetic is performed of producing a Groebner basis J** of a ideal that is smallest in the monomial order designated by the file A among ideals equivalent to an inverse ideal of an ideal that this J* generates to output it.

6 Claims, 8 Drawing Sheets

| ORDER OF FIELD OF DEFINITION | 1009 |
|---|---|
| MONOMIAL ORDER | 1, X, Y, $X^2$, XY, $Y^2$, $X^3$, $X^2Y$, $XY^2$, $X^4$, $Y^3$ |
| COEFFICIENT LIST | 0,7,0,0,0,0,0,0,0,1,1 |

FIG. 5

| RECORD NUMBER | IDEAL TYPE NUMBER | IDEAL TYPE | ORDER | REDUCTION ORDER |
|---|---|---|---|---|
| 1 | 61 | $\{X^3+a_6Y^2+a_5XY+a_4X^2+a_3Y+a_2X+a_1,$ $X^2Y+b_6Y^2+b_5XY+b_4X^2+b_3Y+b_2X+b_1,$ $XY^2+c_6Y^2+c_5XY+c_4X^2+c_3Y+c_2X+c_1\}$ | 6 | 3 |
| 2 | 62 | $\{Y^2+a_5XY+a_4X^2+a_3Y+a_2X+a_1,$ $X^3+b_5XY+b_4X^2+b_3Y+b_2X+b_1\}$ | 6 | 2 |
| 3 | 63 | $\{Y^2+a_5XY+a_4X^2+a_3Y+a_2X+a_1,$ $X^2Y+b_6X^3+b_5XY+b_4X^2+b_3Y+b_2X+b_1\}$ | 6 | 2 |
| 4 | 64 | $\{XY+a_4X^2+a_3Y+a_2X+a_1,$ $X^4+b_6X^3+b_5Y^2+b_4X^2+b_3Y+b_2X+b_1\}$ | 6 | 1 |
| 5 | 65 | $\{X^2+a_3Y+a_2X+a_1\}$ | 6 | 0 |
| 6 | 51 | $\{Y^2+a_5XY+a_4X^2+a_3Y+a_2X+a_1,$ $X^3+b_5XY+b_4X^2+b_3Y+b_2X+b_1,$ $X^2Y+c_5XY+c_4X^2+c_3Y+c_2X+c_1\}$ | 5 | 3 |
| 7 | 52 | $\{XY+a_4X^2+a_3Y+a_2X+a_1,$ $Y^2+b_4X^2+b_3Y+b_2X+b_1\}$ | 5 | 2 |
| 8 | 53 | $\{XY+a_4X^2+a_3Y+a_2X+a_1,$ $X^3+b_5Y^2+b_4X^2+b_3Y+b_2X+b_1\}$ | 5 | 2 |
| 9 | 54 | $\{X^2+a_3Y+a_2X+a_1,$ $XY^2+b_5Y^2+b_4XY+b_3Y+b_2X+b_1\}$ | 5 | 1 |
| 10 | 41 | $\{XY+a_4X^2+a_3Y+a_2X+a_1,$ $Y^2+b_4X^2+b_3Y+b_2X+b_1,$ $X^3+c_4X^2+c_3Y+c_2X+c_1\}$ | 4 | 3 |
| 11 | 42 | $\{X^2+a_3Y+a_2X+a_1,$ $XY+b_3Y+b_2X+b_1\}$ | 4 | 2 |
| 12 | 43 | $\{X^2+a_3Y+a_2X+a_1,$ $Y^2+b_4XY+b_3Y+b_2X+b_1\}$ | 4 | 2 |
| 13 | 44 | $\{Y+a_2X+a_1\}$ | 4 | 0 |
| 14 | 31 | $\{X^2+a_3Y+a_2X+a_1,$ $XY+b_3Y+b_2X+b_1,$ $Y^2+c_3Y+c_2X+c_1\}$ | 3 | 3 |
| 15 | 32 | $\{Y+a_2X+a_1, X^3+b_3X^2+b_2X+b_1\}$ | 3 | 1 |
| 16 | 33 | $\{X+a_1\}$ | 3 | 0 |
| 17 | 21 | $\{Y+a_2X+a_1, X^2+b_2X+b_1\}$ | 2 | 2 |
| 18 | 22 | $\{Y+a_1, Y^2+b_2Y+b_1\}$ | 2 | 1 |
| 19 | 11 | $\{X+a_1, Y+b_1\}$ | 1 | 2 |

FIG. 6

| RECORD NUMBER | ORDER | MONOMIAL LIST |
|---|---|---|
| 1 | 6 | 1, X, Y, $X^2$, XY, $Y^2$, $X^3$, $X^2Y$, $XY^2$, $X^4$ |
| 2 | 5 | 1, X, Y, $X^2$, XY, $Y^2$, $X^3$, $X^2Y$, $XY^2$ |
| 3 | 4 | 1, X, Y, $X^2$, XY, $Y^2$, $X^3$ |
| 4 | 3 | 1, X, Y, $X^2$, XY, $Y^2$, $X^3$ |
| 5 | 2 | 1, X, Y, $X^2$, XY, $Y^2$ |
| 6 | 1 | 1, X, Y |

FIG. 7

| RECORD NUMBER | ORDER | COMPONENT NUMBER LIST | FIRST VECTOR TYPE | SECOND VECTOR TYPE | THIRD VECTOR TYPE |
|---|---|---|---|---|---|
| 1 | 6 | 7,8,9,10 | (*,*,*,*,*,1,0,0,0) | (*,*,*,*,*,0,1,0,0) | (*,*,*,*,*,0,0,1,0) |
| 2 | 6 | 6,7,9,10 | (*,*,*,*,*,1,0,0,0,0) | (*,*,*,*,*,0,1,0,0,0) | null |
| 3 | 6 | 6,8,9,10 | (*,*,*,*,*,1,0,0,0,0) | (*,*,*,*,*,0,*,1,0,0) | null |
| 4 | 6 | 5,8,9,10 | (*,*,*,*,1,0,0,0,0,0) | (*,*,*,*,0,*,*,0,0,1) | null |
| 5 | 6 | 4,7,8,10 | (*,*,*,1,0,0,0,0,0,0) | null | null |
| 6 | 5 | 6,7,8,9 | (*,*,*,*,*,1,0,0,0) | (*,*,*,*,*,0,1,0,0) | (*,*,*,*,*,0,0,1,0) |
| 7 | 5 | 5,6,8,9 | (*,*,*,*,1,0,0,0,0) | (*,*,*,*,0,1,0,0,0) | null |
| 8 | 5 | 5,7,8,9 | (*,*,*,*,1,0,0,0,0) | (*,*,*,*,0,*,1,0,0) | null |
| 9 | 5 | 4,7,8,9 | (*,*,*,1,0,0,0,0,0) | (*,*,*,0,*,*,0,0,1) | null |
| 10 | 4 | 5,6,7 | (*,*,*,*,1,0,0) | (*,*,*,*,0,1,0) | (*,*,*,*,0,0,1) |
| 11 | 4 | 4,5,7 | (*,*,*,1,0,0,0) | (*,*,*,0,1,0,0) | null |
| 12 | 4 | 4,6,7 | (*,*,*,1,0,0,0) | (*,*,*,0,*,1,0) | null |
| 13 | 4 | 3,5,6 | (*,*,1,0,0,0,0) | null | null |
| 14 | 3 | 4,5,6,7 | (*,*,*,1,0,0,0) | (*,*,*,0,1,0,0) | (*,*,*,0,0,1,0) |
| 15 | 3 | 3,5,6,7 | (*,*,1,0,0,0,0) | (*,*,0,*,0,0,1) | null |
| 16 | 3 | 2,4,5,7 | (*,1,0,0,0,0,0) | null | null |
| 17 | 2 | 3,4,5,6 | (*,*,1,0,0,0) | (*,*,0,1,0,0) | null |
| 18 | 2 | 2,4,5,6 | (*,1,0,0,0,0) | (*,0,*,0,0,1) | null |
| 19 | 1 | 2,3 | (*,1,0) | (*,0,1) | null |

FIG. 8

| ORDER OF FIELD OF DEFINITION | 1009 |
|---|---|
| MONOMIAL ORDER | 1, X, $X^2$, $X^3$, Y, $X^4$, XY, $X^5$, $X^2Y$, $X^6$, $X^3Y$, $X^7$, $Y^2$ |
| COEFFICIENT LIST | 0,7,0,0,0,0,0,0,0,0,0,1,1 |

FIG. 9

| RECORD NUMBER | IDEAL TYPE NUMBER | IDEAL TYPE | ORDER | REDUCTION ORDER |
|---|---|---|---|---|
| 1 | 61 | $\{XY+a_6X^4+a_5Y+a_4X^3+a_3X^2+a_2X+a_1,$ $X^5+b_6X^4+b_5Y+b_4X^3+b_3X^2+b_2X+b_1\}$ | 6 | 3 |
| 2 | 62 | $\{X^4+a_5Y+a_4X^3+a_3X^2+a_2X+a_1,$ $X^2Y+b_6XY+b_5Y+b_4X^3+b_3X^2+b_2X+b_1\}$ | 6 | 2 |
| 3 | 63 | $\{Y+a_4X^3+a_3X^2+a_2X+a_1,$ $X^6+b_6X^5+b_5X^4+b_4X^3+b_3X^2+b_2X+b_1\}$ | 6 | 1 |
| 4 | 64 | $\{X^3+a_3X^2+a_2X+a_1\}$ | 6 | 0 |
| 5 | 51 | $\{X^4+a_5Y+a_4X^3+a_3X^2+a_2X+a_1,$ $XY+b_5Y+b_4X^3+b_3X^2+b_2X+b_1\}$ | 5 | 3 |
| 6 | 52 | $\{Y+a_4X^3+a_3X^2+a_2X+a_1,$ $X^5+b_5X^4+b_4X^3+b_3X^2+b_2X+b_1\}$ | 5 | 2 |
| 7 | 53 | $\{X^3+a_3X^2+a_2X+a_1,$ $X^2Y+b_5XY+b_4Y+b_3X^2+b_2X+b_1\}$ | 5 | 1 |
| 8 | 41 | $\{Y+a_4X^3+a_3X^2+a_2X+a_1,$ $X^4+b_4X^3+b_3X^2+b_2X+b_1\}$ | 4 | 3 |
| 9 | 42 | $\{X^3+a_3X^2+a_2X+a_1,$ $XY+b_4Y+b_3X^2+b_2X+b_1\}$ | 4 | 2 |
| 10 | 43 | $\{X^2+a_2X+a_1\}$ | 4 | 0 |
| 11 | 31 | $\{X^3+a_3X^2+a_2X+a_1,$ $Y+b_3X^2+b_2X+b_1\}$ | 3 | 3 |
| 12 | 32 | $\{X^2+a_2X+a_1,$ $XY+b_3Y+b_2X+b_1\}$ | 3 | 1 |
| 13 | 21 | $\{X^2+a_2X+a_1, Y+b_2X+b_1\}$ | 2 | 2 |
| 14 | 22 | $\{X+a_1\}$ | 2 | 0 |
| 15 | 11 | $\{X+a_1, Y+b_1\}$ | 1 | 1 |

FIG. 10

| RECORD NUMBER | ORDER | MONOMIAL LIST |
|---|---|---|
| 1 | 6 | 1, X, $X^2$, $X^3$, Y, $X^4$, XY, $X^5$, $X^2Y$, $X^6$ |
| 2 | 5 | 1, X, $X^2$, $X^3$, Y, $X^4$, XY, $X^5$, $X^2Y$ |
| 3 | 4 | 1, X, $X^2$, $X^3$, Y, $X^4$, XY |
| 4 | 3 | 1, X, $X^2$, $X^3$, Y, $X^4$, XY |
| 5 | 2 | 1, X, $X^2$, $X^3$, Y |
| 6 | 1 | 1, X, $X^2$, $X^3$, Y |

FIG. 11

| RECORD NUMBER | ORDER | COMPONENT NUMBER LIST | FIRST VECTOR TYPE | SECOND VECTOR TYPE | THIRD VECTOR TYPE |
|---|---|---|---|---|---|
| 1 | 6 | 7,8,9,10 | (*,*,*,*,*,1,0,0,0) | (*,*,*,*,*,0,1,0,0) | null |
| 2 | 6 | 6,8,9,10 | (*,*,*,*,1,0,0,0,0) | (*,*,*,*,0,*,0,1,0) | null |
| 3 | 6 | 5,7,9,10 | (*,*,*,*,1,0,0,0,0) | (*,*,*,*,0,*,0,*,0,1) | null |
| 4 | 6 | 4,6,8,10 | (*,*,*,1,0,0,0,0,0) | null | null |
| 5 | 5 | 6,7,8,9 | (*,*,*,*,*,1,0,0,0) | (*,*,*,*,*,0,1,0,0) | null |
| 6 | 5 | 5,7,8,9 | (*,*,*,*,1,0,0,0,0) | (*,*,*,*,0,*,0,1,0) | null |
| 7 | 5 | 4,6,8,9 | (*,*,*,1,0,0,0,0,0) | (*,*,*,0,*,0,*,0,1) | null |
| 8 | 4 | 5,6,7 | (*,*,*,*,1,0,0) | (*,*,*,*,0,1,0) | null |
| 9 | 4 | 4,6,7 | (*,*,*,1,0,0,0) | (*,*,*,0,*,1,0) | null |
| 10 | 4 | 3,4,6 | (*,*,1,0,0,0,0) | null | null |
| 11 | 3 | 4,5,6,7 | (*,*,*,1,0,0,0) | (*,*,*,0,1,0,0) | null |
| 12 | 3 | 3,4,6,7 | (*,*,1,0,0,0,0) | (*,*,0,0,*,0,1) | null |
| 13 | 2 | 3,4,5 | (*,*,1,0,0) | (*,*,0,0,1) | null |
| 14 | 2 | 2,3,4 | (*,1,0,0,0) | null | null |
| 15 | 1 | 2,3,4,5 | (*,1,0,0,0) | (*,0,0,0,1) | null |

FIG. 12

| ORDER OF FIELD OF DEFINITION | 1009 |
|---|---|
| MONOMIAL ORDER | 1, X, $X^2$, Y, $X^3$, XY, $X^4$, $X^2$Y, $X^5$, $Y^2$ |
| COEFFICIENT LIST | 0,7,0,0,0,0,0,0,1,1 |

FIG. 13

| RECORD NUMBER | IDEAL TYPE NUMBER | IDEAL TYPE | ORDER | REDUCTION ORDER |
|---|---|---|---|---|
| 1 | 41 | {$X^3+a_4Y+a_3X^2+a_2X+a_1$, $XY+b_4Y+b_3X^2+b_2X+b_1$} | 4 | 2 |
| 2 | 42 | {$Y+a_3X^2+a_2X+a_1$, $X^4+b_4X^3+b_3X^2+b_2X+b_1$} | 4 | 1 |
| 3 | 43 | {$X^2+a_2X+a_1$} | 4 | 0 |
| 4 | 31 | {$Y+a_3X^2+a_2X+a_1$, $X^3+b_3X^2+b_2X+b_1$} | 3 | 2 |
| 5 | 32 | {$X^2+a_2X+a_1$, $XY+b_3Y+b_2X+b_1$} | 3 | 1 |
| 6 | 21 | {$X^2+a_2X+a_1$, $Y+b_2X+b_1$} | 2 | 2 |
| 7 | 22 | {$X+a_1$} | 2 | 0 |
| 8 | 11 | {$X+a_1$, $Y+b_1$} | 1 | 1 |

FIG. 14

| RECORD NUMBER | ORDER | MONOMIAL LIST |
|---|---|---|
| 1 | 4 | 1, X, $X^2$, Y, $X^3$, XY, $X^4$ |
| 2 | 3 | 1, X, $X^2$, Y, $X^3$, XY |
| 3 | 2 | 1, X, $X^2$, Y |
| 4 | 1 | 1, X, $X^2$, Y |

FIG. 15

| RECORD NUMBER | ORDER | COMPONENT NUMBER LIST | FIRST VECTOR TYPE | SECOND VECTOR TYPE | THIRD VECTOR TYPE |
|---|---|---|---|---|---|
| 1 | 4 | 5,6,7 | (*,*,*,*,1,0,0) | (*,*,*,*,0,1,0) | null |
| 2 | 4 | 4,6,7 | (*,*,*,1,0,0,0) | (*,*,*,0,*,0,1) | null |
| 3 | 4 | 3,5,7 | (*,*,1,0,0,0,0) | null | null |
| 4 | 3 | 4,5,6 | (*,*,*,1,0,0) | (*,*,*,0,1,0) | null |
| 5 | 3 | 3,5,6 | (*,*,1,0,0,0) | (*,*,0,*,0,1) | null |
| 6 | 2 | 3,4 | (*,*,1,0) | (*,*,0,1) | null |
| 7 | 2 | 2,3 | (*,1,0,0) | null | null |
| 8 | 1 | 2,3,4 | (*,1,0,0) | (*,0,0,1) | null |

FIG. 16

| | ADDITION | ARITHMETIC OF TWO-TIMES MULTIPLE |
|---|---|---|
| COMPOSITION OPERATION | 134M+3I | 214M+3I |
| CONTRACTION OPERATION FOR IDEAL OF TYPE 61 | 54M+I | 54M+I |
| CONTRACTION OPERATION FOR IDEAL OF TYPE 31 | 16M+I | 16M+I |
| TOTAL | 204M+5I | 284M+5I |

JACOBIAN GROUP ELEMENT ADDER

BACKGROUND OF THE INVENTION

The present invention relates to a Jacobian group element adder, and more particularly technology for discrete logarithmic cryptography employing a Jacobian group of an algebraic curve (hereinafter, referred to as algebraic curve cryptography) that is a kind of the discrete logarithmic cryptography, which is cryptography technology as information security technology.

It is an elliptic curve cryptography that has come in practice most exceedingly among the algebraic curve cryptography. However, an elliptic curve for use in the elliptic curve cryptography is a very special one as compared with a general algebraic curve. There is the apprehension that an aggressive method of exploiting its specialty would be discovered in the near future. For this, so as to secure safety more reliably, a general algebraic curve of which specialty is lower is desirably employed. $C_{ab}$ curve cryptography is known as an algebraic curve cryptography capable of employing a more general algebraic curve as mentioned above.

The $C_{ab}$ curve cryptography, however, is less employed in the industrial field as compared with the elliptic curve cryptography. Its main reason is that the conventional additive algorithm in the Jacobian group of the conventional $C_{ab}$ curve is tens of times slower than additive algorithm in the Jacobian group of the elliptic curve, and as a result, process efficiency of encryption/decryption in the $C_{ab}$ curve cryptography is remarkably inferior as compared with the elliptic curve cryptography, which was shown in "Jacobian Group Additive algorithm of $C_{ab}$ Curve and its Application to Discrete Logarithmic Cryptography" by Seigo Arita, Japanese-version collection of The Institute of Electronics, Information and Communication Engineers, Vol. J82-A, No.8, pp.1291–1299, 1999.

Also, another additive algorithm in the Jacobian group of the $C_{ab}$ curve was proposed in "A Fast Jacobian Group Arithmetic Scheme for Algebraic Curve Cryptography" by Ryuichi Harasawa, and Joe Suzuki, Vol. E84-A No.1, pp.130–139, 2001 as well; however, even though an asymptotic calculation quantity of algorithm was given, no execution speed data in a packaging experiment was shown, and, also, no report on the packaging experiment by a third party was provided, and the extent to which the execution speed can practically be achieved is uncertain.

As seen from the foregoing, non-efficiency of the additive algorithm in the Jacobian group of the $C_{ab}$ curve prevents the cryptography of the above curve from coming in practice, which gives rise to the necessity of executing addition in the Jacobian group of the $C_{ab}$ curve at a high speed.

DISCLOSURE OF THE INVENTION

The present invention has been accomplished in consideration of such problems, and an objective thereof is to provide a Jacobian group element adder that enables the additive algorithm in the Jacobian group of the $c_{ab}$ curve to be executed at a high speed.

The Jacobian group element adder in accordance with the present invention, which is an arithmetic unit for executing addition in a Jacobian group of an algebraic curve defined by a polynomial defined over a finite field that is $Y^3 + \alpha_0 X^4 + \alpha_1 XY^2 + \alpha_2 X^2 Y + \alpha_3 X^3 + \alpha_4 Y^2 + \alpha_5 XY + \alpha_6 X^2 + \alpha_7 Y + \alpha_8 X + \alpha_9$ or $Y^2 + \alpha_0 X^5 + \alpha_1 X^2 Y + \alpha_2 X^4 + \alpha_3 XY + \alpha_4 X^3 + \alpha_5 Y + \alpha_6 X^2 + \alpha_7 X + \alpha_8$ or $Y^2 + \alpha_0 X^7 + \alpha_1 X^3 Y + \alpha_2 X^6 + \alpha_3 X^2 Y + \alpha_4 X^5 + \alpha_5 XY + \alpha_6 X^4 + \alpha_7 Y + \alpha_8 X^3 + \alpha_9 X^2 + \alpha_{10} X + \alpha_{11}$, is characterized in comprising:

means for inputting an algebraic curve parameter file having an order of a field of definition, a monomial order, and a coefficient list described as a parameter representing said algebraic curve;

means for inputting Groebner bases $I_1$ and $I_2$ of ideals of the coordinate ring of the algebraic curve designated by said algebraic curve parameter file, which represent elements of said Jacobian group;

ideal composition means for, in the coordinate ring of the algebraic curve designated by said algebraic curve parameter file, performing arithmetic of a producing Groebner basis J of the ideal which is a product of the ideal that the Groebner basis $I_1$ generates, and the ideal that the Groebner basis $I_2$ generates;

first ideal reduction means for, in the coordinate ring of the algebraic curve designated by said algebraic curve parameter file, performing arithmetic of producing a Groebner basis J* of the ideal, which is smallest in the monomial order designated by said algebraic curve parameter file among the ideals equivalent to an inverse ideal of the ideal that the Groebner basis J generates; and second ideal reduction means for, in the coordinate ring of the algebraic curve designated by said algebraic curve parameter file, performing arithmetic of producing a Groebner basis J** of the ideal, which is smallest in the monomial order designated by said algebraic curve parameter file among the ideals equivalent to an inverse ideal of the ideal that the Groebner basis J* generates to output it.

[$C_{ab}$ Curve and its Jacobian Group]

The $C_{ab}$ curve C to be treated in the present invention is a nonsingular plane curve to be defined by a polynomial $F(X,Y)$ having the following formula for two natural numbers a and b that are relatively prime.

$F(X,Y) = Y^a + c_0 X^b + \Sigma c_{i,j} X^i Y^j$

Here, indexes i and j in the above equation, which are natural numbers equal to or more than zero, vary in a range of ai+bj<ab. Also, suppose that $c_0$ and $c_{i,j}$ are elements of a defining field k, and that $c_0$ is not zero. The $C_{ab}$ curve C has a unique point at infinity $P_\infty$, and the polynomials Y and X have a unique b-order pole and a-order pole at $P_\infty$ respectively. Set a group subtended by divisors of degree 0 on the $C_{ab}$ curve C to $D_c^0(k)$, and set a group composed of principal divisors to $P_c(k)$.

A Jacobian group $J_c(k)$ of which the additive algorithm is required to be found in the present invention is defined as $J_c(k) = D_c^0(k)/P_c(k)$ On the other hand, let $R = k[X,Y]/F$ be the coordinate ring of the $C_{ab}$ curve C, it follows that the ring R becomes an integrally-closed integral domain, which is a Dedekind domain, because the $C_{ab}$ curve C is nonsingular by definition. Thus, all of the fractional ideals of the ring R that is not zero compose a group $I_R(k)$. Set a subgroup by subtended by the principal ideal of the ring R to $P_R(k)$, then an ideals class group $H_R(k)$ of the ring R is defined as $H_R(k) = I_R(k)/P_R(k)$ As a rule, it is known that, for the nonsingular algebraic curve, the divisor on the curve can be identified with the ideal of the coordinate ring, and that its Jacobian group and the ideal class group are of intrinsic isomorphism. In particular, a Jacobian group $J_C(k)$ of the $C_{ab}$ curve C and the ideal class group $H_R(k)$ of the coordinate ring R are of intrinsic isomorphism. The ideal is more convenient than the divisor for packaging algorithm, whereby, hereinafter, the Jacobian group $J_C(k)$ of the $C_{ab}$ curve C is treated as the ideal class group $H_R(k)$ of the coordinate ring R.

[Preparation Relating to a Groebner Basis]

Since the Groebner basis of the ideal is employed in calculation of which an object is the ideal class group $H_R(k)$, a preparation relating hereto is made in this chapter. As a rule, for a polynomial ring $S=k[X_1, \ldots, X_n]$, an order '<' among its monomials, if it is compatible with a product, that is, $M_1 < M_2$ always yields M1M3, is called a monomial order. In this chapter, from now on, suppose an arbitrary monomial order '<' is given to a polynomial ring S.

For a polynomial f in S, call the largest monomial in the monomial order '<' that appears in f a leading monomial of f, which is denoted by LM(f). Also, for an ideal I, LM(I) denotes an ideal that is generated by leading monomials of the polynomial belonging to I generates by LM(I).

For an ideal $I=(f_1, \ldots, f_s)$ of S that is generated by a polynomials $f_1, \ldots, f_s$, when $\{f_1, \ldots, f_s\}$ meets $IM(I)=(LM(f_1), \ldots, LM(f_s))$, $\{f_1, \ldots, f_s\}$ is called a Groebner basis of the ideal I. For the ideal I of the polynomial ring S, the entirety $\Delta(I)$ of the monomial (or its multi degree) $\Delta(I)$ that does not belong to LM(I) is called a delta set of I. When (multi degrees of) monomials in $\Delta(I)$ are plotted, a convex set appears, and a lattice point encircling its convex set corresponds to the leading monomial of an element of the Groebner basis of I. Also, $\Delta(I)$ subtends the basis of a vector space S/I over k.

The ideal I of an the coordinate ring $R=S/F$ of a nonsingular affine algebraic curve C can be identified with the ideal of the polynomial ring S that includes a defining ideal F of the curve C. Thus, for the ideal of the coordinate ring R as well, as mentioned above, Groebner basis can be considered. For a zero-dimensional ideal I (that is, a set of zeros of I is a finite set) of the coordinate ring $R=S/F$, call a dimension of a vector space S/I over k an order of the ideal I, which is denoted by $\delta(I)$. Immediately from definition, it can be seen that $\delta(I)$ is equivalent to the order of the set $\Delta(I)$. Also, by assumption of being nonsingular, it follows that $\delta(IJ)=\delta(I)\delta(J)$. When $I=(f)$ is a principal ideal of R, then $\delta(I)=-v_{P\infty}(f)$, where $v_{P\infty}(f)$ represents a valuation of the polynomial f at $P_\infty$.

[Additive Algorithm on Jacobian Group of $C_{ab}$ Curve, Part 1]

Now think about the coordinate ring $R=k[X,Y]/F$ of the $C_{ab}$ curve C defined by the polynomial $F(X,Y)$. Regard the monomial of two variables $X^m Y^n$ as a function on the curve C, and call the monomial order obtained by ordering the monomials based on the size of a pole order-$v_{P\infty}(X^m Y^n)$ at $P_\infty$ a $C_{ab}$ order. Here, in the case that the pole orders at $P_\infty$ thereof are the same, the monomial with the larger is supposed to be larger. Hereinafter, the $C_{ab}$ order is employed as the monomial order of the coordinate ring R of the $C_{ab}$ curve C. For the ideal I of the coordinate ring R, let $f_I$ be the non-zero polynomial with the smallest leading monomial among the polynomials in I. Furthermore, let $I^*= (f_I):I(=\{g\in R|g\cdot I\subseteq (f_I)\})$.

Now, it can be easily shown that, when I and J are arbitrary (integral) ideals of the coordinate ring R, then (1) I and I are linearly equivalent, (2) I, which is an (integral) ideal equivalent to I, has the smallest order among ideals equivalent to I, and (3) if I and J are equivalent, then I*=J*, in particular, J=(I). For an ideal I of the coordinate ring R, when I=(I), we call I a reduced ideal. From the above-mentioned equations (1) and (3), an arbitrary ideal is equivalent to the unique reduced ideal. That is, the reduced ideals compose a representative system of the ideal classes. This property is not limited to the $C_{ab}$ order, and holds also in the event of having employed an arbitrary monomial order; however, in the event of having employed the $C_{ab}$ order, from the above-mentioned equation (2), the reduced ideal has the property of becoming an ideal of which the order is the smallest among the equivalent ideals. This is advantageous in packaging the algorithm. Using reduced ideal as a representative system of the ideal classes, we obtain additive algorithm on Jacobian of $C_{ab}$ curve, mentioned below.

[Additive Algorithm on Jacobian Group 1]

Inputs: reduced ideals $I_1$ and $I_2$ of the coordinate ring R

Output: a reduced ideal $I_3$ equivalent to an ideal product $I_1 \cdot I_2$

1. $J \leftarrow I_1 \cdot I_2$
2. $J^* \leftarrow (f_J):J$
3. $I_3 \leftarrow (f_{J^*}):J^*$

[Classification of Ideals]

So as to realize the above-mentioned additive algorithm on Jacobian group 1 as a program that is efficient, and yet is easy to package, the ideals that appear during execution of the additive algorithm 1 are classified. Hereinafter, for simplification, explanation is made with a $C_{34}$ curve (that is, the $C_{ab}$ curve with a=3, and b=4) taken as an object; however, for the general $C_{ab}$ curve as well, the matter is similar. A genus of the $C_{34}$ curve is 3, whereby the order of the ideal that appears during execution of the additive algorithm 1 is equal to or less than 6. The Groebner bases in their $C_{34}$ orders are classified as follows order by order. However, from now on, even though a defining equation F of the $C_{34}$ curve C appears in the Groebner basis of the ideal, F is omitted, and is not expressed. Also, coefficients $a_i$, $b_j$, and $c_k$ of each polynomial constructing the Groebner basis are all elements of k.

(Ideal of Order 6)

Suppose I is an ideal of order 6 of the coordinate ring R. By definition of the order, V=R/I is a six-dimensional vector space over the defining field k. When six points that the ideal I represents are at a "generalized" position, six monomials from the beginning in the $C_{34}$ order 1, X, Y, $X^2$, XY, and $Y^2$ are linearly independent at these six points. That is, the monomials 1, X, Y, $X^2$, XY, and $Y^2$ compose a basis of the vector space V. At this time, we call such an ideal I an ideal of a type 61.

As a rule, a delta set $\Delta(I)$ of the ideal I can be identified with the basis of the vector space V, whereby the delta set of the ideal I of a type 61 becomes $\Delta(I)=\{(0,0),(1,0),(0,1),(2,0),(1,1),(0,2)\}$ The lattice points encircling these are (0,3), (1,2),(2,1),(3,0)}. Thus, the Groebner basis of the ideal I of a type 61 takes the following form.

The Groebner basis of the ideal of a type 61=$\{X^3+a_6Y^2+a_5XY+a_4X^2+a_3Y+a_2X+a_1, X^2Y+b_6Y^2+b_5XY+b_4X^2+b_3Y+b_2X+b_1, XY^2+c_6Y^2+c_5XY+c_4X^2+c_3Y+c_2X+c_1\}$ These three polynomials correspond to the lattice points (3,0), (2,1), and (1,2) respectively (The lattice point (0,3) corresponds to the defining equation F). As a rule, six monomials 1, X, Y, $X^2$, XY, and $Y^2$ are not always linearly independent at the six points that the ideal I represents, i.e. in the vector space V.

So, next, we study the case in which five monomials from the beginning in the $C_{34}$ order 1, X, Y, $X^2$, and XY are linearly independent in V, and the sixth monomial $Y^2$ is represented by a linear combination of them. By assumption, $\Delta(I)$ is a convex set of order 6 that includes $\{(0,0),(1,0),(0,1),(2,0),(1,1)\}$, and does not include (2,0). Thus, it becomes either of $\Delta(I)=\{(0,0),(1,0),(0,1),(2,0),(1,1),(2,1)\}$, or $\Delta(I)=\{(0,0),(1,0),(0,1),(2,0),(1,1),(3,0)\}$. When $\Delta(I)$ is the former, call I an ideal of a type 62, and in the event that it is the latter, call I an ideal of type 63.

The lattice point set encircling $\Delta(I)$ is $\{(0,2),(3,0)\}$ when I is of type 62, and is $(0,2),(2,1),(4,0)\}$ when I is of type 63. Thus, the Groebner basis becomes the following. The Groebner basis of the ideal of a type 62=$\{Y^2+a_5XY+a_4X^2+a_3Y+a_2X+a_1, X^3+b_5XY+b_4X^2+b_3Y+b_2X+b_1\}$ These two polynomials correspond to the lattice points (0,2), and (3,0) respectively.

The Groebner basis of the ideal of a type 63=$\{Y^2+a_5XY+a_4X^2+a_3Y+a_2X+a_1, X^2Y+b_6X^3+b_5XY+b_4X^2+b_3Y+b_2X+b_1\}$ These two polynomials correspond to the lattice points (0,2), and (2,1) respectively.

Although the polynomial, which corresponds to the lattice point (4,0), originally exists in the Groebner basis of the ideal of a type 63; it was omitted since from the defining equation F, and an equation $f=Y^2+a_5XY+a_4X^2+a_3Y+a_2X+a_1$ that corresponds to the lattice point (0,2), it can be immediately calculated as F−Yf.

Next, suppose four monomials from the beginning 1, X, Y, and $X^2$ are linearly independent in V, and that the fifth monomial XY is represented by a linear combination thereof. That is, $\Delta(I)$ includes $\{(0,0),(1,0),(0,1),(2,0)\}$, and does not include (1,1). Here, assume $\Delta(I)$ does not includes (0,2), then there is no other choice but $\Delta(I)=(0,0),(1,0),(0,1),(2,0),(3,0),(4,0)\}$ so that $\Delta(I)$ has order 6. As it is, by assumption, I includes a polynomial $f=Y^2+\ldots$ of which the leading term is $Y^2$. As a result, (4,0) does not belong to $\Delta(I)$ because $Yf-F=X^4+\ldots$ belongs to I. That is contradictory. From the foregoing, it can be seen that $\Delta(I)$ is sure to include (0,2), then $\Delta(I)=\{(0,0),(1,0),(0,1),(2,0),(0,2),(3,0)\}$. At this time, call I an ideal of a type 64.

The lattice point set encircling the delta set $\Delta(I)$ of the ideal I of a type 64 is $\{(0,3),(1,1),(4,0)\}$. Thus the Groebner basis of the ideal I of a type 64 becomes the following.

The Groebner basis of the ideal of a type 64=$\{XY+a_4X^2+a_3Y+a_2X+a_1, X^4+b_6X^3+b_5Y^2+b_4X^2+b_3Y+b_2X+b_1\}$ These two equations correspond to the lattice points (1,1), and (4,0) respectively (The lattice point (0,3) corresponds to the defining equation F).

Next, suppose three monomials from the beginning 1, X, and Y in the $C_{34}$ order are linearly independent in V=R/I, and that the fourth monomial $X^2$ is represented by a linear combination thereof. At this time, since a polynomial f of which the leading term is $X^2$ is included in the ideal I, the delta set becomes $\Delta(I)=\{(0,0),(1,0),(0,1),(1,1),(0,2),(1,2)\}$ and the lattice point set encircling these becomes $\{(0,3),(2,0)\}$, whereby I becomes a monomial ideal to be generated in f. At this time, call I an ideal of a type 65.

The Groebner basis of the ideal of a type 65=$\{X^2+a_3Y+a_2X+a_1\}$

The above equation corresponds to the lattice point (2,0) (The lattice point (0,3) corresponds to the defining equation F)

There is no possibility that, from $\deg((f)_0)=-v_{p\infty}(f)=4<6$, the polynomial f of which the leading term is (a term equal to or lower than) Y disappears simultaneously at six points that correspond to the ideal I of order 6. Thus, three monomials 1, X, and Y from the beginning are always linearly independent in V=R/I, and above, the classification of the ideal of order 6 was completed.

(Ideal of Order 5)

Suppose I is an ideal of order 5 of coordinate ring R. The ideal of order 5 is also classified into a type 51 to a type 54 similarly to the ideal of order 6, as mentioned below.

The Groebner basis of the ideal of a type 51=$\{Y^2+a_5XY+a_4X^2+a_3Y+a_2X+a_1, X^3+b_5XY+b_4X^2+b_3Y+b_2X+b_1, X^2Y+c_5XY+c_4X^2+c_3Y+c_2X+c_1\}$ The Groebner basis of the ideal of a type 52=$\{XY+a_4X^2+a_3Y+a_2X+a_1,Y^2+b_4X^2+b_3Y+b_2X+b_1\}$ The Groebner basis of the ideal of a type 53=$\{XY+a_4X^2+a_3Y+a_2X+a_1,X^3+b_5Y^2+b_4X^2+b_3Y+b_2X+b_1\}$ The Groebner basis of the ideal of a type 54=$\{X^2+a_3Y+a_2X+a_1,XY^2+b_5Y^2+b_4XY+b_3Y+b_2X+b_1\}$ (Ideal of Order 4)

The ideal I of order 4 is also classified into a type 41 to a type 44 similarly, as mentioned below.

The Groebner basis of the ideal of a type 41=$\{XY+a_4X^2+a_3Y+a_2X+a_1,Y^2+b_4X^2+b_3Y+b_2X+b_1,X^3+c_4X^2+c_3Y+c_2X+c_1\}$ The Groebner basis of the ideal of a type 42=$\{X^2+a_3Y+a_2X+a_1,XY+b_3Y+b_2X+b_1\}$ The Groebner basis of the ideal of a type 43=$\{X^2+a_3Y+a_2X+a_1,Y^2+b_4XY+b_3Y+b_2X+b_1\}$ The Groebner basis of the ideal of a type 44=$\{Y+a_2X+a_1\}$ (Ideal of Order 3)

The ideal I of order 3 is also classified into a type 31 to a type 33 similarly, as mentioned below.

The Groebner basis of the ideal of a type 31=$\{X^2+a_3Y+a_2X+a_1,XY+b_3Y+b_2X+b_1,Y^2+c_3Y+c_2X+c_1\}$ The Groebner basis of the ideal of a type 32=$\{Y+a_2X+a_1,X^3+b_3X^2+b_2X+b_1\}$ The Groebner basis of the ideal of a type 33=$\{X+a_1\}$ (Ideal of Order 2)

The ideal I of order 2 is also classified into a type 21 and a type 22 similarly, as mentioned below.

The Groebner basis of the ideal of a type 21=$\{Y+a_2X+a_1,X^2+b_2X+b_1\}$

The Groebner basis of the ideal of a type 22=$\{X+a_1,Y^2+b_2Y+b_1\}$ (Ideal of Order 1)

Needless to say, the ideal of order 1 is only of type 11, as mentioned below.

The Groebner basis of the ideal of a type 11=$\{X+a_1,Y+b_1\}$

[Remark]

Ideals of a type 65, 44, and 33 among the ideals mentioned above, which are a principal ideal, represent a unit element as a Jacobian group element. Also, the reduced ideal types among the ideal types mentioned above are only 31, 21, 22, and 11. For example, the reason why the ideal of a type 32 is not a reduced one is understood in a manner mentioned below.

Suppose I is an ideal of a type 32, then $f_I=Y+a_2X+a_1$, thus $\delta(I^*)=-v_\infty(f_I)-\delta(I)=4-3=1$, thus, $f_{I^*}=X+a'$, and $\delta(I^{**})=$ $-v_\infty(f_{I*})-\delta(I*)=3-1=2$ because I* is of type 11. The order thereof is different, whereby $I \neq I^{**}$.

[Additive Algorithm on Jacobian Group of the $C_{34}$ Curve, Part 2]

Set the coordinate ring of the $C_{34}$ curve C defined over a field k having the defining equation F to $R=k[X,Y]/F$. Now let the additive algorithm 1 take concrete shape more clearly for estimating its execution speed. However, hereinafter, the order of the field k is supposed to be sufficiently large in consideration of an application to the discrete logarithmic cryptography.

(Composition Operation 1)

At first, study a first step of the additive algorithm 1 for different ideals $I_1$ and $I_2$, which is hereinafter referred to as a composition operation 1. That is, $f_J$ is to be found for an ideal product $J=I_1 \cdot I_2$. To this end, the Groebner basis of the ideal product J should be found (since $f_J$ is its first element). The genus of the $C_{34}$ curve is 3, whereby the order of the ideal I1 or I2 is equal to or less than 3. Thus, its type is anyone of 11, 21, 22, 31, and 32. The case is mentioned here in which both of the ideals $I_1$ and $I_2$ are of type 31; however the other case is also similar.

We can Suppose $I_1$ and $I_2$ are selected at random from the Jacobian group, Then we have at almost every case, $$V(I_1) \cap V(I_2) = \phi \qquad (1)$$

Because the order of the field k is supposed to be sufficiently large. Here for the ideal I, a set of zero of I is denoted by V(I) ($\phi$ represents an empty set). Also in the event that the condition (1) is not met, upon generating element $R_1$ and $R_2$ that yields $R_1+R_2=0$, and calculating $(I_1+R_1)+(I_2+R_2)$ instead of $(I_1+I_2)$, then it boils down to the case in which the condition (1) holds. Also, the case is very rare (a probability of 1/q or something like it when the size of the defining field k is taken as q) in which the condition (1) is not met, whereby only the case in which the condition (1) is met should be considered in evaluating efficiency of the algorithm. Thereupon, hereinafter, assume that $I_1$ and $I_2$ meet the condition (1).

Suppose $J=I_1 I_2$ is a product of $I_1$ and $I_2$ in R. $I_1$ and $I_2$ are both ideals of order 3, whereby the order of J becomes 6. Thus, the type of J is anyone of 61, 62, 63, 64, and 65. So as to decide which the type of J is, a linear relation should be found in a residue ring R/J among ten monomials $$1, X, Y, X^2, XY, Y^2, X^3, X^2Y, XY^2 \text{ and } X^4 \qquad (2)$$

An ideal $I_i(i=1,2)$ is of type 31, whereby $$R/I_i \cong k \cdot 1 \oplus k \cdot X \oplus k \cdot Y \qquad [\text{EQ. 1}]$$
$$m \mapsto v_m^{(i)}$$

From the condition (1), it follows that $$R/J \cong R/I_1 \oplus R/I_2 \cong \oplus_{i=1}^{6} k \qquad [\text{EQ. 2}]$$
$$m \mapsto (m \bmod(I_1), m \bmod(I_2)) \mapsto v_m^{(1)} : v_m^{(2)}$$

where $v_m^{(1)}:v_m^{(2)}$ is a six-dimensional vector over k to be obtained by connecting two vectors $v_m^{(i)}(i=1,2)$. Thus, so as to find a linear relation in R/J among ten monomials $m_i$ in the equation (2), an intra-row linear relation of the following 10×6 matrix $M_c$ should be found with vectors $v_{mi}^{(1)}$: $v_{mi}^{(2)}(i=1, 2, \ldots, 10)$ taken as a row.

$$M_C = \begin{pmatrix} v_1^{(1)} : v_1^{(2)} \\ v_X^{(1)} : v_X^{(2)} \\ v_Y^{(1)} : v_Y^{(2)} \\ v_{X^2}^{(1)} : v_{X^2}^{(2)} \\ v_{XY}^{(1)} : v_{XY}^{(2)} \\ v_{Y^2}^{(1)} : v_{Y^2}^{(2)} \\ v_{X^3}^{(1)} : v_{X^3}^{(2)} \\ v_{X^2Y}^{(1)} : v_{X^2Y}^{(2)} \\ v_{XY^2}^{(1)} : v_{XY^2}^{(2)} \\ v_{X^4}^{(1)} : v_{X^4}^{(2)} \end{pmatrix} \qquad [\text{EQ. 3}]$$

As well known, the intra-row linear relation of the matrix $M_c$ is obtained by triangulating a matrix $M_c$ with row-reducing transformation, and this allows a type of the ideal J and its Groebner basis to be obtained. The details will be described in embodiments.

(Remark)

In the event that the condition (1) does not hold for the ideals $I_1$ and $I_2$, the rank of the matrix $M_c$ becomes equal to or less than 5. In calculating the ideal product of $I_1$ and $I_2$, at first, assume that they meet the condition (1) for calculation, and as a result of the row-reducing transformation, if it becomes clear that the rank of the matrix $M_c$ is equal to or less than 5, then the elements $R_1$ and $R_2$ that yields $R_1+R_2=0$ should be generated to calculate $(I_1+R_1)+(I_2+R_2)$ instead of $I_1+I_2$.

(Composition Operation 2)

Now study a first step of the additive algorithm 1 for the same ideals $I_1=I$, and $I_2=I$ of the coordinate ring $R=k[X,Y]/F$, which is hereinafter referred to as a composition operation 2. That is, for an ideal product $J=I^2$, its Groebner basis is to be found for calculation of $f_J$. The case is mentioned in which the ideal I is of type 31; however the other case is also similar. The order of the field k is supposed to be sufficiently large, whereby no multiple point exists in V(I) in almost every case. (3)

Also, in evaluating efficiency of the algorithm, only the case should be considered in which the condition (3) is met. Hereinafter, assume that I meets the condition (3). $J=I^2$ is still an ideal of order 6, whereby, so as to calculate its Groebner basis, a linear relation should be found in the residue ring R/J among the monomials of the equation (1). The ideal I is of type 31, whereby $$R/I \cong k \cdot 1 \oplus k \cdot X \oplus k \cdot Y \qquad [\text{EQ. 4}]$$
$$m \mapsto v_m$$

Also, from the condition (3), the necessary and sufficient condition for causing the polynomial $f(\in R)$ to belong to $J=I^2$ is $$f \in I, f_X F_Y - f_Y F_X \in I$$

(Here, for the polynomial f, $f_X$ denotes a differential of f with regard to X. As to $f_Y$ as well, the matter is similar.) Thus, $$R/J \cong R/I \oplus R/I \cong \oplus_{i=1}^{6} k \quad [\text{EQ. 5}]$$

$$m \mapsto (m \bmod(I), m_X F_Y - m_Y F_X \bmod(I)) \mapsto v_m : v_{(m_X F_Y - m_Y F_X)}$$

Where, $v_m : v_{(m_X F_Y - m_Y F_X)}$ is a six-dimensional vector over k to be obtained by connecting two vectors $v_m$ and $v_{(m_X F_Y - m_Y F_X)}$. After all, so as to find the above-mentioned linear relation, for ten monomials $m_i$ in the equation (1), a intra-row linear relation should be found of the following 10×6 matrix $M_D$ mentioned below with a six-dimensional vector $v_{mi} : v_{(m_i X F_Y - m_i Y F_X)}$ over k taken as a row.

$$M_C = \begin{pmatrix} v_1 : 0 \\ v_X : v_{(F_Y)} \\ v_Y : v_{(-F_X)} \\ v_{X^2} : v_{(2F_Y X)} \\ v_{XY} : v_{(-F_X X + F_Y Y)} \\ v_{Y^2} : v_{(-2F_X Y)} \\ v_{X^3} : v_{(3F_Y X^2)} \\ v_{X^2 Y} : v_{(-F_X X^2 + 2F_Y XY)} \\ v_{XY^2} : v_{(-2F_X XY + F_Y Y^2)} \\ v_{X^4} : v_{(4F_Y X^3)} \end{pmatrix} \quad [\text{EQ. 6}]$$

From now on, upon triangulating the matrix $M_D$ with the row-reducing transformation, the type of the ideal J and its Groebner basis can be obtained similarly to the composition operation 1.

(Remark)

In the event that the condition (3) does not hold for the ideal I, the rank of the matrix $M_D$ becomes equal to or less than 5. In calculating the Groebner basis of $I^2$, at first, assume that it meets the condition (3) for calculation, and as a result of the row-reducing transformation, if it becomes clear that the rank of the matrix $M_D$ is equal to or less than 5, then elements $R_1$ and $R_2$ that yields $R_1 + R_2 = 0$ should be generated to calculate $(I+R_1)+(I+R_2)$ instead of I+I.

(Reduction Operation)

Now study a second step (and a third step) of the additive algorithm 1, which is hereinafter referred to as a reduction operation. That is, for the ideal J of which the order is equal to or less than 6, the Groebner basis of $J^* = f_J : J$ is to be found. The case is mentioned below in which J is of type 61; however the other case is also similar.

J is of type 61, whereby its Groebner basis can be expressed by $$\{f_J = X^3 + a_6 Y^2 + \ldots, g = X^2 Y + b_6 Y^2 + \ldots, h = XY^2 + c_6 Y^2 + \ldots\}$$

By definition, $J^* = f_J : J$, whereby $\delta(J^*) = -v_\infty(f_J) - \delta(J) = 3$. Thus, it can be seen that $J^*$ becomes an ideal of a type 31 because $J^*$ is a reduced ideal. Thus so as to find its Groebner basis, for the monomial $m_i$ in $$1, X, Y, X^2, XY, \text{ and } Y^2 \quad (4)$$

a linear relation $\Sigma_i d_i m_i$ should be found in which $\Sigma_i d_i m_i g$ and $\Sigma_i d_i m_i h$ become zero simultaneously in $R/f_J$.

From $LM(F) = Y^3, LM(f_J) = X^3$, then $$R/f_J R \cong k \cdot 1 \oplus k \cdot X \oplus k \cdot Y \oplus k \cdot X^2 \oplus k \cdot XY \oplus k \cdot Y^2 \oplus k \cdot \quad [\text{EQ. 7}]$$
$$f \mapsto w_j$$
$$X^2 Y \oplus k \cdot XY^2 \oplus k \cdot X^2 Y^2$$

whereby, so as to find the above-mentioned linear relation, for each of six monomials $m_i$ in the equation (4), an intra-row linear relation should be found of the following 6×18 matrix $M_R$ with a 18-dimensional vector $w_{(m_i g)} : w_{(m_i h)}$ over k to be obtained by connecting two vectors $w_{(m_i g)}$ and $w_{(m_i h)}$ taken as a row.

$$M_R = \begin{pmatrix} w_g : w_h \\ w_{Xg} : w_{Xh} \\ w_{Yg} : w_{Yh} \\ w_{X^2 g} : w_{X^2 h} \\ w_{XYg} : w_{XYh} \\ w_{Y^2 g} : w_{Y^2 h} \end{pmatrix} \quad [\text{EQ. 8}]$$

From now on, upon triangulating the matrix $M_R$ with the row-reducing transformation, the Groebner basis of the ideal $J^*$ can be obtained. However, as matter of fact, in almost every case, it is enough to triangulate not the matrix $M_R$ itself but a certain submatrix $M_r$ of its 6×3. This will be described in details in the next chapter.

(Arithmetic Quantity of Algorithm)

An arithmetic quantity of the algorithm will be evaluated. Set the order of the defining field to q, then a random element of the Jacobian group is represented by the ideal of a type 31 apart from an exception of a probability of 1/q. Also, the result of the composition operations 1 and 2 for the ideal of a type 31 demonstrates that it becomes an ideal of a type 61 apart from an exception of a probability of 1/q. Thus, so as to evaluate the arithmetic quantity of the algorithm, the arithmetic quantity of the composition operations 1 and 2 at the time of having input the ideal of a type 31, and the arithmetic quantity of the reduction operation at the time of having input the ideal of a type 61 or a type 31 should be evaluated. Also, the arithmetic quantity of the algorithm is represented below with the number of the times of multiplication and reciprocal arithmetic.

At first, the arithmetic quantity of the composition operation 1 is examined. Suppose that $I_1$ and $I_2$ are ideals of type 31: then $$I_1 = \{X^2 + a_3 Y + a_2 X + a_1, XY + b_3 Y + b_2 X + b_1, Y^2 + c_3 Y + c_2 X + c_1\}$$

$$I_2 = \{X^2 + s_3 Y + s_2 X + s_1, XY + t_3 Y + t_2 X + t_1, Y^2 + u_3 Y + u_2 X + u_1\}$$

For the ideals $I_1$ and $I_2$, the matrix $M_c$ is expressed by $$M_C = \begin{pmatrix} 1 & 0 & 0 & 1 & 0 & 0 \\ 0 & 1 & 0 & 0 & 1 & 0 \\ 0 & 0 & 1 & 0 & 0 & 1 \\ -a_1 & -a_2 & -a_3 & -s_1 & -s_2 & -s_3 \\ -b_1 & -b_2 & -b_3 & -t_1 & -t_2 & -t_3 \\ -c_1 & -c_2 & -c_3 & -u_1 & -u_2 & -u_3 \\ a_1a_2+a_3b_1 & -a_1+a_2^2+a_3b_2 & a_2a_3+a_3b_3 & s_1s_2+s_3t_1 & -s_1+s_2^2+s_3t_2 & s_2s_3+s_3t_3 \\ a_2b_1+a_3c_1 & a_2b_2+a_3c_2 & -a_1+a_2b_3+a_3c_3 & s_2t_1+s_3u_1 & s_2t_2+s_3u_2 & -s_1+s_2t_3+s_3u_3 \\ b_1b_2+b_3c_1 & b_2^2+b_3c_2 & -b_1+b_2b_3+b_3c_3 & t_1t_2+t_3u_1 & t_2^2+t_3u_2 & -t_1+t_2t_3+t_3u_3 \\ e_{10,1} & e_{10,2} & e_{10,3} & e_{10,4} & e_{10,5} & e_{10,6} \end{pmatrix}$$ [EQ. 9]

where, $e_{10,1} = a_1^2 - a_1a_2^2 - 2a_2a_3b_1 - a_3^2c_1$ $e_{10,2} = 2a_1a_2 - a_2^3 - 2a_2a_3b_2 - a_3^2c_2$ $e_{10,3} = 2a_1a_3 - a_2^2a_3 - 2a_2a_3b_3 - a_3^2c_3$ $e_{10,4} = s_1^2 - s_1s_2^2 - 2s_2s_3t_1 - s_3^2u_1$ $e_{10,5} = 2s_1s_2 - s_2^3 - 2s_2s_3t_2 - s_3^2u_2$ $e_{10,6} = 2s_1s_3 - s_2^2s_3 - 2s_2s_3t_3 - s_3^2u_3$ From this, it can be seen that upon eliminating multiplicity successfully, the matrix $M_c$ can be constructed with at most 44-times multiplication.

Upon paying attention to the fact that the row-reduction transformation for the matrix $M_c'$ takes a formula having the first row to the third row thereof already row-reduction, and that its component is 0 or 1, it can be executed with three-times division and at most 6×6+6×5+6×4=90-times multiplication. From the foregoing, the arithmetic quantity of the composition operation 1 is at most three-times reciprocal arithmetic, and 134-times multiplication. Similarly, it can be seen that the arithmetic quantity of the composition operation 2 is at most three-times reciprocal arithmetic, and 214-times multiplication. The arithmetic quantity is increased by the extent to which the matrix $M_D$ is more complex than $M_c$.

Next, the arithmetic quantity of the reduction operation at the time of having input the ideal of a type 61 is examined. Suppose J is an ideal of type 61: then $J = \{X^3 + a_6Y^2 + a_5XY + a_4X^2 + a_3Y + a_2X + a_1, X^2Y + b_6Y^2 + b_5XY + b_4X^2 + b_3Y + b_2X + b_1, XY^2 + c_6Y^2 + c_5XY + c_4X^2 + c_3Y + c_2X + c_1\}$ A 6×3 minor $M_r$ obtained by taking a seventh column to a ninth column of the matrix $M_R$ for the ideal J becomes $$M_r = \begin{pmatrix} 1 & 0 & 0 \\ -a_4 - a_5a_6 + b_5 & -a_5 - a_6^2 + b_6 & 0 \\ b_4 + a_5b_6 & b_5 + a_6b_6 & 1 \\ e_{4,1} & e_{4,2} & -a_5 - a_6^2 + b_6 \\ e_{5,1} & e_{5,2} & -a_4 - 2a_5a_6 - a_6^3 + b_5 + a_6b_6 \\ e_{6,1} & e_{6,2} & e_{6,3} \end{pmatrix}$$ [EQ. 10]

where $e_{4,1} = -a_2 + a_4^2 - a_3a_6 + 3a_4a_5a_6 + a_5^2a_6^2 + b_3 - a_5b_4 - a_4b_5 - a_5a_6b_5$ $e_{4,2} = -a_3 + a_4a_5 + a_5^2a_6 + 2a_4a_6^2 + a_5^3a_6 - a_6b_4 - a_5b_5 - a_6^2b_5$ $e_{5,1} = -2a_3a_5 + 2a_4a_5^2 - a_2a_6 + a_4^2a_6 + a_5^3a_6 - a_3a_6^2 + 3a_4a_5a_6^2 + a_5^2a_6^3 + b_2 - a_4b_4 - a_5a_6b_4 + a_3b_6 - 2a_4a_5b_6 - a_5^2a_6b_6$ $e_{5,2} = -a_2 + a_5^3 - 2a_3a_6 + 2a_4a_5a_6 + 2a_5^2a_6^2 + 2a_4a_6^3 + a_5a_6^4 + b_3 - a_5b_4 - a_6^2b_4 - a_5^2b_6 - a_4a_6b_6 - a_5a_6^2b_6$ $e_{6,1} = -2a_3a_4 - 2a_2a_5 + 3a_4^2a_5 - 4a_3a_5a_6 6a_4a_5^2a_6 - a_2a_6^2 + a_4^2a_6^2 + 2a_5^3a_6^2 - a_3a_6^3 + 3a_4a_5a_6^3 + a_5^2a_6^4 + a_5b_3 + a_3b_5 - 2a_4a_5b_5 - a_5^2a_6b_5 + a_2b_6 - a_4^2b_6 + a_3a_6b_6 - 3a_4a_5a_6b_6 - a_5^2a_6^2b_6$ $e_{6,2} = -2a_3a_5 + 2a_4a_5^2 - 2a_2a_6 + a_4^2a_6 + 2a_5^3a_6 - 3a_3a_6^2 + 5a_4a_5a_6^2 + 3a_5^2a_6^3 + 2a_4a_6^4 + a_5a_6^5 + b_2 + a_6b_3 - a_5^2b_5 - a_4a_6b_5 - a_5a_6^2b_5 + a_3b_6 - a_4a_5b_6 - a_5^2a_6b_6 - 2a_4a_6^2b_6 - a_5a_6^3b_6$ $e_{6,3} = -a_5^2 - 2a_4a_6 - 3a_5a_6^2 - a_6^4 + b_4 + a_6b_5 + a_5b_6 + a_6^2b_6$ This leads to the result that, if a (2,2) component $d = -a_5 - a_6^2 + b_6$ of the matrix $M_r$ is not zero, the rank of the matrix $M_r$ becomes 3. Thus, when $d \ne 0$, instead of the 6×18 matrix $M_R$ the 6×3 matrix $M_r$ should be employed that is its minor. It is acceptable to let $d \ne 0$ in evaluating efficiency of the algorithm because the probability of $d = 0$ is considered to be $1/q$ or something like it. From the above equation, it can be seen that upon eliminating multiplicity successfully, the matrix $M_r$ can be constructed with at most 40-times multiplication. Upon paying attention to the fact that the matrix $M_r$ is already a triangle matrix, and that (1,1) and (3,3) components thereof are 1, it can be seen that the row-reduction transformation for the matrix $M_r'$ can be executed with at most one-time reciprocal arithmetic and 2×4+2×3=14-times multiplication. From the foregoing, the arithmetic quantity of the reduction operation at the time of inputting the ideal of a type 61 is at most one-time reciprocal arithmetic and 54-times multiplication. Also at the time of inputting the ideal of a type 31, from the similar consideration, it can be seen that the reduction operation requires most one-time reciprocal arithmetic and 16-times multiplication.

Upon summarizing the foregoing, it follows that the arithmetic quantity of the additive algorithm on Jacobian group of the present invention is one as shown in FIG. 16. In FIG. 16, I and M represent the reciprocal arithmetic and the multiplication respectively. On the elliptic curve, the addition (of different elements) can be executed with one-time reciprocal arithmetic and three-times multiplication, and the arithmetic of two-times multiple can be executed with one-time reciprocal arithmetic and four-times multiplication. However, so as to obtain a group of the same bit length, the bit length of the finite field requires three times as large arithmetic quantity as the case of the $C_{34}$ curve does. Suppose that the arithmetic quantity of the reciprocal arithmetic is twenty times as large as that of the multiplication, and that the arithmetic quantity of the reciprocal arithmetic and the multiplication is on the order of a square of the bit length, then it can be seen that the addition on the $C_{34}$ curve can be executed with $304/(23\times9)\approx1.47$ times as large arithmetic quantities as that on the elliptic cure can be done, and the arithmetic of two-times multiple $384/(24\times9)\approx1.78$ times.

BRIEF DESCRIPTION OF THE DRAWING

This and other objects, features and advantages of the present invention will become more apparent upon a reading of the following detailed description and drawings, in which:

FIG. 5 is one specific example of an ideal type table for the $C_{34}$ curve;

FIG. 6 is one specific example of a monomial list table for the $C_{34}$ curve;

FIG. 7 is one specific example of a table for a Groebner basis construction for the $C_{34}$ curve;

FIG. 8 is one specific example of the algebraic curve parameter file for the $C_{27}$ curve;

FIG. 9 is one specific example of the ideal type table for the $C_{27}$ curve;

FIG. 10 is one specific example of the monomial list table for the $C_{27}$ curve;

FIG. 11 is one specific example of the table for a Groebner basis construction for the $C_{27}$ curve;

FIG. 12 is one specific example of the algebraic curve parameter file for the $C_{25}$ curve;

FIG. 13 is one specific example of the ideal type table for the $C_{25}$ curve;

FIG. 14 is one specific example of the monomial list table for the $C_{25}$ curve;

FIG. 15 is one specific example of the table for a Groebner basis construction table for the $C_{25}$ curve; and FIG. 16 is a table illustrating the arithmetic quantity of the additive algorithm on Jacobian group in accordance with the present invention.

DESCRIPTION OF THE EMBODIMENT

Figure 1:
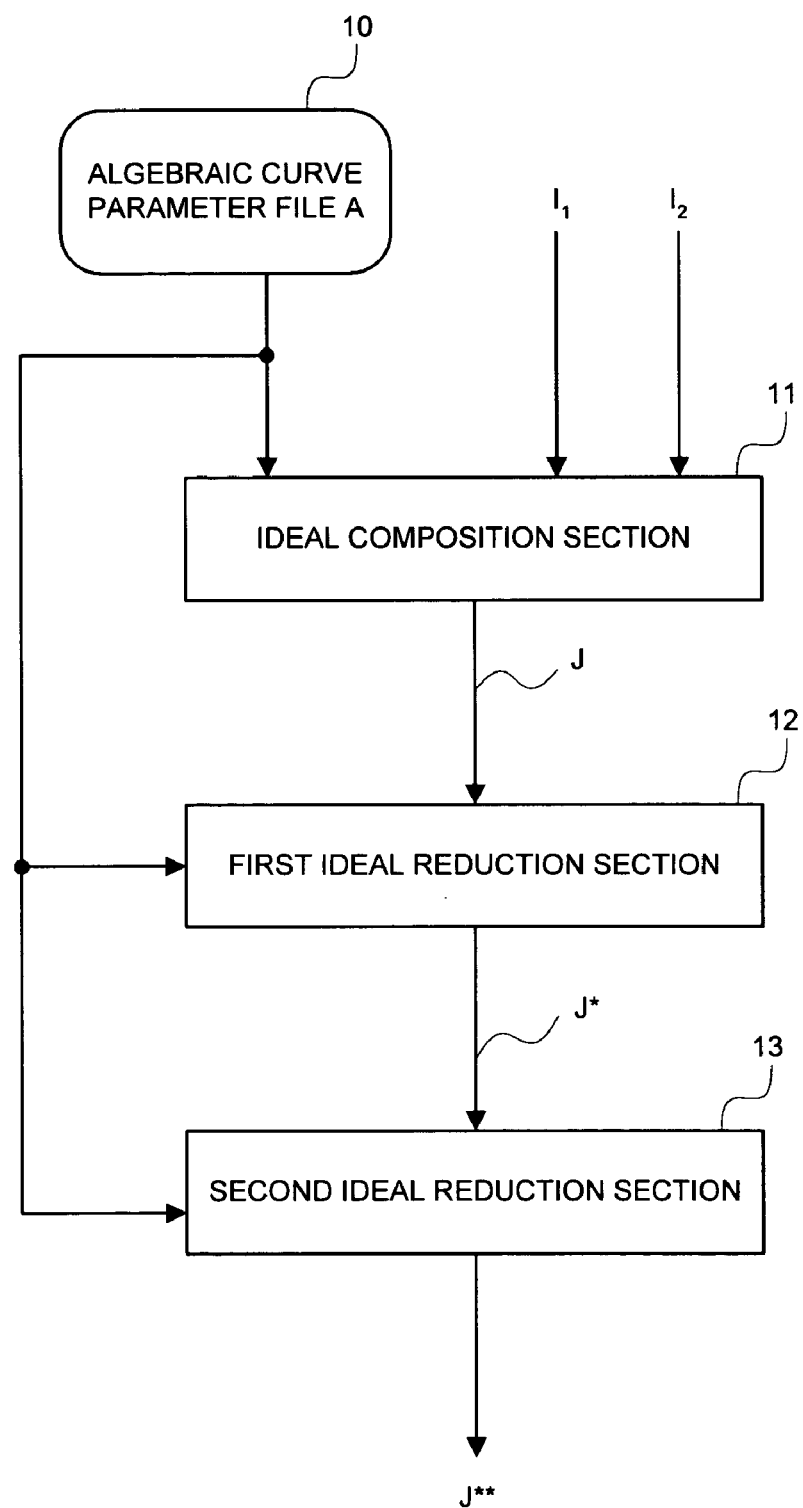
FIG. 1 is a block diagram illustrating an embodiment of the present invention.
Figure 2:
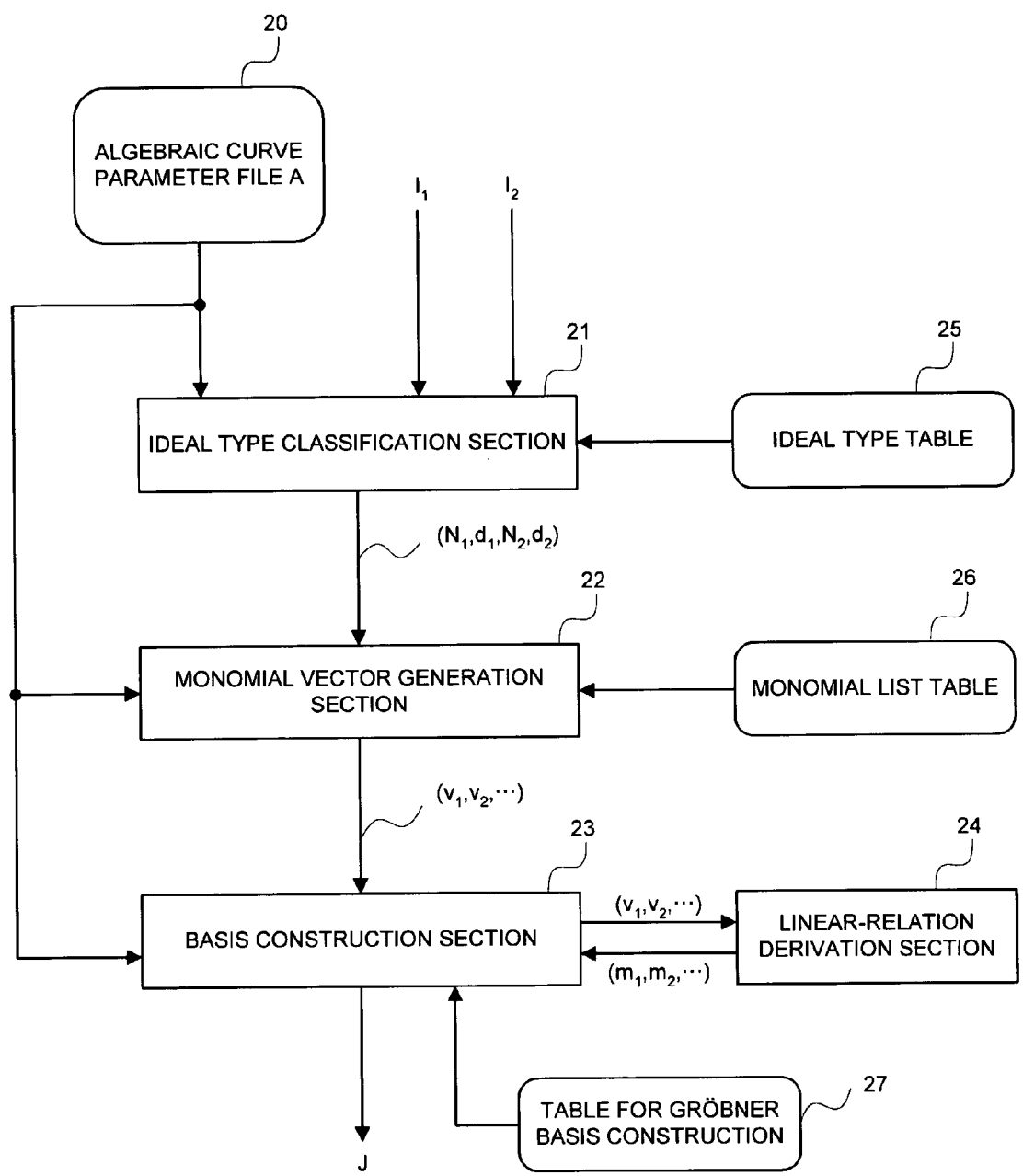
FIG. 2 is a functional block diagram of an ideal composition section.
Figures 3, 4:
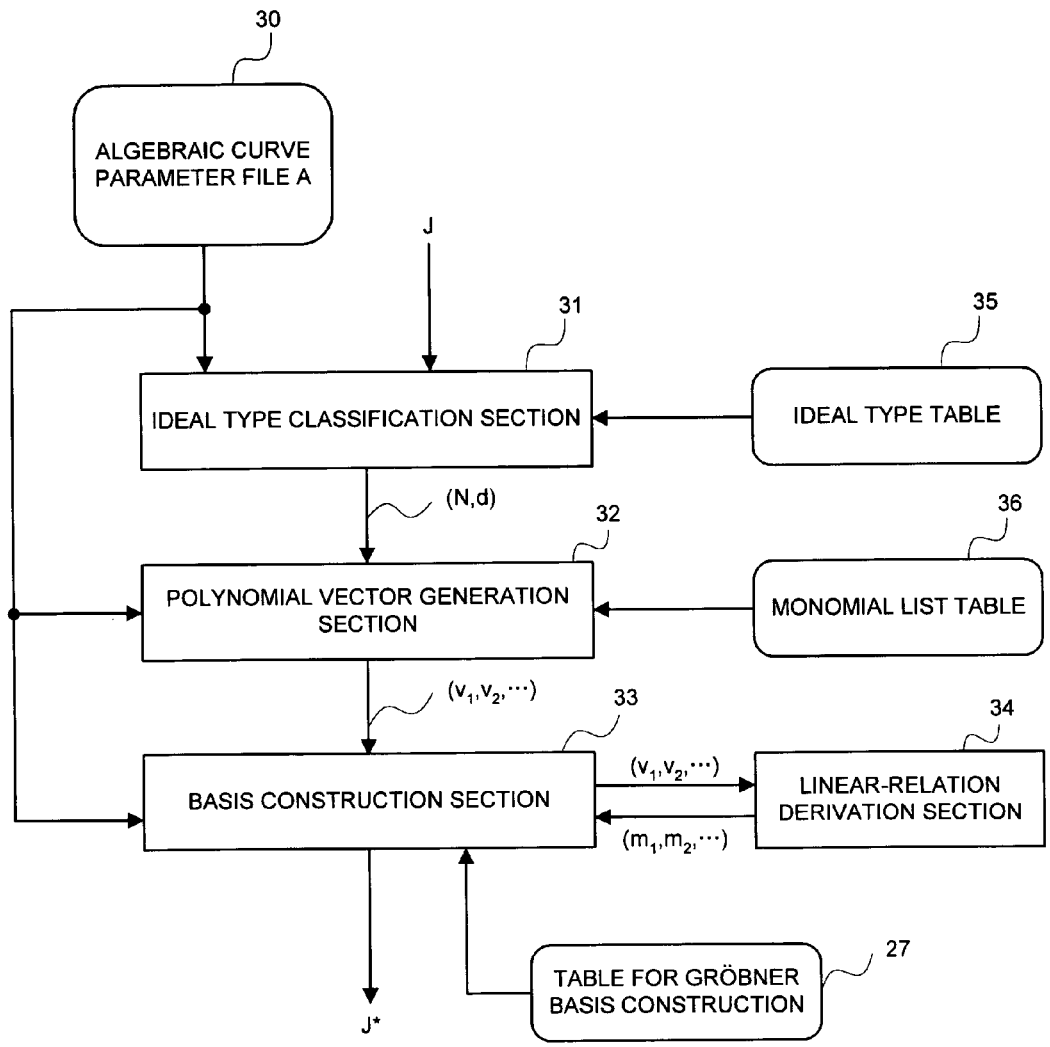
FIG. 3 is a functional block diagram of an ideal reduction section.
FIG. 4 is one specific example of an algebraic curve parameter file A for the $C_{34}$ curve.

Embodiments of the present invention will be explained below in details by employing the accompanied drawings. FIG. 1 is a functional block diagram of the embodiment of the present invention, and the FIG. 2 is a block diagram illustrating an example of the ideal composition section of FIG. 1. FIG. 3 is a block diagram illustrating an example of a first and a second ideal reduction section of FIG. 1.

At first, the embodiment of the case in which the $C_{34}$ curve was employed is shown. In this embodiment, the algebraic curve parameter file of FIG. 4 is employed as an algebraic curve parameter file, the ideal type table of FIG. 5 as an ideal type table, the monomial list table of FIG. 6 as an monomial list table, and the table for a Groebner basis construction of FIG. 7 as a table for a Groebner basis construction respectively.

In a Jacobian group element adder of FIG. 1, suppose the Groebner bases $$I_1 = \{X^2+726Y+836X+355, XY+36Y+428X+477, Y^2+764Y+425X+865\}$$

and $$I_2 = \{X^2+838Y+784X+97, XY+602Y+450X+291, Y^2+506Y+542X+497\}$$

were input of the ideal of the coordinate ring of the algebraic curve designated by an algebraic curve parameter file A, which represents an element of the Jacobian group of the $C_{34}$ curve designated by an algebraic curve parameter file A 16 and an algebraic curve parameter file A of FIG. 4.

At first, an ideal composition section 11, which takes the above-mentioned algebraic curve parameter file A, and the above-mentioned Groebner bases $I_1$ and $I_2$ as an input, operates as follows according to a flow of a process of the functional block shown in FIG. 2. At first, the ideal composition section 11 makes a reference to an ideal type table 25 of FIG. 5 in an ideal type classification section 21 of FIG. 2, retrieves a record in which the ideal type described in an ideal type field accords with the type of the input ideal $I_1$ for obtaining a fourteenth record, and acquires a value $N_1=31$ of an ideal type number field and a value $d_1=3$ of an order field of the fourteenth record.

Similarly, the ideal composition section 11 retrieves a record in which the ideal type accords with the type of the input ideal $I_2$ for obtaining the fourteenth record, and acquires a value $N_2=31$ of the ideal type number field and a value $d_2=3$ of the order field of the fourteenth record.

Next, the ideal composition section 11 calculates the sum $d_3=d_1+d_2=6$ of said values $d_1=3$ and $d_2=3$ of said order field in a monomial vector generation section 22, makes a reference to a monomial list table 26, retrieves a record of which the value of the order field is said $d_3=6$ for obtaining a first record, and acquires a list 1, X, Y, $X^2$, XY, $Y^2$, $X^3$, $X^2Y$, $XY^2$, and $X^4$ of the monomial described in the monomial list field of the first record.

$I_1$ and $I_2$ are different, whereby a remainder to be attained by dividing $M_i$ by $I_1$ for each of $M_i(1<=i<=10)$ in said list 1, X, Y, $X^2$, XY, $Y^2$, $X^3$, $X^2Y$, $XY^2$, and $X^4$ of said monomial is calculated to obtained a polynomial $a^{(i)}_1+a^{(i)}_2X+a^{(i)}_3Y$, to arrange its coefficients in order of the monomial order 1, X, Y, ... of the algebraic curve parameter file A, and to generate a vector $(a^{(i)}_1, a^{(i)}_2, a^{(i)}_3)$. Furthermore, a remainder to be attained by dividing $M_i$ by $I_2$ is calculated to obtain a polynomial $b^{(i)}_1+b^{(i)}_2X+b^{(i)}_3Y$, to arrange its coefficients in order of the monomial order 1, X, Y, ... of the algebraic curve parameter file A, to generate a vector $(b^{(i)}_1, b^{(i)}_2, b^{(i)}_3)$, and to connect the above-mentioned two vectors for generating a vector $v_i=(a^{(i)}_1, a^{(i)}_2, a^{(i)}_3, b^{(i)}_1, b^{(i)}_2, b^{(i)}_3)$ That is, divide $M_1=1$ by $I_1$: then $I=0\cdot(X^2+726Y+836X+355)+0\cdot(XY+36Y+428X+477)+0\cdot(Y^2+746Y+425X+865)+1$ whereby, 1 is obtained as a remainder to generate a vector (1,0,0). Divide $M_1=1$ by $I_2$: then $I=0\cdot(X^2+838Y+784X+97)+0\cdot(XY+602Y+450X+291)+0\cdot(Y^2+506Y+524X+497)+1$ whereby, 1 is obtained as a remainder to generate a vector (1,0,0). These two vectors are connected to generate a vector $v_1=(1,0,0,1,0,0)$.

Next, divide $M_2=X$ by $I_1$: then $X=0\cdot(X^2+726Y+836X+355)+0\cdot(XY+36Y+428X+477)+0\cdot(Y^2+746Y+425X+865)+X$ whereby, X is obtained as a remainder to generate a vector (0,1,0). Divide $M_2=X$ by $I_2$: then $1=0\cdot(X^2+838Y+784X+97)+0\cdot(XY+602Y+450X+291)+0\cdot(Y^2+506Y+524X+497)+X$ whereby, X is obtained as a remainder to generate a vector (0,1,0). These two vectors are connected to generate a vector $v_2=(0,1,0,0,1,0)$.

Next, divide $M_3=Y$ by $I_1$: then $Y=0\cdot(X^2+726Y+836X+355)+0\cdot(XY+36Y+428X+477)+0\cdot(Y^2+746Y+425X+865)+Y$ whereby, Y is obtained as a remainder to generate a vector (0,0,1). Divide $M_3=Y$ by $I_2$: then $Y=0\cdot(X^2+838Y+784X+97)+0\cdot(XY+602Y+450X+291)+0\cdot(Y^2+506Y+524X+497)+Y$ whereby, Y is obtained as a remainder to generate a vector (0,0,1). These two vectors are connected to generate a vector $v_3=(0,0,1,0,0,1)$.

Next, divide $M_4=X_2$ by $I_1$: then $X^2=1\cdot(X_2+726Y+836X+355)+0\cdot(XY+36Y+428X+477)+0\cdot(Y^2+746Y+425X+865)+654+173X+283Y$ whereby, 654+173X+283Y is obtained as a remainder to generate a vector (654,173,283). Divide $M^4=X^2$ by $I_2$: then $X^2=1\cdot(X^2+838Y+784X+97)+0\cdot(XY+602Y+450X+291)+0\cdot(Y^2+506Y+524X+497)+912+225X+171Y$, whereby, 912+225X+171Y is obtained as a remainder to generate a vector (912,225,171). These two vectors are connected to generate a vector $v_4=(654,173,283,912,225,171)$.

Next, divide $M_5=XY$ by $I_1$: then $XY=0\cdot(X^2+726Y+836X+355)+1\cdot(XY+36Y+428X+477)+0\cdot(Y^2+746Y+425X+865)+532+581X+973Y$ whereby, 532+581X+973Y is obtained as a remainder to generate a vector (532,581,973). Divide $M_5=XY$ by $I_2$: then $XY=0\cdot(X^2+838Y+784X+97)+1\cdot(XY+602Y+450X+291)+0\cdot(Y^2+506Y+524X+497)+718+559X+407Y$, whereby, 718+559X+407Y is obtained as a remainder to generate a vector (718,559,407). These two vectors are connected to generate a vector $v_5=(532,581,973,718,559,407)$.

Next, divide $M_6=Y^2$ by $I_1$: then $Y^2=0\cdot(X^2+726Y+836X+355)+0\cdot(XY+36Y+428X+477)+1\cdot(Y^2+746Y+425X+865)+144+584X+263Y$, whereby, 144+584X+263Y is obtained as a remainder to generate a vector (144,584,263). Divide $M^6=Y^2$ by $I_2$: then $Y^2=0\cdot(X^2+838Y+784X+97)+0\cdot(XY+602Y+450X+291)+1\cdot(Y^2+506Y+524X+497)+512+485X+503Y$, whereby, 512+485X+503Y is obtained as a remainder to generate a vector (512,485,503). These two vectors are connected to generate a vector $v_6=(144,584,263,512,485,503)$.

Next, divide $M_7=X^3$ by $I_1$: then $X^3=(173+X)\cdot(X^2+726Y+836X+355)+283\cdot(XY+36Y+428X+477)+0\cdot(Y^2+746Y+425X+865)+349+269X+429Y$, whereby, 349+269X+429Y is obtained as a remainder to generate a vector (349,269,429). Divide $M_7=X^3$ by $I_2$: then $X^3=(255+X)\cdot(X^2+838Y+784X+97)+171\cdot(XY+602Y+450X+291)+0\cdot(Y^2+506Y+524X+497)+53+821X+109Y$, whereby, 53+821X+109Y is obtained as a remainder to generate a vector (53,821,109). These two vectors are connected to generate a vector $v_7=(349,269,429,53,821,109)$ Next, divide $M_8=X^2Y$ by $I_1$: then $X^2Y=Y\cdot(X^2+726Y+836X+355)+173\cdot(XY+36Y+428X+477)+283\cdot(Y^2+746Y+425X+865)+609+418X+243Y$, whereby, 609+418X+243Y is obtained as a remainder to generate a vector (609,418,243). Divide $M_8=X^2Y$ by $I_2$: then $X^2Y=Y\cdot(X^2+838Y+784X+97)+225\cdot(XY+602Y+450X+291)+171\cdot(Y^2+506Y+524X+497)+888+856X+916Y$, whereby, 888+856X+916Y is obtained as a remainder to generate a vector (888,856,916). These two vectors are connected to generate a vector $v_8=(609,418,243,888,856,916)$.

Next, divide $M_9=XY^2$ by $I_1$: then $XY^2=0\cdot(X^2+726Y+836X+355)+(581+Y)\cdot(XY+36Y+428X+477)+973\cdot(Y^2+746Y+425X+865)+199+720X+418Y$, whereby, 199+720X+418Y is obtained as a remainder to generate a vector (199,720,418). Divide $M_9=XY$ by $I_2$: then $XY^2=0\cdot(X^2+838Y+784X+97)+(559+Y)\cdot(XY+602Y+450X+291)+407\cdot(Y^2+506Y+524X+497)+310+331X+91Y$, whereby, 310+331X+91Y is obtained as a remainder to generate a vector (310,331,91). These two vectors are connected to generate a vector $v_9=(199,720,418,310,331,91)$.

Next, divide $M_{10}=X^4$ by $I_1$: then $X^4=(313+173X+X^{2+283}Y)\cdot(X^2+726Y+836X+355)+45\cdot(XY+36Y+428X+477)+378\cdot(Y^2+746Y+425X+865)+554+498X+143Y$ whereby, 554+498X+143Y is obtained as a remainder to generate a vector (554,498,143). Divide $M_{10}=X^4$ by $I_2$: then $X^4=(78+225X+X^{2+171}Y)\cdot(X^2+838Y+784X+97)+266\cdot(XY+602Y+450X+291)+989\cdot(Y^2+506Y+524X+497)+643+522X+107Y$, whereby, 643+522X+107Y is obtained as a remainder to generate a vector (643,522,107). These two vectors are connected to generate a vector $v_{10}=(554,498,143,643,522,107)$. Above, the process of the ideal composition section 11 in the monomial vector generation section 22 is finished.

Next, in a basis construction section 23, the ideal composition section 11 inputs ten six-dimensional vectors $v_1$, $v_2$, $v_3$, $v_4$, $v_5$, $v_6$, $v_7$, $v_8$, $v_9$, and $v_{10}$ generated in the monomial vector generation section 22 into a linear-relation derivation section 24, and obtains a plurality of 10-dimensional vectors $m_1$, $m_2$, . . . as an output. The linear-relation derivation section 24 derives a linear relation of the vectors, which were input, employing a discharging method. The discharging method is a well-known art, whereby, as to an operation of the linear-relation derivation section 24, only its outline is shown below.

The linear-relation derivation section 24 firstly arranges the ten six-dimensional vectors $v_1$, $v_2$, $v_3$, $v_4$, $v_5$, $v_6$, $v_7$, $v_8$, $v_9$, and $v_{10}$, which were input, in order for constructing a 10×6 matrix $$M_c = \begin{pmatrix} 1 & 0 & 0 & 1 & 0 & 0 \\ 0 & 1 & 0 & 0 & 1 & 0 \\ 0 & 0 & 1 & 0 & 0 & 1 \\ 654 & 173 & 283 & 912 & 225 & 171 \\ 532 & 581 & 973 & 718 & 559 & 407 \\ 144 & 584 & 263 & 512 & 485 & 503 \\ 349 & 269 & 429 & 53 & 821 & 109 \\ 609 & 418 & 243 & 888 & 856 & 916 \\ 199 & 720 & 418 & 310 & 331 & 91 \\ 554 & 498 & 143 & 643 & 522 & 107 \end{pmatrix} \quad \text{[EQ. 11]}$$

Next, the linear-relation derivation section 24 connects a 10-dimensional unity matrix to a matrix $M_c$ to obtain

[EQ. 12]

$$M_c = \begin{pmatrix} 1 & 0 & 0 & 1 & 0 & 0 & 1 & 0 & 0 & 0 & 0 & 0 & 0 & 0 & 0 \\ 0 & 1 & 0 & 0 & 1 & 0 & 0 & 1 & 0 & 0 & 0 & 0 & 0 & 0 & 0 \\ 0 & 0 & 1 & 0 & 0 & 1 & 0 & 0 & 1 & 0 & 0 & 0 & 0 & 0 & 0 \\ 654 & 173 & 283 & 912 & 225 & 171 & 0 & 0 & 0 & 1 & 0 & 0 & 0 & 0 & 0 \\ 532 & 581 & 973 & 718 & 559 & 407 & 0 & 0 & 0 & 0 & 1 & 0 & 0 & 0 & 0 \\ 144 & 584 & 263 & 512 & 485 & 503 & 0 & 0 & 0 & 0 & 0 & 1 & 0 & 0 & 0 \\ 349 & 269 & 429 & 53 & 821 & 109 & 0 & 0 & 0 & 0 & 0 & 0 & 1 & 0 & 0 \\ 609 & 418 & 243 & 888 & 856 & 916 & 0 & 0 & 0 & 0 & 0 & 0 & 0 & 1 & 0 \\ 199 & 720 & 418 & 310 & 331 & 91 & 0 & 0 & 0 & 0 & 0 & 0 & 0 & 0 & 1 \\ 554 & 498 & 143 & 643 & 522 & 107 & 0 & 0 & 0 & 0 & 0 & 0 & 0 & 0 & 1 \end{pmatrix}$$

Next, the linear-relation derivation section 24 triangulates a matrix $M'_c$ by adding a constant multiple of an i-th row to an (i+1)-th (i=1,2, ... 6) row to a tenth row to obtain the following matrix m

[EQ. 13]

$$m = \begin{pmatrix} 1 & 0 & 0 & 1 & 0 & 0 & 1 & 0 & 0 & 0 & 0 & 0 & 0 & 0 & 0 & 0 \\ 0 & 1 & 0 & 0 & 1 & 0 & 0 & 1 & 0 & 0 & 0 & 0 & 0 & 0 & 0 & 0 \\ 0 & 0 & 1 & 0 & 0 & 1 & 0 & 0 & 1 & 0 & 0 & 0 & 0 & 0 & 0 & 0 \\ 0 & 0 & 0 & 258 & 52 & 897 & 355 & 836 & 726 & 1 & 0 & 0 & 0 & 0 & 0 & 0 \\ 0 & 0 & 0 & 0 & 621 & 688 & 268 & 365 & 592 & 187 & 1 & 0 & 0 & 0 & 0 & 0 \\ 0 & 0 & 0 & 0 & 0 & 31 & 514 & 469 & 637 & 669 & 155 & 1 & 0 & 0 & 0 & 0 \\ 0 & 0 & 0 & 0 & 0 & 0 & 28 & 132 & 31 & 271 & 469 & 166 & 1 & 0 & 0 & 0 \\ 0 & 0 & 0 & 0 & 0 & 0 & 856 & 618 & 747 & 909 & 132 & 636 & 0 & 1 & 0 & 0 \\ 0 & 0 & 0 & 0 & 0 & 0 & 652 & 322 & 240 & 978 & 826 & 846 & 0 & 0 & 1 & 0 \\ 0 & 0 & 0 & 0 & 0 & 0 & 333 & 346 & 980 & 935 & 824 & 614 & 0 & 0 & 0 & 1 \end{pmatrix}$$

As well known, the vector that is composed of a seventh component and afterward of the seventh row to the tenth row of the matrix m is a vector $\{m_{1,1}, m_{1,2}, \ldots, m_{1,n}\}$, $(m_{2,1}, m_{2,2}, \ldots, m_{2,n}) \ldots \}$ representing a linearly-independent linear dependence relation $\Sigma_i^{10} m_{ji} v_i = 0 (j=1, 2, \ldots)$ of all of the ten six-dimensional vectors $v_1, v_2, v_3, v_4, v_5, v_6, v_7, v_8, v_9$, and $v_{10}$ that were input. The linear-relation derivation section 24 outputs a vector $m_1=(28,132,31,271,469,166,1,0,0,0)$ that is composed of the seventh component and afterward of the seventh row of the matrix m, a vector $m_2=(856,618,747,909,132,636,0,1,0,0)$ that is composed of the seventh component and afterward of the eighth row of the matrix m, and a vector $m_3=(652,322,240,978,826,846,0,0,1,0)$ that is composed of the seventh component and afterward of the ninth row of the matrix m, and a vector $m_4=(333,346,980,935,824,614,0,0,0,1)$ that is composed of the seventh component and afterward of the tenth row of the matrix m. Now return to the explanation of the process of the ideal composition section 11 in the basis construction section 23.

Next, the ideal composition section 11 makes a reference to a table 27 for a Groebner basis construction of FIG. 7, and retrieves a record, of which the value of the order field is said value $d_3=6$, and in which a vector of which the components that correspond to all component numbers described in the component number list field are all zero does not lie in said plurality of said vectors $m_1=(28,132,31,271,469,166,1,0,0,0)$, $m_2=(856,618,747,909,132,636,0,1,0,0)$, $m_3=(652,322,240,978,826,846,0,0,1,0)$, and $m_4=(333,346,980,935,824,614,0,0,0,1)$. The value of the order field of a first record is 6, and a vector, of which the component number lists 7, 8, 9, and 10 of the first record are all zero, does not lie in the vectors $m_1$, $m_2$, $m_3$, and $m_4$, whereby the first record is obtained as a retrieval result Furthermore, the value of a first vector type of the first record is (*,*,*,*,*,*,1,0,0,0)(A code * is interpreted as representing any number), which coincides with the vector $m_1=(28,132,31,271,469,166,1,0,0,0)$, whereby the vector $m_1$ is regarded as a column of the coefficient of each monomial of the monomial order 1, X, Y, $X^2$, XY, $Y^2$, $X^3$, $X^2Y$, $XY^2$, and $X^4$ of the algebraic curve parameter file A to generate a polynomial $f_1=28+132X+31Y+271X^2+469XY+166Y^2+X^3$ Similarly, the value of a second vector type of the first record is (*,*,*,*,*,*,0,1,0,0)(A code * is interpreted as representing any number), which coincides with the vector $m_2=(856,618,747,909,132,636,0,1,0,0)$, whereby the vector $m_2$ is regarded as a column of the coefficient of each monomial of the monomial order 1, X, Y, $X^2$, XY, $Y^2$, $X^3$, $X^2Y$, $XY^2$, and $X^4$ of the algebraic curve parameter file A to generate a polynomial $f_2=856+618X+747Y+909X^2+132XY+636Y^2+X^2Y$.

Similarly, the value of a third vector type of the first record is (*,*,*,*,*,*,0,0,1,0)(A code * is interpreted as representing any number), which coincides with the vector $m_3=(652,322,240,978,826,846,0,0,1,0)$, whereby the vector $m_3$ is regarded as a column of the coefficient of each monomial of the monomial order 1, X, Y, $X^2$, XY, $Y^2$, $X^3$, $X^2Y$, $XY^2$, and $X^4$ of the algebraic curve parameter file A to generate a polynomial $f_3=652+322X+240Y+978X^2+826XY+846Y^2+XY^2$. Finally, the ideal composition section 11 constructs a set $J=\{f_1,f_2,f_3\}$ of the polynomial to output it. Above, the operation of the ideal composition section 11 is finished.

Next, the first ideal reduction section 12, which takes as an input the algebraic curve parameter file A of FIG. 4, and the Groebner basis $J=\{28+132X+31Y+271X^2+469XY+166Y^2+X^3, 856+618X+747Y+909X^2+132XY+636Y^2+X^2Y, 652+322X+240Y+978X^2+826XY+846Y^2+XY^2\}$ that the ideal composition section 11 output, operates as follows according to a flow of the process of the functional block shown in FIG. 3.

At first, the ideal reduction section 12 makes a reference to an ideal type table 35 of FIG. 5 in an ideal type classification section 31 of FIG. 3, retrieves a record in which the ideal type described in the ideal type field accords with the type of the input ideal J for obtaining a first record, and acquires a value N=61 of the ideal type number field and a value d=3 of the reduction order field of the first record. Next, the ideal reduction section 12 confirms that said value d=3 is not zero, makes a reference to a monomial list table 36 in a polynomial vector generation section 32, retrieves a record of which the value of the order field is said d=3 for obtaining a fourth record, and acquires a list 1, X, Y, $X^2$, XY, $Y^2$, and $X^3$ of the monomial described in the monomial list field of the fourth record.

Furthermore, the ideal reduction section 12 acquires a first element $f=28+132X+31Y+271X^2+469XY+166Y^2+X^3$, a second element $g=856+618X+747Y+909X^2+132XY+636Y^2+X^2Y$, and a third element $h=652+322X+240Y+978X^2+826XY+846Y^2+XY^2$ of J in the polynomial vector generation section 32, regards a coefficient list 0, 7, 0, 0, 0, 0, 0, 0, 0, 1, and 1 of the algebraic curve parameter file A as a column of the coefficient of each monomial of the monomial order 1, X, Y, $X^2$, XY, $Y^2$, $X^3$, $X^2Y$, $XY^2$, $X^4$, and $Y^3$ of the algebraic curve parameter file A, and generates a defining polynomial $F=Y^3+X^4+7X$.

Next, for each $M_i (1<=i<=7)$ in said list 1, X, Y, $X^2$, XY, $Y^2$, and $X^3$ of said monomial, the ideal reduction section 12 calculates a remainder equation $r_i$ of a product $M_i \cdot g$ of $M_i$ and the polynomial g by the polynomials f and F in the polynomial vector generation section 32, arranges its coefficients in order of the monomial order 1, X, Y, ... of the algebraic curve parameter file A, and generates a vector $w^{(i)}_1$. Furthermore, the ideal reduction section 12 calculates a remainder equation si of a product $M_i \cdot h$ of M and the polynomial h by the polynomials f and F, arranges its coefficient in order of the monomial order 1, X, Y, ... of the algebraic curve parameter file A, and generates a vector $w^{(i)}_2$, and connects the above-mentioned two vectors $w^{(i)}_1$ and $w^{(i)}_2$ for generating a vector $v_i$.

That is, at first, for a first monomial $M_1=1$, divide $1 \cdot g = 856+618X+747Y+909X^2+132XY+636Y^2+X^2Y$ by $f=28+132X+31Y+271X^2+469XY+166Y^2+X^3$ and $F=Y^3+X^4+7X$: then $g=0 \cdot f+0 \cdot F+856+618X+747Y+909X^2+132XY+636Y^2+X^2Y$, whereby a remainder $856+618X+747Y+909X^2+132XY+636Y^2+X^2Y$ is obtained to generate a vector $w^{(i)}=(856,618,747,909,132,636,1,0,0)$.

Also, divide $1 \cdot h=652+322X+240Y+978X^2+826XY+846Y^2+XY^2$ by $f=28+132X+31Y+271X^2+469XY+166Y^2+X^3$ and $F=Y^3+X^4+7X$: then $h=0 \cdot f+0 \cdot F+652+322X+240Y+978X^2+826XY+846Y^2+XY^2$, whereby a remainder $652+322X+240Y+978X^2+826XY+846Y^2+XY^2$ is obtained to generate a vector $w^{(i)}_2=(652,322,240,978,826,846,0,1,0)$. And, the vectors $w^{(1)}_1$ and $w^{(1)}_2$ are connected to obtain a vector $v_1=(856,618,747,909,132,636,1,0,0,652,322,240,978,826,846,0,1,0)$.

Next, for a second monomial $M_2=X$, divide $Xg=X(856+618X+747Y+909X^2+132XY+636Y^2+X^2Y)$ by $f=28+132X+31Y+271X^2+469XY+166Y^2+X$ and $F=Y^3+X^4+7X$: then $Xg=(319+166Y+Y)f+843F+149+667X+220X^2+173Y+235XY+709X^2Y+492Y^2+863XY^2$, whereby a remainder $149+667X+220X^2+173Y+235XY+709X^2Y+492Y^2+863XY^2$ is obtained to generate a vector $w^{(2)}_1=(149,667,173,220,235,492,709,863,0)$.

Also, divide $Xh=X(652+322X+240Y+978X^2+826XY+846Y^2+XY^2)$ by $f=28+132X+31Y+271X^2+469XY+166Y^2+X^3$ and $F=Y^3+X^4+7X$: $Xh=978f+0 \cdot F+868+708X+651X^2+961Y+653XY+826X^2Y+101Y^{2+846}XY^2+X^2Y^2$, whereby a remainder $868+708X+651X^2+961Y+653XY+826X^2Y+101Y^{2+846}XY^2+X^2Y^2$ is obtained to generate a vector $w^{(2)}_2=(868,708,961,651,653,101,826,846,1)$. And, the vectors $w^{(2)}_1$ and $w^{(2)}_2$ are connected to obtain a vector $v_2=(149,667,173,220,235,492,709,863,0,868,708,961,651,653,101,826,846,1)$.

Next, for a third monomial $M_3=Y$, divide $Yg=Y(856+618X+747Y+909X^2+132XY+636Y^2+X^2Y)$ by $f=28+132X+31Y+271X^2+469XY+166Y^2+X^3$ and $F=Y^3+X^4+7X$: $Yg=(826+373X)f+636F+79+179X+357X^2+475Y+216XY+529X^2Y+855Y^2+772XY^2+X^2Y^2$, whereby a remainder $79+179X+357X^2+475Y+216XY+529X^2Y+855Y^2+772XY^2+X^2Y^2$ is obtained to generate a vector $w^{(3)}_1=(79,179,475,357,216,855,529,772,1)$.

Also, divide $Yh=Y(652+322X+240Y+978X^2+826XY+846Y^2+XY^2)$ by $f=28+132X+31Y+271X^2+469XY+166Y^2+X^3$ and $F=Y^3+X^4+7X$: then $Yh=(327+595X+1008X^2+469Y)f+(685+X)F+934+966X+358X^2+590Y+694XY+473X^2Y+31Y^2+939XY^2+166X^2Y^2$ whereby a remainder $934+966X+358X^2+590Y+694XY+473X^2Y+31Y^2+939XY^2+166X^2Y^2$ is obtained to generate a vector $w^{(3)}_2=(934,966,590,358,694,31,473,939,166)$. And, the vectors $w^{(3)}_1$ and $w^{(3)}_2$ are connected to obtain a vector $v_3=(79,179,475,357,216,855,529,772,1,934,966,590,358,694,3 1,473,939,166)$.

Next, for a fourth monomial $M_4=X^2$, divide $X^2g=X^2(856+618X+747Y+909X^2+132XY+636Y^2+X^2Y)$ by $f=28+132X+31Y+271X^2+469XY+166Y^2+X^3$ and $F=Y^3+X^4+7X$: then $X^2g=(645+969X+166X^2+709Y+XY)f+(359+843X)F+102+241X+394X^2513Y+647XY+683X^2Y+103Y^2+1004XY^2+863X^2Y^2$, whereby a remainder $102+241X+394X^2+513Y+647XY+683X^2Y+103Y^2+1004XY^2+863X^2Y^2$ is obtained to generate a vector $w^{(4)}_1=(102,241,513,394,647,103,683,1004,863)$.

Also, divide $X^2h=X^2(652+322X+240Y+978X^2+826XY+846Y^2+XY^2)$ by $f=28+132X+31Y+271X^2+469XY+166Y^2+X^3$ and $F=Y^3+X^4+7X$: then $X^2h=(725+16X+782X^2+754Y+166XY+Y^2)f+(930+227X+843Y)F+889+260X+560X^2+809Y+425XY+552X^2Y+535Y^2+671XY^2+763X^2Y^2$, whereby a remainder $889+260X+560X^2+809Y+425XY+552X^2Y+535Y^2+671XY^2+763X^2Y^2$ is obtained to generate a vector $w^{(4)}_2=(889,260,809,560,425,535,552,671,763)$. And, the vectors $w^{(4)}_1$ and $w^{(4)}_2$ are connected to obtain a vector $v_4=(102,241,513,394,647,103,683,1004,863,889,260,809,560,425,535,552,671,763)$.

Next, for a fifth monomial $M_5=XY$, divide $XYg=XY(856+618X+747Y+909X^2+132XY+636Y^2+X^2Y)$ by $f=28+132X+31Y+271X^2+469XY+166Y^2+X$ and $F=Y^3+X^4+7X$: then $XYg=(95+3X+146X^2+457Y+166XY+Y^2)f+(791+863X+843Y)F+367+X+54X^2+403Y+361XY+276X^2Y+305Y^2+600XY^2+689X^2Y^2$, whereby a remainder $367+X+54X^2+403Y+361XY+276X^2Y+305Y^2+600XY^2+689X^2Y^2$ is obtained to generate a vector $w^{(5)}_1=(367,1,403,54,361,305,276,600,689)$.

Also, divide $XYh=XY(652+322X+240Y+978X^2+826XY+846Y^2+XY^2)$ by $f=28+132X+31Y+271X^2+469XY+166Y^2+X^3$ and $F=Y^3+X^4+7X$: then $XYh=(804+648X+246X^2+1008X^3+629Y+782XY+166Y^2)f+(421+25X+X^2+696Y)F+695+924X+28\ 9X^2+851Y+210XY+321X^2Y+802Y^2+522XY^2+278X^2Y^2$, whereby a remainder $695+924X+289X^2+851Y+210XY+321X^2Y+802Y^2+522XY^2+278X^2Y^2$ is obtained to generate a vector $w^{(5)}_2=(695,924,851,289,210,802,321,522,278)$. And, the vectors $w^{(5)}_1$ and $w^{(5)}_2$ are connected to obtain a vector $v_5=(367,1,403,54,361,305,276,600,689,695,924,851,289,210,802,321,522,278)$.

Next, for a sixth monomial $M_6=Y^2$, divide $Y^2g=Y^2(856+618X+747Y+909X^2+132XY+636Y^2+X^2Y)$ by $f=28+132X+31Y+271X^2+469XY+166Y^2+X^3$ and $F=Y^3+X^4+7X$: then $Y^2g=(687+214X+320X^2+1008X^3+77Y+146XY+166Y^2)f+(981+960X+X^2+323Y)F+944+384X+956X^2+763Y+737XY+925X^2Y+859Y^2+416XY^2+814X^2Y^2$, whereby a remainder $944+384X+956X^2+763Y+737XY+925X^2Y+859Y^2+416XY^2+814X^2Y^2$ is obtained to generate a vector $w^{(6)}_1=(944,384,763,956,737,859,925,416,814)$.

Also, divide $Y^2h=Y^2(652+322X+240Y+978X^2+826XY+846Y^2+XY^2)$ by $f=28+132X+31Y+271X^2+469XY+166Y^2+X^3$ and $F=Y^3+X^4+7X$: then $Y^2h=(260+17X+731X^2+843X^3+382Y+246XY+1008X^2Y+782Y^2)f(369+868X+166X^2+186Y+XY)F+792+963X+643X^2+415Y+539XY+887X^2Y+438Y^2+102XY^2+363X^2Y^2$, whereby a remainder $792+963X+643X^2+415Y+539XY+887X^2Y+438Y^2+102XY^2+363X^2Y^2$ is obtained to generate a vector $w^{(6)}_2=(792,963,415,643,539,438,887,102,363)$. And, the vectors $w^{(6)}_1$ and $w^{(6)}_2$ are connected to obtain a vector $v_6=(944,384,763,956,737,859,925,416,814,792,963,415,643,539,438,887,102,363)$.

Finally, for a seventh monomial $M_7=X^3$, divide $X^3g=X^3(856+618X+747Y+909X^2+132XY+636Y^2+X^2Y)$ by $f=28+132X+31Y+271X^2+469XY+166Y^2+X^3$ and $F=Y^3+X^4+7X$: then $X^3g=(323+583X+814X^2+166X^3+96Y+689XY+X^2Y+863Y^2)f+(698+514X+843X^2+20Y)\ F+37+730X+831X^2+416Y+136XY+55X^2Y+971Y^2+398XY^2+5X^2Y^2$, whereby a remainder $37+730X+831X^2+416Y+136XY+55X^2Y+971Y^2+398XY^2+5X^2Y^2$ is obtained to generate a vector $w^{(7)}_1=(37,730,416,831,136,971,55,398,5)$.

Also, divide $X^3h=X^3(652+322X+240Y+978X^2+826XY+846Y^2+XY^2)$ by $f=28+132X+31Y+271X^2+469XY+166Y^2+X^3$ and $F=Y^3+X^4+7X$: then $X^3h=(449+750X+363X^2+782X^3+102Y+278XY+166X^2Y+763Y^2+XY^2)f+(784+583X+227X^2+476Y+843XY)F+545+9X+173X^2+378Y+902XY+16X^2Y+831Y^2+820XY^2+909X^2Y^2$, whereby a remainder $545+9X+173X^2+378Y+902XY+16X^2Y+831Y^2+820XY^2+909X^2Y^2$ is obtained to generate a vector $w^{(7)}_2=(545,9,378,173,902,831,16,820,909)$. And, the vectors $w^{(7)}_1$ and $w^{(7)}_2$ are connected to obtain a vector $v_7=(37,730,416,831,136,971,55,398,5,545,9,378,173,902,831, 16,820,909)$.

Above, the process of the first ideal reduction section 12 in the polynomial vector generation section 32 is finished.

Next, in a basis construction section 33, the first ideal reduction section 12 inputs seven 18-dimensional vectors $v_1$, $v_2$, $v_3$, $v_4$, $v_5$, $v_6$, and $v_7$, generated in the polynomial vector generation section 32 into a linear-relation derivation section 34, and obtains a plurality of seven-dimensional vectors $m_1$, $m_2$, ... as an output. The linear-relation derivation section 34 derives a linear relation of the vectors, which were input, employing a discharging method. The discharging method belongs to a known art, whereby as to an operation of the linear-relation derivation section 34, only its outline is shown below.

The linear-relation derivation section 34 firstly arranges the seven 18-dimensional vectors $v_1$, $v_2$, $v_3$, $v_4$, $v_5$, $v_6$, and $v_7$, which were input, in order for constructing a 7×18 matrix $$M_R = \begin{pmatrix} 856 & 618 & 747 & 909 & 132 & 636 & 1 & 0 & 0 & 652 & 322 & 240 & 978 & 826 & 846 & 0 & 1 & 0 \\ 149 & 667 & 173 & 220 & 235 & 492 & 709 & 863 & 0 & 868 & 708 & 961 & 651 & 653 & 101 & 826 & 846 & 1 \\ 79 & 179 & 475 & 357 & 216 & 855 & 529 & 772 & 1 & 934 & 966 & 590 & 358 & 694 & 31 & 473 & 939 & 166 \\ 102 & 241 & 513 & 394 & 647 & 103 & 683 & 1004 & 863 & 889 & 260 & 809 & 560 & 425 & 535 & 552 & 671 & 763 \\ 367 & 1 & 403 & 54 & 361 & 305 & 276 & 600 & 689 & 695 & 924 & 851 & 289 & 210 & 802 & 321 & 522 & 278 \\ 944 & 384 & 763 & 956 & 737 & 859 & 925 & 416 & 814 & 792 & 963 & 415 & 643 & 539 & 438 & 887 & 102 & 363 \\ 37 & 730 & 416 & 831 & 136 & 971 & 55 & 398 & 5 & 545 & 9 & 378 & 173 & 902 & 831 & 16 & 820 & 909 \end{pmatrix}$$

[EQ. 14]

Next, the linear-relation derivation section 34 connects a seventh-dimensional unity matrix to the matrix $M_R$ to construct $$M'_R = \begin{pmatrix} 856 & 618 & 747 & 909 & 132 & 636 & 1 & 0 & 0 & 652 & 322 & 240 & 978 & 826 & 846 & 0 & 1 & 0 & 1 & 0 & 0 & 0 & 0 & 0 & 0 \\ 149 & 667 & 173 & 220 & 235 & 492 & 709 & 863 & 0 & 868 & 708 & 961 & 651 & 653 & 101 & 826 & 846 & 1 & 0 & 1 & 0 & 0 & 0 & 0 & 0 \\ 79 & 179 & 475 & 357 & 216 & 855 & 529 & 772 & 1 & 934 & 966 & 590 & 358 & 694 & 31 & 473 & 939 & 166 & 0 & 0 & 1 & 0 & 0 & 0 & 0 \\ 102 & 241 & 513 & 394 & 647 & 103 & 683 & 1004 & 863 & 889 & 260 & 809 & 560 & 425 & 535 & 552 & 671 & 763 & 0 & 0 & 0 & 1 & 0 & 0 & 0 \\ 367 & 1 & 403 & 54 & 361 & 305 & 276 & 600 & 689 & 695 & 924 & 851 & 289 & 210 & 802 & 321 & 522 & 278 & 0 & 0 & 0 & 0 & 1 & 0 & 0 \\ 944 & 384 & 763 & 956 & 737 & 859 & 925 & 416 & 814 & 792 & 963 & 415 & 643 & 539 & 438 & 887 & 102 & 363 & 0 & 0 & 0 & 0 & 0 & 1 & 0 \\ 37 & 730 & 416 & 831 & 136 & 971 & 55 & 398 & 5 & 545 & 9 & 378 & 173 & 902 & 831 & 16 & 820 & 909 & 0 & 0 & 0 & 0 & 0 & 0 & 1 \end{pmatrix}$$

[EQ. 15]

Next, the linear-relation derivation section 34 triangulates a matrix $M'_R$ by adding a constant multiple of an i-th row to an (i+1)-th row (i=1,2,and 3) to a seventh row to obtain the following matrix m.

$$m = \begin{pmatrix} 856 & 618 & 747 & 909 & 132 & 636 & 1 & 0 & 0 & 652 & 322 & 240 & 978 & 826 & 846 & 0 & 1 & 0 & 1 & 0 & 0 & 0 & 0 & 0 & 0 \\ 0 & 62 & 485 & 393 & 47 & 320 & 677 & 863 & 0 & 184 & 494 & 344 & 634 & 455 & 272 & 826 & 814 & 1 & 977 & 1 & 0 & 0 & 0 & 0 & 0 \\ 0 & 0 & 252 & 630 & 861 & 845 & 645 & 389 & 1 & 380 & 422 & 1006 & 632 & 736 & 748 & 221 & 979 & 217 & 281 & 51 & 1 & 0 & 0 & 0 & 0 \\ 0 & 0 & 0 & 0 & 0 & 0 & 0 & 0 & 0 & 0 & 0 & 0 & 0 & 0 & 0 & 0 & 0 & 0 & 982 & 226 & 146 & 1 & 0 & 0 & 0 \\ 0 & 0 & 0 & 0 & 0 & 0 & 0 & 0 & 0 & 0 & 0 & 0 & 0 & 0 & 0 & 0 & 0 & 0 & 449 & 79 & 320 & 0 & 1 & 0 & 0 \\ 0 & 0 & 0 & 0 & 0 & 0 & 0 & 0 & 0 & 0 & 0 & 0 & 0 & 0 & 0 & 0 & 0 & 0 & 544 & 564 & 195 & 0 & 0 & 1 & 0 \\ 0 & 0 & 0 & 0 & 0 & 0 & 0 & 0 & 0 & 0 & 0 & 0 & 0 & 0 & 0 & 0 & 0 & 0 & 79 & 930 & 1004 & 0 & 0 & 0 & 1 \end{pmatrix}$$

[EQ. 16]

As well known, the vector that is composed of a nineteenth component and afterward of a fourth row to a seventh row of the matrix m is a vector $\{(m_{1,1}, m_{1,2}, \ldots, m_{1,7}), (m_{2,1}, m_{2,2}, \ldots, m_{2,7}), \ldots\}$ representing a linearly-independent linear dependence relation $\Sigma_i^7 m_{ji} v_i = 0 (j=1, 2 \ldots)$ of all of the seven 18-dimensional vectors $v_1$, $v_2$, $v_3$, $v_4$, $v_5$, $v_6$, and $v_7$ that were input. The linear-relation derivation section 34 outputs a vector $m_1 = (982,226,146,1,0,0,0)$ that is composed of the nineteenth component and afterward of the fourth row of the matrix m, a vector $m_2 = (449,79,320,0,1,0,0)$ that is composed of the nineteenth component and afterward of the fifth row of the matrix m, and a vector $m_3 = (544,564,195,0,0,1,0)$ that is composed of the nineteenth component and afterward of the sixth row of the matrix m, and a vector $m_4 = (79,930,1004,0,0,0,1)$ that is composed of the nineteenth component and afterward of the seventh row of the matrix m.

Now return to the explanation of the process of the first ideal reduction section 12 in the basis construction section 33. Next, this ideal reduction section 12 makes a reference to a table 37 for a Groebner basis construction of FIG. 7, and retrieves a record, of which the value of the order field is said value d=3, and in which a vector of which the components that correspond to all component numbers described in the component number list field are all zero does not lie in said plurality of said vectors $m_1 = (982,226,146,1,0,0,0)$, $m_2 = (449,79,320,0,1,0,0)$, $m_3 = (544,564,195,0,0,1,0)$, and $m_4 = (79,930,1004,0,0,0,1)$. The value of the order field of a fourteenth record is 3, and a vector, of which the components that correspond to the component number lists 4, 5, 6, and 7 of the fourteenth record are all zero, does not lie in the vectors $m_1$, $m_2$, $m_3$, and $m_4$, whereby the fourteenth record is obtained as a retrieval result.

Furthermore, the value of the first vector type of the fourteenth record is (*,*,*,1,0,0,0)(A code * is interpreted as representing any number), which coincides with the vector $m_1=(982,226,146,1,0,0,0)$, whereby the vector $m_1$ is regarded as a column of the coefficient of each monomial of the monomial order 1, X, Y, $X^2$, XY, $Y^2$, and $X^3$ of the algebraic curve parameter file A to generate a polynomial $f_1=982+226X+146Y+X^2$.

Similarly, the value of the second vector type of the fourteenth record is (*,*,*,0,1,0,0) (A code * is interpreted as representing any number), which coincides with the vector $m_2=(449,79,320,0,1,0,0)$, whereby the vector $m_2$ is regarded as a column of the coefficient of each monomial of the monomial order 1, X, Y, $X^2$, XY, $Y^2$, and $X^3$ of the algebraic curve parameter file A to generate a polynomial $f_2=449+79X+320Y+XY$.

Similarly, the value of the third vector type of the fourteen record is (*,*,*,0,0,1,0)(A code * is interpreted as representing any number), which coincides with the vector $m_3=(544,564,195,0,0,1,0)$, whereby the vector $m_3$ is regarded as a column of the coefficient of each monomial of the monomial order 1, X, Y, $X^2$, XY, $Y^2$, and $X^3$ of the algebraic curve parameter file A to generate a polynomial $f_3=544+564X+195Y+Y^2$.

Finally, the ideal reduction section 12 constructs a set $J^*=\{f_1=982+226X+146Y+X^2, f_2=449+79X+320Y+XY, f_3=544+564X+195Y+Y^2\}$ of the polynomial to output it. Above, the operation of the first ideal reduction section 12 is finished.

Next, a second ideal reduction section 13, which takes as an input the algebraic curve parameter file A 30 of FIG. 4, and the Groebner basis $J^*=\{982+226X+146Y+X^2, 449+79X+320Y+XY, 544+564X+195Y^2\}$ that the first ideal reduction section 12 output, operates as follows according to a flow of the process of the functional block shown in FIG. 3. At first, in the ideal type classification section 31 of FIG. 3, the second ideal reduction section 13 makes a reference to the ideal type table 35 of FIG. 5, retrieves a record in which the ideal type described in the ideal type field accords with the type of the input ideal $J^*$ for obtaining a fourteenth record, and acquires a value N=31 of the ideal type number field and a value d=3 of the reduction order field of the fourteenth record.

Next, the ideal reduction section 13 confirms that said value d=3 is not zero, makes a reference to the monomial list table 36 in the polynomial vector generation section 32, retrieves a record of which the value of the order field is said d=3 for obtaining a fourth record, and acquires a list 1, X, Y, $X^2$, XY, $Y^2$, and $X^3$ of the monomial described in the monomial list field of the fourth record.

Furthermore, the ideal reduction section 13 acquires a first element $f=982+226X+146Y+X^2$, a second element $g=449+79X+320Y+XY$, and a third element $h=544+564X+195Y+Y^2$ of $J^*$, regards a coefficient list 0,7,0,0,0,0,0,0,0,1,1 of the algebraic curve parameter file A as a column of the coefficient of each monomial of the monomial order 1, X, Y, $X^2$, XY, $Y^2$, $X^3$, $X^2Y$, $XY^2$, $X^4$, and $Y^3$ of the algebraic curve parameter file A, and generates a defining polynomial $F=Y^3+X^4+7X$.

Next, for each of $M_i(1<=i<=7)$ in said list 1, X, Y, $X^2$, XY, $Y^2$, and $X^3$ of said monomial, the ideal reduction section 13 calculates a remainder equation $r_i$ of a product $M_i \cdot g$ of $M_i$ and the polynomial g by the polynomials f and F, arranges its coefficients in order of the monomial order 1, X, Y, . . . of the algebraic curve parameter file A, and generates a vector $w^{(i)}_1$. Furthermore, the ideal reduction section 13 calculates a remainder equation $s_i$ of a product $M_i \cdot h$ of $M_i$ and the polynomial h by the polynomials f and F, arranges its coefficients in order of the monomial order 1, X, Y, . . . of the algebraic curve parameter file A, and generates a vector $w^{(i)}_2$, and connects the above-mentioned two vectors $w^{(i)}_1$ and $w^{(i)}_2$ for generating a vector $v_i$.

That is, at first, for a first monomial $M_1=1$, divide $1 \cdot g=449+79X+320Y+XY$ by $f=982+226X+146Y+X^2$ and $F=Y^3+X^4+7X$, :then $g=0 \cdot f+0 \cdot F+449+79X+320Y+XY$, whereby a remainder $449+79X+320Y+XY$ is obtained to generate a vector $w^{(1)}_1=(449,79,320,1,0,0)$. Also, divide $1 \cdot h=544+564X+195Y+Y^2$ by $f=982+226X+146Y+X^2$ and $F=Y^3+X^4+7X$: then $h=0 \cdot f+0 \cdot F+544+564X+195Y+Y^2$, whereby a remainder $544+564X+195Y+Y^2$ is obtained to generate a vector $w^{(1)}_2=(544,564,195,0,1,0)$. And, the vectors $w^{(1)}_1$ and $w^{(1)}_2$ are connected to obtain a vector $v_1=(449,79,320,1,0,0,544,564,195,0,1,0)$.

Next, for a second monomial $M_2=X$, divide $Xg=X(449+79X+320Y+XY)$ by $f=982+226X+146Y+X^2$ and $F=Y^3+X^4+7X$: then $Xg=(79+Y)f+0 \cdot F+115+757X+601Y+94XY+863Y^2$, whereby a remainder $115+757X+601Y+94XY+863Y^2$ is obtained to generate a vector $w^{(2)}_1=(115,757,601,94,863,0)$.

Also, divide $Xh=X(544+564X+195Y+Y^2)$ by $f=982+226X+146Y+X^2$ and $F=Y^3+X^4+7X$: then $Xh=564f+0 \cdot F+93+214X+394Y+195XY+XY^2$, whereby a remainder $93+214X+394Y+195XY+XY^2$ is obtained to generate a vector $w^{(2)}_2=(93,214,394,195,0,1)$. And, the vectors $w^{(2)}_1$ and $w^{(2)}_2$ are connected to obtain a vector $v_2=(115,757,601,94,863,0,93,214,394,195,0,1)$.

Next, for a third monomial $M_3=Y$, divide $Yg=Y(449+79X+320Y+XY)$ by $f=982+226X+146Y+X^2$ and $F=Y^3+X^4+7X$: then $Yg=0 \cdot f+0 \cdot F+449Y+79XY+320Y^2+XY^2$, whereby a remainder $449Y+79XY+320Y^2+XY^2$ is obtained to generate a vector $w^{(3)}_1=(0,0,449,79,320,1)$.

Also, divide $Yh=Y(544+564X+195Y+Y^2)$ by $f=982+226X+146Y+X^2$ and $F=Y^3+X^4+7X$: then $Yh=(356+226X+1008X^2+146Y)f+1 \cdot F+531+305X+942Y+157XY+68Y^2$, whereby a remainder $531+305X+942Y+157XY+68Y^2$ is obtained to generate a vector $w^{(3)}_2=(531,305,942,157,68,0)$. And, the vectors $w^{(3)}_1$ and $w^{(3)}_2$ are connected to obtain a vector $v_3=(0,0,449,79,320,1,531,305,942,157,68,0)$.

Next, for a fourth monomial $M_4=X^2$, divide $X^2g=X^2(449+79X+320Y+XY)$ by $f=982+226X+146Y+X^2$ and $F=Y^3+X^4+7X$: then $X^2g=(757+79X+94Y+XY)f+0 \cdot F+259+563X+988Y+546XY+402Y^2+863XY^2$, whereby a remainder $259+563X+988Y+546XY+402Y^2+863XY^2$ is obtained to generate a vector $w^{(4)}_1=(259,563,988,546,402,863)$.

Also, divide $X^2h=X^2(544+564X+195Y+Y^2)$ by $f=982+226X+146Y+X^2$ and $F=Y^3+X^4+7X$: then $X^2h=(706+865X+146X^2+68Y+Y^2)f+863F+900+27X+669Y+611XY+189Y^2+783XY^2$, whereby a remainder $900+27X+669Y+611XY+189Y^2+783XY^2$ is obtained to generate a vector $w^{(4)}_2=(900,27,669,611,189,783)$. And, the vectors $w^{(4)}_1$ and $w^{(4)}_2$ are connected to obtain a vector $v_4=(259,563,988,546,402,863,900,27,669,611,189,783)$.

Next, for a fifth monomial $M_5=XY$, divide $XYg=XY(449+79X+320Y+XY)$ by $f=982+226X+146Y+X^2$ and $F=Y^3+X^4+7X$: then $XYg=(492+301X+146X^2+961Y+Y^2)f+863F+167+875X+529Y+648XY+981Y^2+94XY^2$ whereby a remainder $167+875X+529Y+648XY+981Y^2+94XY^2$ is obtained to generate a vector $w^{(5)}_1=(167,875,529,648,981,94)$. Also, divide $XYh=XY(544+564X+195Y+Y^2)$ by $f=982+226X+146Y+X^2$ and $F=Y^3+X^4+7X$: then $XYh=(305+356X+226X^2+1008X^3+157Y+146XY)f+XF+163+213X+213X+69Y+775XY+285Y^2+68XY^2$, whereby a remainder $163+213X+69Y+775XY+285Y^2+68XY^2$ is obtained to generate a vector $w^{(5)}_2=(163,213,69,775,285,$ 68). And, the vectors $w^{(5)}_1$ and $w^{(5)}_2$ are connected to obtain a vector $v_5=(167,875,529,648,981,94,163,213,69,775,285,68)$.

Next, for a sixth monomial $M_6=Y^2$, divide $Y^2g=Y^2(449+79X+320Y+XY)$ by $f=982+226X+146Y+X^2$ and $F=Y^3+X^4+7X$: then $Y^2g=(208+28X+915X^2+1008X^3+908Y+146XY)f+(320+X)F+571+949X+202Y+482XY+60Y^2+961XY^2$, whereby a remainder $571+949X+202Y+482XY+60Y^2+961XY^2$ is obtained to generate a vector $w^{(6)}_1=(571,949,202,482,60,961)$.

Also, divide $Y^2h=Y^2(544+564X+195Y+Y^2)$ by $f=982+226X+146Y+X^2$ and $F=Y^3+X^4+7X$: then $Y^2h=(1001+233X+941X^2+194Y+226XY+1008X^2Y+146Y^2)f+(68+Y)F+793+560X+352Y+881XY+378Y^2+157XY^2$, whereby a remainder $793+560X+352Y+881XY+378Y2+157XY^2$ is obtained to generate a vector $w^{(6)}_2=(793,560,352,881,378,157)$. And, the vectors $w^{(6)}_1$ and $w^{(6)}_2$ are connected to obtain a vector $v_6=(571,949,202,482,60,961,793,560,352,881,378,157)$.

Finally, for a seventh monomial $M_7=X^3$, divide $X^3g=X^3(449+79X+320Y+XY)$ by $f=982+226X+146Y+X^2$ and $F=Y^3+X^4+7X$: then $X^3g=(370+198X+961X^2+926Y+94XY+X^2Y+863Y^2)$ $f+127F+909+548X+243Y+460XY+104Y^2+101XY^2$, whereby a remainder $909+548X+243Y+460XY+104Y^2+101XY^2$ is obtained to generate a vector $w^{(7)}_1=(909,548,243,460,104,101)$.

Also, divide $X^3h=X^3(544+564X+195Y+Y^2)$ by $f=982+226X+146Y+X^2$ and $F=Y^3+X^4+7X$: then $X^3h=(834+283X+157X^2+146X^3+52Y+68XY+783Y^2+XY^2)f+(708+863X)F+320+866X+720Y+225XY+432Y^2+815XY^2$, whereby a remainder $320+866X+720Y+225XY+432Y^2+815XY^2$ is obtained to generate a vector $w^{(7)}_2=(320,866,720,225,432,815)$. And, the vectors $w^{(7)}_1$ and $w^{(7)}_2$ are connected to obtain a vector $v_7=(909,548,243,460,104,101,320,866,720,225,432,815)$. Above, the process of the second ideal reduction section 13 reduction section 13 in the polynomial vector generation section 32 is finished.

Next, in the basis construction section 33, the second ideal reduction section 13 inputs seven 12-dimensional vectors $v_1$, $v_2$, $v_3$, $v_4$, $v_5$, $v_6$, and $v_7$ generated in the polynomial vector generation section 32 into the linear-relation derivation section 34, and obtains a plurality of seven-dimensional vectors $m_1, m_2, \ldots$ as an output. The linear-relation derivation section 34 derives a linear relation of the vectors, which were input, employing a discharging method. The discharging method belongs to a known art, whereby as to an operation of the linear-relation derivation section 34, only its outline is shown below.

The linear-relation derivation section 34 firstly arranges the seven 12-dimensional vectors $v_1$, $v_2$, $v_3$, $v_4$, $v_5$, $v_6$, and $v_7$, which were input, in order for constructing a 7×12 matrix $$M_R = \begin{pmatrix} 449 & 79 & 320 & 1 & 0 & 0 & 544 & 564 & 195 & 0 & 1 & 0 \\ 115 & 757 & 601 & 94 & 863 & 0 & 93 & 214 & 394 & 195 & 0 & 1 \\ 0 & 0 & 449 & 79 & 320 & 1 & 531 & 305 & 942 & 157 & 68 & 0 \\ 259 & 563 & 988 & 546 & 402 & 863 & 900 & 27 & 669 & 611 & 189 & 783 \\ 167 & 875 & 529 & 648 & 981 & 94 & 163 & 213 & 69 & 775 & 285 & 68 \\ 571 & 949 & 202 & 482 & 60 & 961 & 793 & 560 & 352 & 881 & 378 & 157 \\ 909 & 548 & 243 & 460 & 104 & 101 & 320 & 866 & 720 & 225 & 432 & 815 \end{pmatrix}$$ [EQ. 17]

Next, the linear-relation derivation section 34 connects a seventh-dimensional unity matrix to the matrix $M_R$ to construct $$M'_R = \begin{pmatrix} 449 & 79 & 320 & 1 & 0 & 0 & 544 & 564 & 195 & 0 & 1 & 0 & 1 & 0 & 0 & 0 & 0 & 0 & 0 \\ 115 & 757 & 601 & 94 & 863 & 0 & 93 & 214 & 394 & 195 & 0 & 1 & 0 & 1 & 0 & 0 & 0 & 0 & 0 \\ 0 & 0 & 449 & 79 & 320 & 1 & 531 & 305 & 942 & 157 & 68 & 0 & 0 & 0 & 1 & 0 & 0 & 0 & 0 \\ 259 & 563 & 988 & 546 & 402 & 863 & 900 & 27 & 669 & 611 & 189 & 783 & 0 & 0 & 0 & 1 & 0 & 0 & 0 \\ 167 & 875 & 529 & 648 & 981 & 94 & 163 & 213 & 69 & 775 & 285 & 68 & 0 & 0 & 0 & 0 & 1 & 0 & 0 \\ 571 & 949 & 202 & 482 & 60 & 961 & 793 & 560 & 352 & 881 & 378 & 157 & 0 & 0 & 0 & 0 & 0 & 1 & 0 \\ 909 & 548 & 243 & 460 & 104 & 101 & 320 & 866 & 720 & 225 & 432 & 815 & 0 & 0 & 0 & 0 & 0 & 0 & 1 \end{pmatrix}$$ [EQ. 18]

Next, the linear-relation derivation section 34 triangulates a matrix $M'_R$ by adding a constant multiple of an i-th row to an (i+1)-th row (i=1, 2, and 3) to a seventh row to obtain the following a matrix m.

$$m = \begin{pmatrix} 449 & 79 & 320 & 1 & 0 & 0 & 544 & 564 & 195 & 0 & 1 & 0 & 1 & 0 & 0 & 0 & 0 & 0 & 0 \\ 0 & 548 & 955 & 896 & 863 & 0 & 493 & 510 & 389 & 195 & 802 & 1 & 802 & 1 & 0 & 0 & 0 & 0 & 0 \\ 0 & 0 & 449 & 79 & 320 & 1 & 531 & 305 & 942 & 157 & 68 & 0 & 0 & 0 & 1 & 0 & 0 & 0 & 0 \\ 0 & 0 & 0 & 0 & 0 & 0 & 0 & 0 & 0 & 0 & 0 & 0 & 982 & 226 & 146 & 1 & 0 & 0 & 0 \\ 0 & 0 & 0 & 0 & 0 & 0 & 0 & 0 & 0 & 0 & 0 & 0 & 53 & 941 & 915 & 0 & 1 & 0 & 0 \\ 0 & 0 & 0 & 0 & 0 & 0 & 0 & 0 & 0 & 0 & 0 & 0 & 394 & 852 & 48 & 0 & 0 & 1 & 0 \\ 0 & 0 & 0 & 0 & 0 & 0 & 0 & 0 & 0 & 0 & 0 & 0 & 382 & 194 & 908 & 0 & 0 & 0 & 1 \end{pmatrix}$$ [EQ. 19]

As well known, the vector that is composed of a thirteenth component and afterward of a fourth row to a seventh row of the matrix m is a vector $\{(m_{1,1}, m_{1,2}, \ldots, m_{1,n}), (m_{2,1}, m_{2,2}, \ldots, m_{2,n}), \ldots\}$ representing a linearly-independent linear dependence relation $\Sigma_i^7 m_{ji}v_i=0 (j=1,2,\ldots)$ of all of the seven 12-dimensional vectors $v_1$, $v_2$, $v_3$, $v_4$, $v_5$, $v_6$, and $v_7$ that were input. The linear-relation derivation section 34 outputs a vector $m_1=(982,226,146,1,0,0,0)$ that is composed of the thirteenth component and afterward of the fourth row of the matrix m, a vector $m_2=(53,941,915,0,1,0,0)$ that is composed of the thirteenth component and afterward of the fifth row of the matrix m, and a vector $m_3=(394,852,48,0,0,1,0)$ that is composed of the thirteenth component and afterward of the sixth row of the matrix m, and a vector $m_4=(382,194,908,0,0,0,1)$ that is composed of the thirteenth component and afterward of the seventh row of the matrix m.

Now return to the explanation of the process of the second ideal reduction section 13 in the basis construction section 33. Next, the second ideal reduction section 13 makes a reference to a table 37 for a Groebner basis construction of FIG. 7, and retrieves a record, of which the value of the order field is said value d=3, and in which a vector of which the components that correspond to all component numbers described in the component number list field are all zero does not lie in said plurality of said vectors $m_1=(982,226,146,1,0,0,0)$, $m_2=(53,941,915,0,1,0,0)$, $m_3=(394,852,48,0,0,1,0)$, and $m_4=(382,194,908,0,0,0,1)$. The value of the order field of a fourteenth record is 3, and a vector, of which the component that correspond to the component number lists 4, 5, 6, and 7 of the fourteenth record are all zero, does not lie in the vectors $m_1$, $m_2$, $m_3$, and $m_4$, whereby the fourteenth record is obtained as a retrieval result.

Furthermore, the value of the first vector type of the fourteenth record is (\*,\*,\*,1,0,0,0)(A code \* is interpreted as representing any number), which coincides with the vector $m_1=(982,226,146,1,0,0,0)$, whereby the vector $m_1$ is regarded as a column of the coefficient of each monomial of the monomial order 1, X, Y, $X^2$, XY, $Y^2$, and $X^3$ of the algebraic curve parameter file A to generate a polynomial $f_1=982+226X+146Y+X^2$.

Similarly, the value of the second vector type of the fourteenth record is (\*,\*,\*,0,1,0,0) (A code \* is interpreted as representing any number), which coincides with the vector $m_2=(53,941,915,0,1,0,0)$, whereby the vector $m_2$ is regarded as a column of the coefficient of each monomial of the monomial order 1, X, Y, $X^2$, XY, $Y^2$, and $X^3$ of the algebraic curve parameter file A to generate a polynomial $f_2=53+941X+915Y+XY$.

Similarly, the value of the third vector type of the fourteen record is (\*,\*,\*,0,0,1,0) (A code \* is interpreted as representing any number), which coincides with the vector $m_3=(394,852,48,0,0,1,0)$, whereby the vector $m_3$ is regarded as a column of the coefficient of each monomial of the monomial order 1, X, Y, $X^2$, XY, $Y^2$, and $X^3$ of the algebraic curve parameter file A to generate a polynomial $f_3=394+852X+48Y+Y^2$. Finally, the ideal reduction section 13 constructs a set $J^{}=\{f_1=982+226X+146Y+X^2, f_2=53+941X+915Y+XY, f_3=394+852X+48Y+Y^2\}$ of the polynomial output it. Above, the operation of the second ideal reduction section 13** is finished.

Finally, in the Jacobian group element adder of FIG. 1, the Groebner basis $J^{}=\{982+226X+146Y+X^2, 53+941X+915Y+XY, 394+852X+48Y+Y^2\}$, which the second ideal reduction section 13** output, is output from an output apparatus.

Next, the embodiment of the case will be shown in which the $C_{27}$ curve was employed. In this embodiment, the algebraic curve parameter file of FIG. 8 is employed as an algebraic curve parameter file, the ideal type table of FIG. 9 as an ideal type table, the monomial list table of FIG. 10 as an monomial list table, and the table for a Groebner basis construction of FIG. 11 as a table for a Groebner basis construction respectively.

In the Jacobian group element adder of FIG. 1, suppose Groebner bases $$I_1=\{689+623X+130X^2+X^3, 568+590X+971X^2+Y\}$$

and $$I_2=\{689+623X+130X^2+X^3, 568+590X+971X^2+Y\}$$

were input of the ideal of the coordinate ring of the algebraic curve designated by the algebraic curve parameter file A, which represents an element of the Jacobian group of the $C_{27}$ curve designated by the algebraic curve parameter file A 16 and the algebraic curve parameter file A of FIG. 8.

At first, an ideal composition section 11, which takes the algebraic curve parameter file A of FIG. 8, and the above-mentioned Groebner bases $I_1$ and $I_2$ as an input, operates as follows according to a flow of the process of the functional block shown in FIG. 2. At first, the ideal composition section 11 makes a reference to the ideal type table of FIG. 9 in the ideal type classification section 21 of FIG. 2, retrieves a record in which the ideal type described in the ideal type field accords with the type of the input ideal $I_1$ for obtaining an eleventh record, and acquires a value $N_1=31$ of the ideal type number field and a value $d_1=3$ of the order field of the eleventh record. Similarly, the ideal composition section 11 retrieves a record in which the ideal type accords with the type of the input ideal $I_2$ for obtaining the eleventh record, and acquires a value $N_2=31$ of the ideal type number field and a value $d_2=3$ of the order field of the eleventh record.

Next, the ideal composition section 11 calculates the sum $d_3=d_1+d_2=6$ of said values $d_1=3$ and $d_2=3$ of said order field in the monomial vector generation section 22, makes a reference to the monomial list table, retrieves a record of which the value of the order field is said $d_3=6$ for obtaining a first record, and acquires a list 1, X, $X^2$, $X^3$, Y, $X^4$, XY, $X^5$, $X^2Y$, and $X^6$ of the monomial described in the monomial list field of the first record. $I_1$ and $I_2$ are equivalent, whereby a remainder to be attained by dividing $M_i$ by $I_1$ for each of $M_i(1<=i<=10)$ in said list 1, X, $X^2$, $X^3$, Y, $X^4$, XY, $X^5$, $X^2Y$, and $X^6$ of said monomial is calculated to obtain a polynomial $a^{(i)}_1+a^{(i)}_2X+a^{(i)}_3X^2$, to arrange its coefficients in order of the monomial order 1, X, $X^2$, $\ldots$ of the algebraic curve parameter file A, and to generate a vector $w^{(i)}_1=(a^{(i)}_1, a^{(i)}_2, a^{(i)}_3)$.

Furthermore, the ideal composition section 11 regards a coefficient list 0, 7, 0, 0, 0, 0, 0, 0, 0, 0, 1, and 1 described in the algebraic curve parameter file A of FIG. 8 as a coefficient row of each monomial of the monomial order 1, X, $X^2$, $X^3$, Y, $X^4$, XY, $X^5$, $X^2Y$, $X^6$, $X^3Y$, $X^7$, and $Y^2$ described in the algebraic curve parameter file A of FIG. 8, constructs a defining polynomial $F=Y^2+X^7+7X$, when a differential of a polynomial M with respect to its X is expressed by $D_X(M)$, and a differential of a polynomial M with respect to its Y is expressed by $D_Y(M)$, calculates a remainder to be attained by dividing a polynomial $D_X(M_i)D_Y(F)-D_Y(M_i)D_X(F)$ by $I_1$, obtains a polynomial $b^{(i)}_1+b^{(i)}_2X+b^{(i)}_3X^2$, arranges its coefficients in order of the monomial order 1, X, $X^2$, $\ldots$ of the algebraic curve parameter file A, generates a vector $w^{(i)}_2=(b^{(i)}_1, b^{(i)}_2, b^{(i)}_3)$, and connect the above-mentioned two vectors $w^{(i)}_1$ and $w^{(i)}_2$ for generating a vector $v_i=(a^{(i)}_1, a^{(i)}_2, a^{(i)}_3, b^{(i)}_1, b^{(i)}_2, b^{(i)}_3)$. That is, divide $M_1=1$ by $I_1$: then $$1=0\cdot(689+623X+130X^2+X^3)+0\cdot(568+590X+971X^2+Y)+1,$$

whereby, 1 is obtained as a remainder to generate a vector $w^{(1)}_1=(1,0,0)$. Furthermore, divide $D_X(1)D_Y(F)-D_Y(1)D_X(F)=0$ by $I_1$: then 0, whereby 0 is obtained as a remainder to generate a vector $w^{(1)}_2=(0,0,0)$. $w^{(1)}_1$ and $w^{(1)}_2$ are connected to generate a vector $v_1=(1,0,0,0,0,0)$.

Next, divide $M_2=X$ by $I_1$: then $X=0\cdot(689+623X+130X^2+X^3)+0\cdot(568+590X+971X^2+Y)+X$, whereby, X is obtained as a remainder to generate a vector $w^{(2)}_1=(0,1,0)$. Furthermore, divide $D_X(X)D_Y(F)-D_Y(X)D_X(F)=D_Y(F)=2Y$ by $I_1$: then $2Y=0\cdot(689+623X+130X^2+X^3)+2(568+590X+971X^2+Y)+882+838X+76X^2$, whereby $882+838X+76X^2$ is obtained as a remainder to generate a vector $w^{(2)}_2=(882,838,76)$. $w^{(2)}_1$ and $w^{(2)}_2$ are connected to generate a vector $v_2=(0,1,0,882,838,76)$ Next, divide $M_3=X^2$ by $I_1$: then $X^2=0\cdot(689+623X+130X^2+X^3)+0\cdot(568+590X+971X^2+Y)+X^2$, whereby, $X^2$ is obtained as a remainder to generate a vector $w^{(3)}_1=(0,0,1)$. Furthermore, divide $D_X(X^2)D_Y(F)-D_Y(X^2)D_X(F)=4XY$ by $I_1$: then $4XY=152(689+623X+130X^2+X^3)+4X(568+590X+971X^2+Y)+208+905X+78X^2$, whereby $208+905X+78X^2$ is obtained as a remainder to generate a vector $w^{(3)}_2=(208,905,78)$. $w^{(3)}_1$ and $w^{(3)}_2$ are connected to generate a vector $v_3=(0,0,1,208,905,78)$.

Next, divide $M_4=X^3$ by $I_1$: then $X^3=1\cdot(689+623X+130X^2+X^3)+0\cdot(568+590X+971X^2+Y)+320+386X+879X^2$, whereby, $320+386X+879X^2$ is obtained as a remainder to generate a vector $w^{(4)}_1=(320,386,879)$. Furthermore, divide $D_X(X^3)D_Y(F)-D_Y(X^3)D_X(F)=6X^2Y$ by $I_1$: then $6X^2Y=(117+228X)(689+623X+130X^2+X^3)+6X^2(568+590X+971X^2+Y)+107+69X+778X^2$, whereby $107+69X+778X^2$ is obtained as a remainder to generate a vector $w^{(4)}_2=(107,69,778)$. $w^{(4)}_1$ and $w^{(4)}_2$ are connected to generate a vector $v_4=(320,386,879,107,69,778)$.

Next, divide $M_5=Y$ by $I_1$: then $Y=0\cdot(689+623X+130X^2+X^3)+1\cdot(568+590X+971X^2+Y)+441+419X+38X^2$, whereby, $441+419X+38X^2$ is obtained as a remainder to generate a vector $w^{(5)}_1=(441,419,38)$. Furthermore, divide $D^Y(Y)D_Y(F)-D_Y(Y)D_X(F)=-D_X(F)=1002+1002X^6$ by $I_1$, then $1002+1002X^6=(865+78X+910X^2+1002X^3)(689+623X+130X^2+X^3)+0\cdot(568+590X+971X^2+Y)+327+655X+1004X^2$, whereby $327+655X+1004X^2$ is obtained as a remainder to generate a vector $w^{(5)}_2=(327,655,1004)$. $w^{(5)}_1$ and $w^{(5)}_2$ are connected to generate a vector $v_5=(441,419,38,327,655,1004)$.

Next, divide $M_6=X^4$ by $I_1$: then $X^4=(879+X)(689+623X+130X^2+X^3)+0\cdot(568+590X+971X^2+Y)+778+590X+133X^2$, whereby, $778+590X+133X^2$ is obtained as a remainder to generate a vector $w^{(6)}_1=(778,590,133)$. Furthermore, divide $D_X(X^4)D_Y(F)-D_Y(X^4) D_X(F)=8X^3Y$ by $I_1$: then $8X^3Y=(200+840X+8Y)(689+623X+130X^2+X^3)+(542+61X+978X^2)(568+590X+971X^2+Y)+322+653X+781X^2$, whereby $322+653X+781X^2$ is obtained as a remainder to generate a vector $w^{(6)}_2=(322,653,781)$. $w^{(6)}_1$ and $w^{(6)}_2$ are connected to generate a vector $v_6=(778,590,133,322,653,781)$.

Next, divide $M_7=XY$ by $I_1$: then $XY=38(689+623X+130X^2+X^3)+X(568+590X+971X^2+Y)+52+983X+524X^2$, whereby, $52+983X+524X^2$ is obtained as a remainder to generate a vector $w^{(7)}_1=(52,983,524)$. Furthermore, divide $D^Y(XY)D_Y(F)-D_Y(XY)D_X(F)=1002X+1002X^7+2Y^2$ by $I_1$, then $1002X+1002X^7+2Y^2=(24+726X+78X^2+910X^3+1002X^4)(689+623X+130X^2+X^3)+(882+838X+76X^2+2Y)(568+590X+971X^2+Y)+105+954X+813X^2$, whereby $105+954X+813X^2$ is obtained as a remainder to generate a vector $w^{(7)}_2=(105,954,813)$. $w^{(7)}_1$ and $w^{(7)}_2$ are connected to generate a vector $v_7=(52,983,524,105,954,813)$.

Next, divide $M_8=X^5$ by $I_1$: then $X^5=(133+879X+X^2)(689+623X+130X^2+X^3)+0\cdot(568+590X+971X^2+Y)+182+657X+453X^2$, whereby, $182+657X+453X^2$ is obtained as a remainder to generate a vector $w^{(8)}_1=(182,657,453)$. Furthermore, divide $D_X(X^5)D_Y(F)-D_Y(X^5)D_X(F)=10X^4Y$ by $I_1$: then $10X^4Y=(912+90X+718Y+10XY)(689+623X+130X^2+X^3)+(717+855X+321X^2)(568+590X+971X^2+Y)+619+878X+281X^2$, whereby $619+878X+281X^2$ is obtained as a remainder to generate a vector $w^{(8)}_2=(619,878,281)$. $w^{(8)}_1$ and $w^{(8)}_2$ are connected to generate a vector $v_8=(182,657,453,619,878,281)$.

Next, divide $M_9=X^2Y$ by $I_1$: then $X^2Y=(524+38X)(689+623X+130X^2+X^3)+X^2(568+590X+971X^2+Y)+186+516X+466X^2$, whereby, $186+516X+466X^2$ is obtained as a remainder to generate a vector $w^{(9)}_1=(186,516,466)$ Furthermore, divide $D^Y(X^2Y)D_Y(F)-D_Y(X^2Y)D_X(F)=1002X^2+1002X^8+4XY^2$ by $I_1$: then $1002X^{2+1002}X^8+4XY^2=(892+941X+865X^2+78X^3+910X^4+1002X^5+152Y)(689+623X+130X^2+X^3)+(208+905X+78X^2+4XY)(568+590X+971X^2+Y)+811+600X+123X^2$, whereby $811+600X+123X^2$ is obtained as a remainder to generate a vector $w^{(9)}_2=(811,600,123)$. $w^{(9)}_1$ and $w^{(9)}_2$ are connected to generate a vector $v_9=(186,516,466,811,600,123)$.

Next, divide $M_{10}=X^6$ by $I_1$: then $X^6=(453+133X+879X^2+X^3)(689+623X+130X^2+X^3)+0\cdot(568+590X+971X^2+Y)+673+483X+289X^2$, whereby, $673+483X+289X^2$ is obtained as a remainder to generate a vector $w^{(10)}_1=(673,483,289)$. Furthermore, divide $D_X(X^6)D_Y(F)-D_Y(X^6)D_X(F)=12X^5Y$ by $I_1$: then $12X^5Y=(985+732X+587Y+458XY+12X^2Y)(689+623X+130X^2+X^3)+(166+821X+391X^2)(568+590X+971X^2+Y)+950+741X+201X^2$, whereby $950+741X+201X^2$ is obtained as a remainder to generate a vector $w^{(10)}_2=(950,741,201)$. $w^{(10)}_1$ and $w^{(10)}_2$ are connected to generate a vector $v_{10}=(673,483,289,950,741,201)$. Above, the process of the ideal composition section 11 in the monomial vector generation section 22 is finished.

Next, in the basis construction section 23, the ideal composition section 11 inputs ten six-dimensional vectors $v_1$, $v_2$, $v_3$, $v_4$, $v_5$, $v_6$, $v_7$, $v_8$, $v_9$, and, $v_{10}$ generated in the monomial vector generation section 22 into the linear-relation derivation section 24, and obtains a plurality of 10-dimensional vectors $m_1, m_2, \ldots$ as an output. The linear-relation derivation section 24 derives a linear relation of the vectors, which were input, employing the discharging method. The discharging method belongs to a known art, whereby, as to an operation of the linear-relation derivation section 24, only its outline is shown below. The linear-relation derivation section 24 firstly arranges the ten six-dimensional vectors $v_1$, $v_2$, $v_3$, $v_4$, $v_5$, $v_6$, $v_7$, $v_8$, $v_9$, and, $v_{10}$ which were input, in order for constructing a 10×6 matrix $$M_C = \begin{pmatrix} 1 & 0 & 0 & 0 & 0 & 0 \\ 0 & 1 & 0 & 882 & 838 & 76 \\ 0 & 0 & 1 & 208 & 905 & 78 \\ 320 & 386 & 879 & 107 & 69 & 778 \\ 441 & 419 & 38 & 327 & 655 & 1004 \\ 778 & 590 & 133 & 322 & 653 & 781 \\ 52 & 983 & 524 & 105 & 954 & 813 \\ 182 & 657 & 453 & 619 & 878 & 281 \\ 186 & 516 & 466 & 811 & 600 & 123 \\ 673 & 483 & 289 & 950 & 741 & 201 \end{pmatrix} \quad \text{[EQ. 20]}$$

Next, the linear-relation derivation section 24 connects a 10-dimensional unity matrix to the matrix $M_C$ to obtain

[EQ. 21]

$$M'_C = \begin{pmatrix} 1 & 0 & 0 & 0 & 0 & 0 & 1 & 0 & 0 & 0 & 0 & 0 & 0 & 0 & 0 & 0 \\ 0 & 1 & 0 & 882 & 838 & 76 & 0 & 1 & 0 & 0 & 0 & 0 & 0 & 0 & 0 & 0 \\ 0 & 0 & 1 & 208 & 905 & 78 & 0 & 0 & 1 & 0 & 0 & 0 & 0 & 0 & 0 & 0 \\ 320 & 386 & 879 & 107 & 69 & 778 & 0 & 0 & 0 & 1 & 0 & 0 & 0 & 0 & 0 & 0 \\ 441 & 419 & 38 & 327 & 655 & 1004 & 0 & 0 & 0 & 0 & 1 & 0 & 0 & 0 & 0 & 0 \\ 778 & 590 & 133 & 322 & 653 & 781 & 0 & 0 & 0 & 0 & 0 & 1 & 0 & 0 & 0 & 0 \\ 52 & 983 & 524 & 105 & 954 & 813 & 0 & 0 & 0 & 0 & 0 & 0 & 1 & 0 & 0 & 0 \\ 182 & 657 & 453 & 619 & 878 & 281 & 0 & 0 & 0 & 0 & 0 & 0 & 0 & 1 & 0 & 0 \\ 186 & 516 & 466 & 811 & 600 & 123 & 0 & 0 & 0 & 0 & 0 & 0 & 0 & 0 & 1 & 0 \\ 673 & 483 & 289 & 950 & 741 & 201 & 0 & 0 & 0 & 0 & 0 & 0 & 0 & 0 & 0 & 1 \end{pmatrix}$$

Next, the linear-relation derivation section 24 triangulates a matrix $M'^c$ by adding a constant multiple of an i-th row to an (i+1)-th row (i=1,2, . . . , 6) to a tenth row to obtain the following a matrix m.

[EQ. 22]

$$m = \begin{pmatrix} 1 & 0 & 0 & 0 & 0 & 0 & 1 & 0 & 0 & 0 & 0 & 0 & 0 & 0 & 0 & 0 \\ 0 & 1 & 0 & 882 & 838 & 76 & 0 & 1 & 0 & 0 & 0 & 0 & 0 & 0 & 0 & 0 \\ 0 & 0 & 1 & 208 & 905 & 78 & 0 & 0 & 1 & 0 & 0 & 0 & 0 & 0 & 0 & 0 \\ 0 & 0 & 0 & 494 & 87 & 753 & 689 & 623 & 130 & 1 & 0 & 0 & 0 & 0 & 0 & 0 \\ 0 & 0 & 0 & 0 & 477 & 924 & 591 & 170 & 804 & 22 & 1 & 0 & 0 & 0 & 0 & 0 \\ 0 & 0 & 0 & 0 & 0 & 475 & 742 & 22 & 242 & 149 & 314 & 1 & 0 & 0 & 0 & 0 \\ 0 & 0 & 0 & 0 & 0 & 0 & 699 & 601 & 688 & 281 & 217 & 287 & 1 & 0 & 0 & 0 \\ 0 & 0 & 0 & 0 & 0 & 0 & 193 & 959 & 364 & 180 & 550 & 43 & 0 & 1 & 0 & 0 \\ 0 & 0 & 0 & 0 & 0 & 0 & 780 & 667 & 96 & 50 & 897 & 327 & 0 & 0 & 1 & 0 \\ 0 & 0 & 0 & 0 & 0 & 0 & 761 & 727 & 417 & 523 & 278 & 912 & 0 & 0 & 0 & 1 \end{pmatrix}$$

As well known, the vector that is composed of a seventh component and afterward of a seventh row to a tenth row of the matrix m is a vector $\{(m_{1,1}, m_{1,2}, \ldots, m_{1,n}), (m_{2,1}, m_{2,2}, \ldots, m_{2,n}), \ldots\}$ representing a linearly-independent linear dependence relation $\Sigma_i^{10} m_{ji} v_i = 0 (j=1,2, \ldots)$ of all of the ten six-dimensional vectors $v_1, v_2, v_3, v_4, v_5, v_6, v_7, v_8, v_9$, and $v_{10}$ that were input. The linear-relation derivation section 24 outputs a vector $m_1 = (699,601,688,281,217,287,1,0,0,0)$ that is composed of the seventh component and afterward of the seventh row of the matrix m, a vector $m_2 = (193,959,364,180,550,43,0,1,0,0)$ that is composed of the seventh component and afterward of the eighth row of the matrix m, and a vector $m_3 = (780,667,96,50,897,327,0,0,1,0)$ that is composed of the seventh component and afterward of the ninth row of the matrix m, and a vector $m_4 = (761,727,417,523,278,912,0,0,0,1)$ that is composed of the seventh component and afterward of the tenth row of the matrix m. Now return to the explanation of the process of the ideal composition section 11 in the basis construction section 23.

Next, the ideal composition section 11 makes a reference to the table for a Groebner basis construction of FIG. 11, and retrieves a record, of which the value of the order field is said value $d_3 = 6$, and in which a vector of which the components that correspond to all component numbers described in the component number list field are all zero does not lie in said plurality of said vectors $m_1 = (699,601,688,281,217,287,1,0,0,0)$, $m_2 = (193,959,364,180,550,43,0,1,0,0)$, $m_3 = (780,667,96,50,897,327,0,0,1,0)$, and $m_4 = (761,727,417,523,278,912,0,0,0,1)$. The value of the order field of the first record is 6, and a vector, of which the components correspond to the component number lists 7, 8, 9, and 10 of a first record are all zero, does not lie in the vectors $m_1$, $m_2$, $m_3$, and $m_4$, whereby the first record is obtained as a retrieval result.

Furthermore, the value of the first vector type of the first record is (*,*,*,*,*,*,1,0,0,0)(A code * is interpreted as representing any number), which coincides with the vector $m_1 = (699,601,688,281,217,287,1,0,0,0)$, whereby the vector $m_1$ is regarded as a column of the coefficient of each monomial of the monomial order 1, X, $X^2$, $X^3$, Y, $X^4$, XY, $X^5$, $X^2Y$, and $X^6$ of the algebraic curve parameter file A to generate a polynomial $f_1 = 699+601X+688X^2+281X^3+217Y+287X^4+XY$.

Similarly, the value of the second vector type of the first record is (*,*,*,*,*,*,0,1,0,0) (A code * is interpreted as representing any number), which coincides with the vector $m_2 = (193,959,364,180,550,43,0,1,0,0)$, whereby the vector $m_2$ is regarded as a column of the coefficient of each monomial of the monomial order 1, X, $X^2$, $X^3$, Y, $X^4$, XY, $X^5$, $X^2Y$, and $X^6$ of the algebraic curve parameter file A to generate a polynomial $f_2 = 193+959X+364X^2+180X^3+550Y+43X^4+X^5$. The value of third vector type of the first record is null, whereby it is neglected. Finally, the ideal composition section 11 constructs a set $J = \{f_1, f_2\} = \{699+601X+688X^2+281X^3+217Y+287X^4+XY, 193+959X+364X^2+180X^3+550Y+43X^4+X^5\}$ of the polynomial to output it. Above, the operation of the ideal composition section 11 is finished.

Next, the first ideal reduction section 12, which takes as an input the algebraic curve parameter file A of FIG. 8, and the Groebner basis $J = \{699+601X+688X^2+281X^3+217Y+287X^4+XY, 193+959X+364X^2+180X^3+550Y+43X^4X^5\}$ that the ideal composition section 11 output, operates as follows according to a flow of the process of the functional block shown in FIG. 3.

At first, in the ideal type classification section 31 of FIG. 3, the ideal reduction section 12 makes a reference to the ideal type table of FIG. 9, retrieves a record in which the ideal type described in the ideal type field accords with the type of the input ideal J for obtaining a first record, and acquires a value N=61 of the ideal type number field and a value d=3 of the reduction order field of the first record. Next, the ideal reduction section 12 confirms that said value d=3 is not zero, makes a reference to the monomial list table of FIG. 10 in the polynomial vector generation section 32, retrieves a record of which the value of the order field is said d=3 for obtaining a fourth record, and acquires a list 1, X, $X^2$, $X^3$, Y, $X^4$, and XY of the monomial described in the monomial list field of the fourth record.

Furthermore, the ideal reduction section 12 acquires a first element $f = 699+601X+688X^2+281X^3+217Y+284X^4+XY$ of J, and a second element $g = 193+959X+364X^2+180X^3+550Y+43X^4+X^5$(A third element does not lie in J, whereby a third polynomial h is not employed), regards a coefficient list 0,7,0,0,0,0,0,0,0,0,1,1 of the algebraic curve parameter file A as a column of the coefficient of each monomial of the monomial order 1, X, $X^2$, $X^3$, Y, $X^4$, XY, $X^5$, $X^2Y$, $X^6$, $X^3Y$, $X^7$ and $Y^2$ of the algebraic curve parameter file A, and generates a defining polynomial $F=Y^2+X^7+7X$.

Next, for each of $M_i (1<=i<=7)$ in said list 1, X, $X^2$, $X^3$, Y, $X^4$ and XY of said monomial, the ideal reduction section 12 calculates a remainder equation $r_i$ of a product $M_i \cdot g$ of $M_i$ and the polynomial g by the polynomials f and F, arranges its coefficients in order of the monomial order 1, X, $X^2$, $X^3$, Y, $X^4$, XY, $X^5$, $X^2Y$, $X^6$, $X^3Y$, and $X^7$ of the algebraic curve parameter file A, and generates a vector $v_i$. That is, at first, for a first monomial $M_1=1$, divide $1 \cdot g=193+959X+364X^2+180X^3+550Y+43X^4+X^5$ by $f=699+601X+688X^2+281X^3+217Y+287X^4+XY$ and $F=Y^2+X^7+7X$: then $g=0 \cdot f+0 \cdot F+193+959X+364X^2+180X^3+550Y+43X^4+X^5$, whereby a remainder $193+959X+364X^2+180X^3+550Y+43X^4+X^5$ is obtained to generate a vector $v_1=(193,959,364,180,550,43,0,1,0,0,0,0)$.

Next, for a second monomial $M_2=X$, divide $Xg=X(193+959X+364X^2+180X^3+550Y+43X^4+X^5)$ by $f=699+601X+688X^2+281X^3+217Y+287X^4+XY$ and $F=Y^2+X^7+7X$: then $Xg=550f+0 \cdot F+988+595X+934X^2+191X^3+743X^4+43X^5+X^6+721Y$, whereby a remainder $988+595X+934X^2+191X^3+743X^4+43X^5+X^6+721Y$ is obtained to generate a vector $v_2=(988,595,934,191,721,743,0,43,0,1,0,0)$.

Next, for a third monomial $M_3=X^2$, divide $X^2g=X^2(193+959X+364X^2+180X^3+550Y+43X^4+X^5)$ by $f=699+601X+688X^2+281X^3+217Y+287X^4+XY$ and $F=Y^2+X^7+7X$: then $X^2g=(721+550X)f+0 \cdot F+521+528Y+975X^2+133X^3+109X^4+743X^5+43X^6+X^7+947Y$, whereby a remainder $521+528X+975X^2+133X^3+109X^4+743X^5+43X^6+X^7+947Y$ is obtained to generate a vector $v_3=(521,528,975,133,947,109,0,743,0,43,0,1)$.

Next, for a fourth monomial $M_4=X^3$, divide $X^3g=X^3(193+959X+364X^2+180X^3+550Y+43X^4+X^5)$ by $f=699+601X+688X^2+281X^3+217Y+287X^4+XY$ and $F=Y^2+X^7+7X$: then $X^3g=(200+969X+101X^2+287X^3+1008Y)f+(217+X)F+451+78X+481X^2+791X^3+389X^4+924X^5+527X^6+195X^7+686Y$, whereby a remainder $451+78X+481X^2+791X^3+389X^4+924X^5+527X^6+195X^7+686Y$ is obtained to generate a vector $v_4=(451,78,481,791,686,389,0,924,0,527,0,195)$.

Next, for a fifth monomial $M_5=Y$, divide $Yg=Y(193+959X+364X^2+180X^3+550Y+43X^4+X^5)$ by $f=699+601X+688X^2+281X^3+217Y+287X^4+XY$ and $F=Y^2+X^7+7X$: then $Yg=(884+712X+316X^2+195X^3+X^4+287Y)f+(829+722X)F+601+459X+217X^2+14X^3+965X^4+924X^5+130X^6+438X^7+253Y$, whereby a remainder $601+459X+217X^2+14X^3+965X^4+924X^5+130X^6+438X^7+253Y$ is obtained to generate a vector $v_5=(601,459,217,14,253,965,0,924,0,130,0,438)$.

Next, for a sixth monomial $M_6=X^4$, divide $X^4g=X^4(193+959X+364X^2+180X^3+550Y+43X^4+X^5)$ by $f=699+601X+688X^2+281X^3+217Y+287X^4+XY$ and $F=Y^2+X^7+7X$: then $X^4g=(317+128X+188X^2+571X^3+287X^4+814Y+1008XY)f+(946+412X+X^2)F+397+954X+514X^2+891X^3+255X^4+901X^5+173X^6+906X^7+922Y$, whereby a remainder $397+954X+514X^2+891X^3+255X^4+901X^5+173X^6+906X^7+922Y$ is obtained to generate a vector $v_6=(397,954,514,891,922,255,0,901,0,173,0,906)$.

Finally, for a seventh monomial $M_7=XY$, divide $XYg=XY(193+959X+364X^2+180X^3+550Y+43X^4+X^5)$ by $f=699+601X+688X^2+281X^3+217Y+287X^4+XY$ and $F=Y^2+X^7+7X$: then $XYg=(992+536X+805X^2+906X^3+195X^4+X^5+571Y+287XY)f+(200+258X+722X^2)F+784+420X+871X^2+113X^3+933X^4+749X^5+153X^6+112X^7+88Y$, whereby a remainder $784+420X+871X^2+113X^3+933X^4+749X^5+153X^6+112X^7+88$ is obtained to generate a vector $v_7=(784,420,871,113,88,933,0,749,0,153,0,112)$. Above, the process of the second ideal reduction section 12 in the polynomial vector generation section 32 is finished.

Next, in the basis construction section 33, the second ideal reduction section 12 inputs seven 12-dimensional vectors $v_1$, $v_2$, $v_3$, $v_4$, $v_5$, $v_6$, and $v_7$ generated in the polynomial vector generation section 32 into the linear-relation derivation section 34, and obtains a plurality of seven-dimensional vectors $m_1, m_2, \ldots$ as an output.

The linear-relation derivation section 34 derives a linear relation of the vectors, which were input, employing the discharging method. The discharging method belongs to a known art, whereby, as to an operation of the linear-relation derivation section 34, only its outline is shown below. The linear-relation derivation section 34 firstly arranges the seven 12-dimensional vectors $v_1$, $v_2$, $v_3$, $v_4$, $v_5$, $v_6$, and $v_7$, which were input, in order for constructing a 7×12 matrix $$M_R = \begin{pmatrix} 193 & 959 & 364 & 180 & 550 & 43 & 0 & 1 & 0 & 0 & 0 & 0 \\ 988 & 595 & 934 & 191 & 721 & 743 & 0 & 43 & 0 & 1 & 0 & 0 \\ 521 & 528 & 975 & 133 & 947 & 109 & 0 & 743 & 0 & 43 & 0 & 1 \\ 451 & 78 & 481 & 791 & 686 & 389 & 0 & 924 & 0 & 527 & 0 & 195 \\ 601 & 459 & 217 & 14 & 253 & 965 & 0 & 924 & 0 & 130 & 0 & 438 \\ 397 & 954 & 514 & 891 & 922 & 255 & 0 & 901 & 0 & 173 & 0 & 906 \\ 784 & 420 & 871 & 113 & 88 & 933 & 0 & 749 & 0 & 153 & 0 & 112 \end{pmatrix}$$ [EQ. 23]

Next, the linear-relation derivation section 34 connects a seven-dimensional unity matrix to the matrix $M_R$ to construct $$M'_R = \begin{pmatrix} 193 & 959 & 364 & 180 & 550 & 43 & 0 & 1 & 0 & 0 & 0 & 0 & 1 & 0 & 0 & 0 & 0 & 0 & 0 \\ 988 & 595 & 934 & 191 & 721 & 743 & 0 & 43 & 0 & 1 & 0 & 0 & 0 & 1 & 0 & 0 & 0 & 0 & 0 \\ 521 & 528 & 975 & 133 & 947 & 109 & 0 & 743 & 0 & 43 & 0 & 1 & 0 & 0 & 1 & 0 & 0 & 0 & 0 \\ 451 & 78 & 481 & 791 & 686 & 389 & 0 & 924 & 0 & 527 & 0 & 195 & 0 & 0 & 0 & 1 & 0 & 0 & 0 \\ 601 & 459 & 217 & 14 & 253 & 965 & 0 & 924 & 0 & 130 & 0 & 438 & 0 & 0 & 0 & 0 & 1 & 0 & 0 \\ 397 & 954 & 514 & 891 & 922 & 255 & 0 & 901 & 0 & 173 & 0 & 906 & 0 & 0 & 0 & 0 & 0 & 1 & 0 \\ 784 & 420 & 871 & 113 & 88 & 933 & 0 & 749 & 0 & 153 & 0 & 112 & 0 & 0 & 0 & 0 & 0 & 0 & 1 \end{pmatrix}$$ [EQ. 24]

Next, the linear-relation derivation section 34 triangulates a matrix $M^{tR}$ by adding a constant multiple of an i-th row to an (i+1)-th row (i=1,2,3) to a seventh row to obtain the following a matrix m.

$$m = \begin{pmatrix} 193 & 959 & 364 & 180 & 550 & 43 & 0 & 1 & 0 & 0 & 0 & 0 & 1 & 0 & 0 & 0 & 0 & 0 \\ 0 & 485 & 524 & 587 & 922 & 434 & 0 & 247 & 0 & 1 & 0 & 0 & 204 & 1 & 0 & 0 & 0 & 0 \\ 0 & 0 & 362 & 736 & 914 & 919 & 0 & 822 & 0 & 725 & 0 & 1 & 14 & 682 & 1 & 0 & 0 & 0 \\ 0 & 0 & 0 & 0 & 0 & 0 & 0 & 0 & 0 & 0 & 0 & 0 & 804 & 795 & 814 & 1 & 0 & 0 \\ 0 & 0 & 0 & 0 & 0 & 0 & 0 & 0 & 0 & 0 & 0 & 0 & 522 & 542 & 571 & 0 & 1 & 0 \\ 0 & 0 & 0 & 0 & 0 & 0 & 0 & 0 & 0 & 0 & 0 & 0 & 385 & 443 & 103 & 0 & 0 & 1 \\ 0 & 0 & 0 & 0 & 0 & 0 & 0 & 0 & 0 & 0 & 0 & 0 & 12 & 627 & 897 & 0 & 0 & 0 & 1 \end{pmatrix}$$ [EQ. 25]

As well known, the vector that is composed of a thirteenth component and afterward of a fourth row to a seventh row of the matrix m is a vector $\{(m_{1,1},m_{1,2}, \ldots ,m_{1,7}), (m_{2,1}, m_{2,2}, \ldots ,m_{2,7}), \ldots \}$ representing a linearly-independent linear dependence relation $\Sigma_{i=1}^{7} m_{ji}v_i=0(j=1,2, \ldots )$ of all of the seven 12-dimensional vectors $v_1$, $v_2$, $v_3$, $v_4$, $v_5$, $v_6$, and $v_7$ that were input. The linear-relation derivation section 34 outputs a vector $m_1=(804,795,814,1,0,0,0)$ that is composed of the thirteen component and afterward of the fourth row of the matrix m, a vector $m_2=(522,542,571,0,1,0,0)$ that is composed of the thirteenth component and afterward of the fifth row of the matrix m, and a vector $m_3=(385,443,103,0,0,1,0)$ that is composed of the thirteenth component and afterward of the sixth row of the matrix m, and a vector $m_4=(12,627,897,0,0,0,1)$ that is composed of the thirteen component and afterward of the seventh row of the matrix m.

Now return to the explanation of the process of the first ideal reduction section 12 in the basis construction section 33. Next, this second ideal reduction section 12 makes a reference to the table for a Groebner basis construction of FIG. 11, retrieves a record of which the value of the order field is said value d=3, and in which a vector of which the components that correspond to all component numbers described in the component number list field are all zero does not lie in said plurality of said vectors $m_1=(804,795,814,1,0,0,0)$, $m_2=(522,542,571,0,1,0,0)$, $m_3=(385,443,103,0,0,1,0)$, and $m_4=(12,627,897,0,0,0,1)$. The value of the order field of an eleventh record is 3, and a vector, of which the components that correspond to the component number lists 4, 5, 6, and 7 of the eleventh record are all zero, does not lie in the vectors $m_1$, $m_2$, $m_3$, and $m_4$, whereby the eleventh record is obtained as a retrieval result.

Furthermore, the value of the first vector type of the eleventh record is (*,*,*,1,0,0,0) (A code * is interpreted as representing any number), which coincides with the vector $m_1=(804,795,814,1,0,0,0)$, whereby the vector $m_1$ is regarded as a column of the coefficient of each monomial of the monomial order 1, X, $X^2$, $X^3$, Y, $X^4$, and XY of the algebraic curve parameter file A to generate a polynomial $f_1=804+795X+814X^2+X^3$.

Similarly, the value of the second vector type of the eleventh record is (*,*,*,0,1,0,0) (A code * is interpreted as representing any number), which coincides with the vector $m_2=(522,542,571,0,1,0,0)$, whereby the vector $m_2$ is regarded as a column of the coefficient of each monomial of the monomial order 1, X, $X^2$, $X^3$, Y, $X^4$, and XY of the algebraic curve parameter file A to generate a polynomial $f_2=522+542X+571X^2+Y$. The value of the third vector type of the eleventh record is null, whereby it is neglected. Finally, the ideal reduction section 12 constructs a set $J^*=\{f_1,f_2\}=\{804+795X+814X^2+X^3, 522+542X+571X^2+Y\}$ of the polynomial to output it. Above, the operation of the first ideal reduction section 12 is finished.

Next, the second ideal reduction section 13, which takes as an input the algebraic curve parameter file A of FIG. 8, and the Groebner basis $J^*=\{f_1,f_2\}=\{804+795X+814X^2+X^3, 522+542X+571X^2+Y\}$ that the first ideal reduction section 12 output, operates as follows according to a flow of the process of the functional block shown in FIG. 3. At first, the ideal reduction section 13 makes a reference to the ideal type table of FIG. 9 in the ideal type classification section 31 of FIG. 3, retrieves a record in which the ideal type described in the ideal type field accords with the type of the input ideal $J^*$ for obtaining an eleventh record, and acquires a value N=31 of the ideal type number field and a value d=3 of the reduction order field of the eleventh record.

Next, the ideal reduction section 13 confirms that said value d=3 is not zero, makes a reference to the monomial list table of FIG. 10 in the polynomial vector generation section 32, retrieves a record of which the value of the order field is said d=3 for obtaining a fourth record, and acquires a list 1, X, $X^2$, $X^3$, Y, $X^4$, and XY of the monomial described in the monomial list field of the fourth record. Furthermore, the ideal reduction section 13 acquires a first element $f=804+795X+814X^2+X^3$, and a second element $g=522+542X+571X^2+Y$ of $J^*$ (A third element does not lie in $J^*$, whereby a third polynomial h is not employed), regards a coefficient list 0, 7, 0, 0, 0, 0, 0, 0, 0, 0, 1, and 1 of the algebraic curve parameter file A as a column of the coefficient of each monomial of the monomial order 1, X, $X^2$, $X^3$, Y, $X^4$, XY, $X^5$, $X^2Y$, $X^6$, $X^3Y$, $X^7$ and $Y^2$ of the algebraic curve parameter file A, and generates a defining polynomial $F=Y^2+X^7+7X$.

Next, for each of $M_i(1<=i<=7)$ in said list 1, X, $X^2$, $X^3$, Y, $X^4$ and XY of said monomial, the ideal reduction section 13 calculates a remainder equation $r_i$ of a product $M_i \cdot g$ of $M_i$ and the polynomial g by the polynomials f and F, arranges its coefficients in order of the monomial order 1, X, $X^2$, $X^3$, Y, $X^4$, XY, $X^5$, $X^2Y$, $X^6$, $X^3Y$, and $X^7$ of the algebraic curve parameter file A, and generates a vector $v_i$. That is, at first, for a first monomial $M_1=1$, divide $1 \cdot g=522+542X+571X^2+Y$ by $f=804+795X+814X^2+X^3$ and $F=Y^2+X^7+7X$: then $g=0 \cdot f+0 \cdot F+522+542X+571X^2+Y$, whereby a remainder $522+542X+571X^2+Y$ is obtained to generate a vector $v_1=(522,542,571,0,1,0,0,0,0)$.

Next, for a second monomial $M_2=X$, divide $Xg=X(522+542X+571X^2+Y)$ by $f=804+795X+814X^2+X^3$ and $F=Y^2+X^7+7X$: then $Xg=571f+0 \cdot F+11+627X+897X^2+XY$, whereby a remainder $11+627X+897X^2+XY$ is obtained to generate a vector $v_2=(11,627,897,0,0,0,1,0,0)$.

Next, for a third monomial $M_3=X^2$, divide $X^2g=X^2(522+542X+571X^2+Y)$ by $f=804+795X+814X^2+X^3$ and $F=Y^2+X^7+7X$: then $X^2g=(897+571X)f+0 \cdot F+247+259X+985X^2+X^2Y$, whereby a remainder $247+259X+985X^2+X^2Y$ is obtained to generate a vector $v_3=(247,259,985,0,0,0,0,0,1)$.

Next, for a fourth monomial $M_4=X^3$, divide $X^3g=X^3(522+542X+571X^2+Y)$ by $f=804+795X+814X^2+X^3$ and $F=Y^2+X^7+7X$: then $X^3g=(985+897X+571X^2+Y)f+0 \cdot F+$ $125+156X+624X^2+205Y+214XY+195X^2Y$, whereby a remainder $125+156X+624X^2+205Y+214XY+195X^2Y$ is obtained to generate a vector $v_4=(125,156,624,0,205,0,214,0,195)$.

Next, for a fifth monomial $M_5=Y$, divide $Yg=Y(522+542X+571X^2+Y)$ by $f=804+795X+814X^2+X^3$ and $F=Y^2+X^7+7X$: then $Yg=(486+348X+103X^2+814X^3+1008X^4)f+1\cdot F+748+780X+665X^2+522Y+542XY+571X^2Y$, whereby a remainder $748+780X+665X^2+522Y+542XY+571X^2Y$ is obtained to generate a vector $v_5=(748,780,665,0,522,0,542,0,571)$.

Next, for a sixth monomial $M_6=X^4$, divide $X^4g=X^4(522+542X+571X^2+Y)$ by $f=804+795X+814X^2+X^3$ and $F=Y^2+X^7+7X$: then $X^4g=(624+985X+897X^2+571X^3+195Y+XY)f+0\cdot F+786+473X+756X^2+624Y+566XY+906X^2Y$, whereby a remainder $786+473X+756X^2+624Y+566XY+906X^2Y$ is obtained to generate a vector $v_6=(786,473,756,0,624,0,566,0,906)$.

Finally, for a seventh monomial $M_7=XY$, divide $XYg=XY(522+542X+571X^2+Y)$ by $f=804+795X+814X^2+X^3$ and $F=Y2+X^7+7X$: then $XYg=(665+486X+348X^2+103X^3+814X^4+1008X^5+571Y)f+XF+110+789X+294X^2+11Y+627XY+897X^2Y$, whereby a remainder $110+789X+294X^2+11Y+627XY+897X^2Y$ is obtained to generate a vector $v_7=(110,789,294,0,11,0,627,0,897)$. Above, the process of the second ideal reduction section 13 in the polynomial vector generation section 32 is finished.

Next, in the basis construction section 33, this ideal reduction section 13 inputs seven nine-dimensional vectors $v_1, v_2, v_3, v_4, v_5, v_6$, and $v_7$ generated in the polynomial vector generation section 32 into the linear-relation derivation section 34, and obtains a plurality of seven-dimensional vectors $m_1, m_2, \ldots$ as an output. The linear-relation derivation section 34 derives a linear relation of the vectors, which were input, employing the discharging method. The discharging method belongs to a known art, whereby, as to the operation of the linear-relation derivation section 34, only its outline is shown below.

The linear-relation derivation section 34 firstly arranges the seven nine-dimensional vectors $v_1, v_2, v_3, v_4, v_5, v_6$, and $v_7$, which were input, in order for constructing a 7×9 matrix $$M_R = \begin{pmatrix} 522 & 542 & 571 & 0 & 1 & 0 & 0 & 0 & 0 \\ 11 & 627 & 897 & 0 & 0 & 0 & 1 & 0 & 0 \\ 247 & 259 & 985 & 0 & 0 & 0 & 0 & 0 & 1 \\ 125 & 156 & 624 & 0 & 205 & 0 & 214 & 0 & 195 \\ 784 & 780 & 665 & 0 & 522 & 0 & 542 & 0 & 571 \\ 786 & 473 & 756 & 0 & 624 & 0 & 566 & 0 & 906 \\ 110 & 789 & 294 & 0 & 11 & 0 & 627 & 0 & 897 \end{pmatrix}$$ [EQ. 26]

Next, the linear-relation derivation section 34 connects a seven-dimensional unity matrix to the matrix $M_R$ to construct

[EQ. 27]

$$M'_R = \begin{pmatrix} 522 & 542 & 571 & 0 & 1 & 0 & 0 & 0 & 0 & 1 & 0 & 0 & 0 & 0 & 0 & 0 \\ 11 & 627 & 897 & 0 & 0 & 0 & 1 & 0 & 0 & 0 & 1 & 0 & 0 & 0 & 0 & 0 \\ 247 & 259 & 985 & 0 & 0 & 0 & 0 & 0 & 1 & 0 & 0 & 1 & 0 & 0 & 0 & 0 \\ 125 & 156 & 624 & 0 & 205 & 0 & 214 & 0 & 195 & 0 & 0 & 0 & 1 & 0 & 0 & 0 \\ 748 & 780 & 665 & 0 & 522 & 0 & 542 & 0 & 571 & 0 & 0 & 0 & 0 & 1 & 0 & 0 \\ 786 & 473 & 756 & 0 & 624 & 0 & 566 & 0 & 906 & 0 & 0 & 0 & 0 & 0 & 1 & 0 \\ 110 & 789 & 294 & 0 & 11 & 0 & 627 & 0 & 897 & 0 & 0 & 0 & 0 & 0 & 0 & 1 \end{pmatrix}$$

Next, the linear-relation derivation section 34 triangulates a matrix $M'_R$ by adding a constant multiple of an i-th row to an (i+1)-th row (i=1,2,3) to a seventh row to obtain the following matrix m.

[EQ. 28]

$$m = \begin{pmatrix} 522 & 542 & 571 & 0 & 0 & 0 & 0 & 0 & 0 & 1 & 0 & 0 & 0 & 0 & 0 & 0 \\ 0 & 171 & 48 & 0 & 230 & 0 & 1 & 0 & 0 & 230 & 1 & 0 & 0 & 0 & 0 & 0 \\ 0 & 0 & 976 & 0 & 385 & 0 & 53 & 0 & 1 & 385 & 53 & 1 & 0 & 0 & 0 & 0 \\ 0 & 0 & 0 & 0 & 0 & 0 & 0 & 0 & 0 & 804 & 795 & 814 & 1 & 0 & 0 & 0 \\ 0 & 0 & 0 & 0 & 0 & 0 & 0 & 0 & 0 & 487 & 467 & 438 & 0 & 1 & 0 & 0 \\ 0 & 0 & 0 & 0 & 0 & 0 & 0 & 0 & 0 & 385 & 443 & 103 & 0 & 0 & 1 & 0 \\ 0 & 0 & 0 & 0 & 0 & 0 & 0 & 0 & 0 & 998 & 382 & 112 & 0 & 0 & 0 & 1 \end{pmatrix}$$

As well known, the vector that is composed of a tenth component and afterward of a fourth row to a seventh row of the matrix m is a vector $\{(m_{1,1},m_{1,2},\ldots,m_{1,n}), (m_{2,1}, m_{2,2},\ldots,m_{2,n}),\ldots\}$ representing a linearly-independent linear dependence relation $\Sigma_i^7 m_{ji}v_i=0 (j=1,2,\ldots)$ of all of the seven 12-dimensional vectors $v_1, v_2, v_3, v_4, v_5, v_6$, and $v_7$ that were input. The linear-relation derivation section 34 outputs a vector $m_1=(804,795,814,1,0,0,0)$ that is composed of the tenth component and afterward of the fourth row of the matrix m, a vector $m_2=(487,467,438,0,1,0,0)$ that is composed of the tenth component and afterward of the fifth row of the matrix m, and a vector $m_3=(385,443,103,0,0,1,0)$ that is composed of the tenth component and afterward of the sixth row of the matrix m, and a vector $m_4=(998,382,112,0,0,0,1)$ that is composed of the tenth component and afterward of the seventh row of the matrix m.

Now return to the explanation of the process of the second ideal reduction section 13 in the basis construction section 33. Next, this ideal reduction section 13 makes a reference to the table for a Groebner basis construction of FIG. 11, retrieves a record, of which the value of the order field is said value d=3, and in which a vector of which the components that correspond to all component numbers described in the component number list field are all zero does not lie in said plurality of said vectors $m_1=(804,795,814,1,0,0,0)$, $m_2=(487,467,438,0,1,0,0)$, $m_3=(385,443,103,0,0,1,0)$, and $m_4=(998,382,112,0,0,0,1)$. The value of the order field of an eleventh record is 3, and a vector, of which the component number lists 4, 5, 6, and 7 of the eleventh record are all zero, does not lie in the vectors $m_1, m_2, m_3$, and $m_4$, whereby the eleventh record is obtained as a retrieval result.

Furthermore, the value of the first vector type of the eleventh record is $(*,*,*,1,0,0,0)$ (A code $*$ is interpreted as representing any number), which coincides with the vector $m_1=(804,795,814,1,0,0,0)$, whereby the vector $m_1$ is regarded as a column of the coefficient of each monomial of the monomial order 1, X, $X^2$, $X^3$, Y, $X^4$, and XY of the algebraic curve parameter file A to generate a polynomial $f_1=804+795X+814X^2+X^3$.

Similarly, the value of the second vector type of the eleventh record is $(*,*,*,0,1,0,0)$ (A code $*$ is interpreted as representing any number), which coincides with the vector $m_2=(487,467,438,0,1,0,0)$, whereby the vector $m_2$ is regarded as a column of the coefficient of each monomial of the monomial order 1, X, $X^2$, $X^3$, Y, $X^4$, and XY of the algebraic curve parameter file A to generate a polynomial $f_2=487+467X+438X^2+Y$. The value of the third vector type of the eleventh record is null, whereby it is neglected.

Finally, the ideal reduction section 13 constructs a set $J^{}=\{f_1,f_2\}=\{804+795X+814X^2+X^3, 487+467X+438X^2+Y\}$ of the polynomial to output it. Above, the operation of the second ideal reduction section 13 is finished. Finally, in the Jacobian group adder of FIG. 1, the Groebner basis $J^{}=\{804+795X+814X^2+X^3,487+467X+438X^2+Y\}$, which the ideal reduction section 13 output, is output from the output apparatus.

Next, the embodiment of the case will be shown in which the $C_{25}$ curve was employed. In this embodiment, the algebraic curve parameter file of FIG. 12 is employed as an algebraic curve parameter file, the ideal type table of FIG. 13 as an ideal type table, the monomial list table of FIG. 14 as an monomial list table, and the table for a Groebner basis construction of FIG. 15 as a table for a Groebner basis construction respectively.

In the Jacobian group element adder of FIG. 1, suppose Groebner bases $$I_1=\{729+88X+X^2,475+124X+Y\}$$

and $$I_2=\{180+422X+X^2,989+423X+Y\}$$

were input of the ideal of the coordinate ring of the algebraic curve designated by the algebraic curve parameter file A, which represents an element of the Jacobian group of the $C_{25}$ curve designated by the algebraic curve parameter file A 16 and the algebraic curve parameter file A of FIG. 12.

At first, the ideal composition section 11, which takes the algebraic curve parameter file A of FIG. 12, and the above-mentioned Groebner bases $I_1$ and $I_2$ as an input, operates as follows according to a flow of the process of the functional block shown in FIG. 2. The ideal composition section 11 firstly makes a reference to the ideal type table of FIG. 13 in the ideal type classification section 21 of FIG. 2, retrieves a record in which the ideal type described in the ideal type field accords with the type of the input ideal $I_1$ for obtaining a sixth record, and acquires a value $N_1=21$ of the ideal type number field and a value $d_1=2$ of the order field of the sixth record. Similarly, the ideal composition section 11 retrieves a record in which the ideal type accords with the type of the input ideal $I_2$ for obtaining the sixth record, and acquires a value $N_2=21$ of the ideal type number field and a value $d_2=2$ of the order field of the sixth record.

Next, the ideal composition section 11 calculates the sum $d_3=d_1+d_2=4$ of said values $d_1=2$ and $d_2=2$ of said order field in the monomial vector generation section 22, makes a reference to the monomial list table of FIG. 14, retrieves a record of which the value of the order field is said $d_3=4$ for obtaining the first record, and acquires a list of the monomial 1, X, $X^2$, Y, $X^3$, XY, and $X^4$ described in the monomial list field of the first record. $I_1$ and $I_2$ are different, whereby a remainder to be attained by dividing $M_i$ by $I_1$ for each of $M_i (1<=i<=7)$ in said list 1, X, $X^2$, Y, $X^3$, XY, and $X^4$ of said monomial is calculated to obtained a polynomial $a^{(i)}_1+a^{(i)}_2 X$, to arrange its coefficients in order of the monomial order 1, X, . . . of the algebraic curve parameter file A, and to generate a vector $w^{(i)}_1=(a^{(i)}_1,a^{(i)}_2)$.

Furthermore, the ideal composition section 11 calculates a remainder to be attained by dividing $M_i$ by $I_2$, obtains a polynomial $b^{(i)}_1+b^{(i)}_2 X$, arranges its coefficients in order of the monomial order 1, X, . . . of the algebraic curve parameter file A, generates a vector $w^{(i)}_2=(b^{(i)}_1,b^{(i)}_2)$, and connects the above-mentioned two vectors $w^{(i)}_1$ and $w^{(i)}_2$ for generating a vector $v_i=(a^{(i)}_1,a^{(i)}_2,b^{(i)}_1,b^{(i)}_2)$. That is, divide $M_1=1$ by $I_1$: then $1=0\cdot(729+88X+X^2)+0\cdot(475+124X+Y)+1$, whereby 1 is obtained as a remainder to generate a vector $w^{(1)}_1=(1,0)$. Furthermore, divide $M_1=1$ by $I_2$: then $1=0\cdot(180+422X+X^2)+0\cdot(989+423X+Y)+1$, whereby 1 is obtained as a remainder to generate a vector $w^{(1)}_2=(1,0)$. $w^{(1)}_1$ and $w^{(1)}_2$ are connected to generate a vector $v_1=(1,0,1,0)$.

Next, divide $M_2=X$ by $I_1$: then $X=0\cdot(729+88X+X^2)+0\cdot(475+124X+Y)+X$, whereby, X is obtained as a remainder to generate a vector $w^{(2)}_1=(0,1)$. Furthermore, divide $M_2=X$ by $I_2$: then $X=0\cdot(180+422X+X^2)+0\cdot(989+423X+Y)+X$, whereby X is obtained as a remainder to generate a vector $w^{(2)}_2=(0,1)$. $w^{(2)}_1$ and $w^{(2)}_2$ are connected to generate a vector $v_2=(0,1,0,1)$.

Next, divide $M_3=X^2$ by $I_1$: then $X^2=1\cdot(729+88X+X^2)+0\cdot(475+124X+Y)+280+921X$, whereby, $280+921X$ is obtained as a remainder to generate a vector $w^{(3)}_1=(280,921)$. Furthermore, divide $M_3=X^2$ by $I_2$: then $X^2=1\cdot(180+422X+X^2)+0\cdot(989+423X+Y)+829+587X$, whereby $829+587X$ is obtained as a remainder to generate a vector $w^{(3)}_2=(829,587)$. $w^{(3)}_1$ and $w^{(3)}_2$ are connected to generate a vector $v_3=(280,921,829,587)$.

Next, divide $M_4=Y$ by $I_1$: then $Y=0\cdot(729+88X+X^2)+1\cdot(475+124X+Y)+534+885X$, whereby $534+885X$ is obtained as a remainder to generate a vector $w^{(4)}_1=(534,885)$. Furthermore, divide $M_4=Y$ by $I_2$: then $Y=0\cdot(180+422X+X^2)+1\cdot(989+423X+Y)+20+586X$, whereby $20+586X$ is obtained as a remainder to generate a vector $w^{(4)}_2=(20,586)$. $w^{(4)}_1$ and $w^{(4)}_2$ are connected to generate a vector $v_4=(534,885,20,586)$.

Next, divide $M_5=X^3$ by $I_1$: then $X^3=(921+X)(729+88X+X^2)+0\cdot(475+124X+Y)+585+961X$, whereby $585+961X$ is obtained as a remainder to generate a vector $w^{(5)}_1=(585,961)$. Furthermore, divide $M_5=X^3$ by $I_2$: then $X^3=(587+X)(180+422X+X^2)+0\cdot(989+423X+Y)+285+320X$, whereby $285+320X$ is obtained as a remainder to generate a vector $w^{(5)}_2=(285,320)$. $w^{(5)}_1$ and $w^{(5)}_2$ are connected to generate a vector $v_5=(585,961,285,320)$. Next, divide $M_6=XY$ by $I_1$: then $XY=885(729+88X+X^2)+X\cdot(475+124X+Y)+595+347X$, whereby $595+347X$ is obtained as a remainder to generate a vector $w^{(6)}_1=(595,347)$.

Furthermore, divide $M_6=XY$ by $I_2$: then $XY=586(180+422X+X^2)+X(989+423X+Y)+465+942X$, whereby $465+942X$ is obtained as a remainder to generate a vector $w^{(6)}_2=(465,942)$. $w^{(6)}_1$ and $w^{(6)}_2$ are connected to generate a vector $v_6=(595,347,465,942)$.

Finally, divide $M_7=X^4$ by $I_1$: then $X^4=(961+921X+X^2)(729+88X+X^2)+0\cdot(475+124X+Y)+686+773X$, whereby, $686+773X$ is obtained as a remainder to generate a vector $w^{(7)}_1=(686,773)$. Furthermore, divide $M_7=X^4$ by $I_2$: then $X^4=(320+587X+X^2)(180+422X+X^2)+0\cdot(989+423X+Y)+922+451X$, whereby $922+451X$ is obtained as a remainder to generate a vector $w^{(7)}_2=(922,451)$. $w^{(7)}_1$ and $w^{(7)}_2$ are connected to generate a vector $v_7=(686,773,922,451)$. Above, the process of the ideal composition section 11 in the monomial vector generation section 22 is finished.

Next, in the basis construction section 23, the ideal composition section 11 inputs seven four-dimensional vectors $v_1$, $v_2$, $v_3$, $v_4$, $v_5$, $v_6$, and $v_7$ generated in the monomial vector generation section 22 into the linear-relation derivation section 24, and obtains a plurality of seven-dimensional vectors $m_1$, $m_2$, . . . as an output. The linear-relation derivation section 24 derives a linear relation of the vectors, which were input, employing the discharging method. The discharging method belongs to a known art, whereby, as to the operation of the linear-relation derivation section 24, only its outline is shown below. The linear-relation derivation section 24 firstly arranges the seven four-dimensional vectors $v_1$, $v_2$, $v_3$, $v_4$, $v_5$, $v_6$, and $v_7$, which were input, in order for constructing a 7×4 matrix $$M_C = \begin{pmatrix} 1 & 0 & 1 & 0 \\ 0 & 1 & 0 & 1 \\ 280 & 921 & 829 & 587 \\ 534 & 885 & 20 & 586 \\ 585 & 961 & 285 & 320 \\ 595 & 347 & 465 & 942 \\ 686 & 773 & 922 & 451 \end{pmatrix} \quad [\text{EQ. 29}]$$

Next, the linear-relation derivation section 24 connects a seven-dimensional unity matrix to the matrix $M_C$ to obtain $$M'_C = \begin{pmatrix} 1 & 0 & 1 & 0 & 1 & 0 & 0 & 0 & 0 & 0 & 0 \\ 0 & 1 & 0 & 1 & 0 & 1 & 0 & 0 & 0 & 0 & 0 \\ 280 & 921 & 829 & 587 & 0 & 0 & 1 & 0 & 0 & 0 & 0 \\ 534 & 885 & 20 & 586 & 0 & 0 & 0 & 1 & 0 & 0 & 0 \\ 585 & 961 & 285 & 320 & 0 & 0 & 0 & 0 & 1 & 0 & 0 \\ 595 & 347 & 465 & 942 & 0 & 0 & 0 & 0 & 0 & 1 & 0 \\ 686 & 773 & 922 & 451 & 0 & 0 & 0 & 0 & 0 & 0 & 1 \end{pmatrix} \quad [\text{EQ. 30}]$$

Next, the linear-relation derivation section 24 triangulates a matrix $M'_C$ by adding a constant multiple of an i-th row to an (i+1)-th row (i=1,2, . . . ,4) to a seventh row to obtain the following a matrix m.

$$m = \begin{pmatrix} 1 & 0 & 1 & 0 & 1 & 0 & 0 & 0 & 0 & 0 & 0 \\ 0 & 1 & 0 & 1 & 0 & 1 & 0 & 0 & 0 & 0 & 0 \\ 0 & 0 & 549 & 675 & 729 & 88 & 1 & 0 & 0 & 0 & 0 \\ 0 & 0 & 0 & 548 & 744 & 789 & 363 & 1 & 0 & 0 & 0 \\ 0 & 0 & 0 & 0 & 444 & 709 & 900 & 42 & 1 & 0 & 0 \\ 0 & 0 & 0 & 0 & 969 & 716 & 940 & 619 & 0 & 1 & 0 \\ 0 & 0 & 0 & 0 & 635 & 230 & 807 & 778 & 0 & 0 & 1 \end{pmatrix} \quad [\text{EQ. 31}]$$

As well known, the vector that is composed of a fifth component and afterward of a fifth row to a seventh row of the matrix m is a vector $\{(m_{1,1}, m_{1,2}, \ldots, m_{1,7}), (m_{2,1}, m_{2,2}, \ldots, m_{2,7}), \ldots\}$ representing a linearly-independent linear dependence relation $\Sigma_{i=1}^{7} m_{ji} v_i = 0 (j=1,2, \ldots)$ of all of the seven four-dimensional vectors $v_1$, $v_2$, $v_3$, $v_4$, $v_5$, $v_6$, and $v_7$ that were input.

The linear-relation derivation section 24 outputs a vector $m_1 = (444, 709, 900, 42, 1, 0, 0)$ that is composed of the fifth component and afterward of the fifth row of the matrix m, a vector $m_2 = (969, 716, 940, 619, 0, 1, 0)$ that is composed of the fifth component and afterward of the sixth row of the matrix m, and a vector $m_3 = (635, 230, 807, 778, 0, 0, 1)$ that is composed of the fifth component and afterward of the seventh row of the matrix m.

Now return to the explanation of the process of the ideal composition section 11 in the basis construction section 23. Next, the ideal composition section 11 makes a reference to the table for a Groebner basis construction of FIG. 15, retrieves a record, of which the value of the order field is said value $d_3 = 4$, and in which a vector of which the components that correspond to all component numbers described in the component number list field are all zero does not lie in said plurality of said vectors $m_1 = (444, 709, 900, 42, 1, 0, 0)$, $m_2 = (969, 716, 940, 619, 0, 1, 0)$, and $m_3 = (635, 230, 807, 778, 0, 0, 1)$. The value of the order field of a first record is 4, and a vector, of which the components that correspond to the component number lists, 5, 6, and 7 of the first record are all zero, does not lie in the vectors $m_1$, $m_2$, and $m_3$, whereby the first record is obtained as a retrieval result.

Furthermore, the value of the first vector type of the first record is (*,*,*,*,1,0,0)(A code * is interpreted as representing any number), which coincides with the vector $m_1 = (444, 709, 900, 42, 1, 0, 0)$, whereby the vector $m_1$ is regarded as a column of the coefficient of each monomial of the monomial order 1, X, $X^2$, Y, $X^3$, XY, and $X^4$ of the algebraic curve parameter file A to generate a polynomial $f_1 = 444 + 709X + 900X^2 + 42Y + X^3$.

Similarly, the value of the second vector type of the first record is (*,*,*,*,0,1,0)(A code * is interpreted as representing any number), which coincides with the vector $m_2 = (969, 716, 940, 619, 0, 1, 0)$, whereby the vector $m_2$ is regarded as a column of the coefficient of each monomial of the monomial order 1, X, $X^2$, Y, $X^3$, XY, and $X^4$ of the algebraic curve parameter file A to generate a polynomial $f_2 = 969 + 716X + 940X^2 + 619Y + XY$. The value of the third vector type of the first record is null, whereby it is neglected. Finally, the ideal composition section 11 constructs a set $J = \{f_{1,2}\} = \{444 + 709X + 900X^2 + 42Y + X^3, 969 + 716X + 940X^2 + 619Y + XY\}$ of the polynomial to output it. Above, the operation of the ideal composition section 11 is finished.

Next, the first ideal reduction section 12, which takes as an input the algebraic curve parameter file A of FIG. 12, and the Groebner bases $J = \{444 + 709X + 900X^2 + 42Y + X^3, 969 + 716X + 940X^2 + 619Y + XY\}$ that the ideal composition section 11 output, operates as follows according to a flow of the process of the functional block shown in FIG. 3. At first, the first ideal reduction section 12 makes a reference to the ideal type table of FIG. 12 in the ideal type classification section 31 of FIG. 3, retrieves a record in which the ideal type described in the ideal type field accords with the type of the input ideal J for obtaining a first record, and acquires a value N=41 of the ideal type number field and a value d=2 of the reduction order field of the first record.

Next, the ideal reduction section 12 confirms that said value d=2 is not zero, makes a reference to the monomial list table of FIG. 14 in the polynomial vector generation section 32, retrieves a record of which the value of the order field is said d=2 for obtaining a third record, and acquires a list 1, X, $X^2$, and Y of the monomial described in the monomial list field of the third record. Furthermore, the ideal reduction section 12 acquires a first element $f = 444 + 709X + 900X^2 + 42Y + X^3$, and a second element $g = 969 + 716X + 940X^2 + 619Y + XY$ of J (A third element does not lie in J, whereby a third polynomial h is not employed), regards a coefficient list 0, 7, 0, 0, 0, 0, 0, 0, 1, and 1 of the algebraic curve parameter file A as a column of the coefficient of each monomial of the monomial order 1, X, $X^2$, Y, $X^3$, XY, $X^4$, $X^2Y$, $X^5$, and $Y^2$ of the algebraic curve parameter file A, and generates a defining polynomial $F = Y^2 + X^5 + 7X$.

Next, for each of $M_i (1 <= i <= 4)$ in said list 1, X, $X^2$, and Y of said monomial, the ideal reduction section 12 calculates a remainder equation $r_i$ of a product $M_i \cdot g$ of $M_i$ and the polynomial g by the polynomials f and F, arranges its coefficients in order of the monomial order 1, X, $X^2$, Y, $X^3$, XY, $X^4$, and $X^2Y$ of the algebraic curve parameter file A, and generates a vector $v_i$. That is, at first, for a first monomial $M_1 = 1$, divide $1 \cdot g = 969 + 716X + 940X^2 + 619Y + XY$ by $f = 444 + 709X + 900X^2 + 42Y + X^3$ and $F = Y^2 + X^5 + 7X$: then $g = 0 \cdot f + 0 \cdot F + 969 + 716X + 940X^2 + 619Y + XY$, whereby a remainder 969+

$716X+940X^2+619Y+XY$ is obtained to generate a vector $v_1=(969,716,940,619,0,1,0,0)$.

Next, a second monomial $M_2=X$, divide $Xg=X(969+716X+940X^2+619Y+XY)$ by $f=444+709X+900X^2+42Y+X^3$ and $F=Y^2+X^5+7X$: then $Xg=940f+0\cdot F+366+449X+258X^2+880Y+619XY+X^2Y$, whereby a remainder $366+449X+258X^2+880Y+619XY+X^2Y$ is obtained to generate a vector $v_2=(366,449,258,880,0,619,0,1)$.

Next, a third monomial $M_3=X^2$, divide $X^2g=X^2(969+716X+940X^2+619Y+XY)$ by $f=444+709X+900X^2+42Y+X^3$ and $F=Y^2+X^5+7X$: then $X^2g=(297+473X+42X^2+Y)f+967F+311+462X+199X^2+199Y+614XY+982X^2Y$, whereby a remainder $311+462X+199X^2+199Y+614XY+982X^2Y$ is obtained to generate a vector $v_3=(311,462,199,199,0,614,0,982)$.

Finally, a fourth monomial $M_4=Y$, divide $Yg=Y(969+716X+940X^2+619Y+XY)$ by $f=444+709X+900X^2+42Y+X^3$ and $F=Y^2+X^5+7X$: then $Yg=(994+625X+27X^2+1008X^3+42Y)f+(873+X)F+606+463X+322X^2+104Y+183XY+348X^2Y$, whereby a remainder $606+463X+322X^2+104Y+183XY+348X^2Y$ is obtained to generate a vector $v_4=(606,463,322,104,0,183,0,348)$. Above, the process of the ideal reduction section 12 in the polynomial vector generation section 32 is finished.

Next, in the basis construction section 33, the first ideal reduction section 12 inputs four eight-dimensional vectors $v_1$, $v_2$, $v_3$, and $v_4$ generated in the polynomial vector generation section 32 into the linear-relation derivation section 34, and obtains a plurality of four-dimensional vectors $m_1$, $m_2$, ... as an output. The linear-relation derivation section 34 derives a linear relation of the vectors, which were input, employing the discharging method. The discharging method belongs to a known art, whereby, as to the operation of the linear-relation derivation section 34, only its outline is shown below.

The linear-relation derivation section 34 firstly arranges the four eight-dimensional vectors $v_1$, $v_2$, $v_3$, and, $v_4$, which were input, in order for constructing a 4×8 matrix $$M_R = \begin{pmatrix} 969 & 716 & 940 & 619 & 0 & 1 & 0 & 0 \\ 366 & 449 & 258 & 880 & 0 & 619 & 0 & 1 \\ 311 & 462 & 199 & 199 & 0 & 614 & 0 & 982 \\ 606 & 463 & 322 & 104 & 0 & 183 & 0 & 348 \end{pmatrix} \quad [\text{EQ. 32}]$$

Next, the linear-relation derivation section 34 connects a four-dimensional unity matrix to the matrix $M_R$ to construct $$M'_R = \begin{pmatrix} 969 & 716 & 940 & 619 & 0 & 1 & 0 & 0 & 1 & 0 & 0 & 0 \\ 366 & 449 & 258 & 880 & 0 & 619 & 0 & 1 & 0 & 1 & 0 & 0 \\ 311 & 462 & 199 & 199 & 0 & 614 & 0 & 982 & 0 & 0 & 1 & 0 \\ 606 & 463 & 322 & 104 & 0 & 183 & 0 & 348 & 0 & 0 & 0 & 1 \end{pmatrix} \quad [\text{EQ. 33}]$$

Next, the linear-relation derivation section 34 triangulates a matrix $M'_R$ by adding a constant multiple of an i-th row to an (i+1)-th row (i=1,2) to a fourth row to obtain the following matrix m.

$$m = \begin{pmatrix} 969 & 716 & 940 & 619 & 0 & 1 & 0 & 0 & 1 & 0 & 0 & 0 \\ 0 & 341 & 787 & 848 & 0 & 275 & 0 & 1 & 665 & 1 & 0 & 0 \\ 0 & 0 & 0 & 0 & 0 & 0 & 0 & 835 & 27 & 1 & 0 \\ 0 & 0 & 0 & 0 & 0 & 0 & 0 & 0 & 312 & 661 & 0 & 1 \end{pmatrix} \quad [\text{EQ. 34}]$$

As well known, the vector that is composed of a ninth component and afterward of a third row and a fourth row of the matrix m is a vector $\{(m_{1,1}, m_{1,2}, \ldots, m_{1,4}), (m_{2,1}, m_{2,2}, \ldots, m_{2,4}), \ldots\}$ representing a linearly-independent linear dependence relation $\Sigma_{i=1}^{4} m_{ji} v_i = 0 (j=1,2,\ldots)$ of all of the four eight-dimensional vectors $v_1$, $v_2$, $v_3$, and $v_4$ that were input. The linear-relation derivation section 34 outputs a vector $m_1=(835,27,1,0)$ that is composed of the ninth component and afterward of the third row of the matrix m, and a vector $m_2=(312,661,0,1)$ that is composed of the ninth component and afterward of the fourth row of the matrix m.

Now return to the explanation of the process of the first ideal reduction section 12 in the basis construction section 33. Next, the ideal reduction section 12 makes a reference to the table for a Groebner basis construction of FIG. 15, and retrieves a record, of which the value of the order field is said value d=2, and in which a vector of which the components that correspond to all component numbers described in the component number list field are all zero does not lie in said plurality of said vectors $m_1=(835,27,1,0)$, and $m_2=(312,661,0,1)$. The value of the order field of a sixth record is 2, and a vector, of which the components that correspond to the component number lists 3 and 4 of the sixth record are all zero, does not lie in the vectors $m_1$ and $m_2$, whereby the sixth record is obtained as a retrieval result.

Furthermore, the value of the first vector type of the sixth record is $(*,*,1,0)$(A code $*$ is interpreted as representing any number), which coincides with the vector $m_1=(835,27,1,0)$, whereby the vector $m_1$ is regarded as a column of the coefficient of each monomial of the monomial order 1, X, $X^2$, and Y of the algebraic curve parameter file A to generate a polynomial $f_1=835+27X+X^2$. Similarly, the value of the second vector type of the sixth record is $(*,*,0,1)$(A code $*$ is interpreted as representing any number), which coincides with the vector $m_2=(312,661,0,1)$, whereby the vector $m_2$ is regarded as a column of the coefficient of each monomial of the monomial order 1, X, $X^2$,and Y of the algebraic curve parameter file A to generate a polynomial $f_2=312+661X+Y$. The value of the third vector type of the sixth record is null, whereby it is neglected. Finally, the ideal reduction section 12 constructs a set $J^*=\{f_1,f_2\}=\{835+27X+X^2, 312+661X+Y\}$ of the polynomial to output it. Above, the operation of the first ideal reduction section 12 is finished.

Next, the second ideal reduction section 13, which takes as an input the algebraic curve parameter file A of FIG. 12, and the Groebner basis $J^*=\{f_1,f_2\}=\{835+27X+X^2, 312+661X+Y\}$ that the first ideal reduction section 12 output, operates as follows according to a flow of the process of the functional block shown in FIG. 3. At first, the second ideal reduction section 13 makes a reference to the ideal type table of FIG. 13 in the ideal type classification section 31 of FIG. 3, retrieves a record in which the ideal type described in the ideal type field accords with the type of the input ideal $J^*$ for obtaining a sixth record, and acquires a value N=21 of the ideal type number field and a value d=2 of the reduction order field of the sixth record.

Next, the ideal reduction section 13 confirms that said value d=2 is not zero, makes a reference to the monomial list table of FIG. 14 in the polynomial vector generation section 32, retrieves a record of which the value of the order field is said d=2 for obtaining a third record, and acquires a list 1, X, $X^2$, and Y of the monomial described in the monomial list field of the third record. Furthermore, the ideal reduction section 13 acquires a first element f=835+27X+$X^2$, and a second element g=312+661X+Y of J* (A third element does not lie in J*, whereby a third polynomial h is not employed), regards a coefficient list 0, 7, 0, 0, 0, 0, 0, 0, 1, and 1 of the algebraic curve parameter file A as a column of the coefficient of each monomial of the monomial order 1, X, $X^2$, Y, $X^3$, XY, $X^4$, $X^2$Y, $X^5$, and $Y^2$ of the algebraic curve parameter file A, and generates a defining polynomial F=$Y^2$+$X^5$+7X.

Next, for each of $M_i$(1<=i<=4) in said list 1, X, $X^2$ and Y of said monomial, the ideal reduction section 13 calculates a remainder equation $r_i$ of a product Mi·g of $M_i$ and the polynomial g by the polynomials f and F, arranges its coefficients in order of the monomial order 1, X, $X^2$, Y, $X^3$, XY, $X^4$, and $X^2$Y of the algebraic curve parameter file A, and generates a vector $v_i$. That is, at first, for a first monomial $M_1$=1, divide 1·g=312+661X+Y by f=835+27X+$X^2$ and F=$Y^2$+$X^5$+7X: then g=0·f+0·F+312+661X+Y, whereby a remainder 312+661X+Y is obtained to generate a vector $v_1$=(312,661,0,1,0,0).

Next, a second monomial $M_2$=X, divide Xg=X(312+661X+Y) by f=835+27X+$X^2$ and F=$Y^2$+$X^5$+7X: then Xg=661f+0·F+997+627X+XY, whereby a remainder 997+627X+XY is obtained to generate a vector $v_2$=(997,627,0,0,0,1). Next, a third monomial $M_3$=$X^2$, divide $X^2$g=$X^2$(312+661X+Y) by f=835+27X+$X^2$ and F=$Y^2$+$X^5$+7X: then $X^2$g=(627+661X+Y)f+0·F+126+212X+174Y+982XY, whereby a remainder 126+212X+174Y+982XY is obtained to generate a vector $v_3$=(126,212,0,174,0,982).

Finally, a fourth monomial $M_4$=Y, divide Yg=Y(312+661X+Y) by f=835+27X+$X^2$ and F=$Y^2$+$X^5$+7X: then Yg=(827+106X+27$X^2$+1008$X^3$)f+1·F+620+144X+312Y+661XY, whereby a remainder 620+144X+312Y+661XY is obtained to generate a vector $v_4$=(620,144,0,312,0,661). Above, the process of the second ideal reduction section 13 in the polynomial vector generation section 32 is finished.

Next, in the basis construction section 33, this second ideal reduction section 13 inputs four six-dimensional vectors $v_1$, $v_2$, $v_3$, and $v_4$ generated in the polynomial vector generation section 32 into the linear-relation derivation section 34, and obtains a plurality of four-dimensional vectors $m_1$, $m_2$, . . . as an output. The linear-relation derivation section 34 derives a linear relation of the vectors, which were input, employing the discharging method. The discharging method belongs to a known art, whereby, as to the operation of the linear-relation derivation section 34, only its outline is shown below.

The linear-relation derivation section 34 firstly arranges the four six-dimensional vectors $v_1$, $v_2$, $v_3$, and, $v_4$, which were input, in order for constructing a 4×6 matrix $$M_R = \begin{pmatrix} 312 & 661 & 0 & 1 & 0 & 0 \\ 997 & 627 & 0 & 0 & 0 & 1 \\ 126 & 212 & 0 & 174 & 0 & 982 \\ 620 & 144 & 0 & 312 & 0 & 661 \end{pmatrix} \quad [\text{EQ. 35}]$$

Next, the linear-relation derivation section 34 connects a four-dimensional unity matrix to the matrix $M_R$ to construct $$M'_R = \begin{pmatrix} 312 & 661 & 0 & 1 & 0 & 0 & 1 & 0 & 0 & 0 \\ 997 & 627 & 0 & 0 & 0 & 1 & 0 & 1 & 0 & 0 \\ 126 & 212 & 0 & 174 & 0 & 982 & 0 & 0 & 1 & 0 \\ 620 & 144 & 0 & 312 & 0 & 661 & 0 & 0 & 0 & 1 \end{pmatrix} \quad [\text{EQ. 36}]$$

Next, the linear-relation derivation section 34 triangulates a matrix $M'_R$ by adding a constant multiple of an i-th row to an (i+1)-th row (i=1,2) to a fourth row to obtain the following matrix m.

$$m = \begin{pmatrix} 312 & 661 & 0 & 1 & 0 & 0 & 1 & 0 & 0 & 0 \\ 0 & 536 & 0 & 815 & 0 & 1 & 815 & 1 & 0 & 0 \\ 0 & 0 & 0 & 0 & 0 & 0 & 835 & 27 & 1 & 0 \\ 0 & 0 & 0 & 0 & 0 & 0 & 697 & 348 & 0 & 1 \end{pmatrix} \quad [\text{EQ. 37}]$$

As well known, the vector that is composed of a seventh component and afterward of a third row and a fourth row of the matrix m is a vector {($m_{1,1}$,$m_{1,2}$, . . . ,$m_{1,4}$), ($m_{2,1}$, $m_{2,2}$, . . . ,$m_{2,4}$), . . . } representing a linearly-independent linear dependence relation $\Sigma_{i=1}^{4} m_{ji} v_i$=0(j=1,2, . . . ) of all of the four six-dimensional vectors $v_1$, $v_2$, $v_3$, and $v_4$ that were input.

The linear-relation derivation section 34 outputs a vector $m_1$=(835,27,1,0) that is composed of the seventh component and afterward of the third row of the matrix m, and a vector $m_2$=(697,348,0,1) that is composed of the seventh component and afterward of the fourth row of the matrix m. Now return to the explanation of the process of the ideal reduction section 13 in the basis construction section 33. Next, the ideal reduction section 13 makes a reference to the table for a Groebner basis construction of FIG. 15, retrieves a record, of which the value of the order field is said value d=2, and in which a vector of which the components that correspond to all component numbers described in the component number list field are all zero does not lie in said plurality of said vectors $m_1$=(835,27,1,0), and $m_2$=(697,348,0,1). The value of the order field of a sixth record is 2, and a vector, of which the component number lists 3 and 4 of the sixth record are all zero, does not lie in the vectors $m_1$, and $m_2$, whereby the sixth record is obtained as a retrieval result.

Furthermore, the value of the first vector type of the sixth record is (*,*,1,0)(A code * is interpreted as representing any number), which coincides with the vector $m_1$=(835,27,1,0), whereby the vector $m_1$ is regarded as a column of the coefficient of each monomial of the monomial order 1, X, $X^2$, and Y of the algebraic curve parameter file A to generate a polynomial $f_1$=835+27X+$X^2$. Similarly, the value of the second vector type of the sixth record is (*,*,0,1)(A code * is interpreted as representing any number), which coincides with the vector $m_2$=(697,348,0,1), whereby the vector $m_2$ is regarded as a column of the coefficient of each monomial of the monomial order 1, X, $X^2$,and Y of the algebraic curve parameter file A to generate a polynomial $f_2$=697+348X+Y. The value of the third vector type of the sixth record is null, whereby it is neglected. Finally, the ideal reduction section 13 constructs a set J={$f_1$,$f_2$}={835+27X+$X^2$,697+348X+Y} of the polynomial to output it. Above, the operation of the ideal reduction section 13 is finished. Finally, in the Jacobian group adder of FIG. 1, the Groebner basis J={835+27X+$X^2$,697+348X+Y}, which the second ideal reduction section 13 output, is output from the output apparatus.

The effect exists: employment of the present invention allows the addition in the Jacobian group of the $C_{ab}$ curve to be calculated at a high speed, and practicality of the $C_{ab}$ curve to be enhanced.

The present invention has been described with reference to the preferred embodiments. However, it will be appreciated by those skilled in the relevant field that a number of other embodiments, differing from those specifically described, will also fall within the spirit and scope of the present invention. Accordingly, it will be understood that the invention is not intended to be limited to the embodiments described in the specification. The scope of the invention is only limited by attached claims.

The entire disclosure of Japanese Patent Application No. 2002-240034 filed on Aug. 21, 2002 including specification, claims, drawing and summary are incorporated herein by reference in its entirety.

What is claimed is:

1. A Jacobian group element adder, which is an arithmetic unit for executing addition in a Jacobian group of an algebraic curve defined by a polynomial defined over a finite field that is $$Y^3 + \alpha_0 X^4 + \alpha_1 XY^2 + \alpha_2 X^2 Y + \alpha_3 X^3 + \alpha_4 Y^2 + \alpha_5 XY + \alpha_6 X^2 + \alpha_7 Y + \alpha_8 X + \alpha_9$$

or $$Y^2 + \alpha_0 X^5 + \alpha_1 X^2 Y + \alpha_2 X^4 + \alpha_3 XY + \alpha_4 X^3 + \alpha_5 Y + \alpha_6 X^2 + \alpha_7 X + \alpha_8$$

or $$Y^2 + \alpha_0 X^7 + \alpha_1 X^3 Y + \alpha_2 X^6 + \alpha_3 X^2 Y + \alpha_4 X^5 + \alpha_5 XY + \alpha_6 X^4 + \alpha_7 Y + \alpha_8 X^3 + \alpha_9 X^2 + \alpha_{10} X + \alpha_{11},$$

said Jacobian group element adder comprising:

means for inputting an algebraic curve parameter file having an order of a field of definition, a monomial order, and a coefficient list described as a parameter representing said algebraic curve;

means for inputting Groebner bases $I_1$ and $I_2$ of ideals of the coordinate ring of the algebraic curve designated by said algebraic curve parameter file, said Groebner bases representing elements of said Jacobian group;

ideal reduction means for, in the coordinate ring of the algebraic curve designated by said algebraic curve parameter file, performing arithmetic of producing a Groebner basis J of the ideal which is a product of the ideal that the Groebner basis $I_1$ generates, and the ideal that the Groebner basis $I_2$ generates;

first ideal reduction means for, in the coordinate ring of the algebraic curve designated by said algebraic curve parameter file, performing arithmetic of producing a Groebner basis J* of the ideal, which is smallest in the monomial order designated by said algebraic curve parameter file among the ideals equivalent to an inverse ideal of the ideal that the Groebner basis J generates; and second ideal reduction means for, in the coordinate ring of the algebraic curve designated by said algebraic curve parameter file, performing arithmetic of producing a Groebner basis J** of the ideal, which is smallest in the monomial order designated by said algebraic curve parameter file among the ideals equivalent to an inverse ideal of the ideal that the Groebner basis J* generates, to output it.

2. The Jacobian group element adder according to claim 1, wherein said ideal composition means has:

linear-relation derivation means for, for a plurality of vectors $v_1, v_2, \ldots,$ and $v_n$ that were input, outputting a plurality of vectors $\{m_1=(m_{1,1}, m_{1,2}, \ldots, m_{1,n}), m_2=(m_{2,1}, m_{2,2}, \ldots, m_{2,n}), \ldots\}$ representing linear dependence relations $\Sigma_i m_{j,i} v_i = 0 (j=1,2, \ldots)$ of all of them employing a discharging method;

an ideal type table that is composed of a record number field, an ideal type number field, an order field, and an ideal type field;

a monomial list table that is composed of the record number field, the order field, and a monomial list field;

a table for a Groebner basis construction that is composed of the record number field, the order field, a component number list field, a first vector type field, a second vector type field, and a third vector type field;

ideal type classification means for acquiring said algebraic curve parameter file to make a reference to said ideal type table for each of Groebner bases $I_1$ and $I_2$ that were input, to retrieve a record in which the ideal type described in the ideal type field accords with the type of an input ideal $I_i(i=1,2)$, and to acquire a value $N_i$ of the ideal type number field and a value $d_i$ of the order field of the retrieved record;

monomial vector generation means for calculating a sum $d_3 = d_1 + d_2$ of said values $d_1$ and $d_2$ of said order field to make a reference to said monomial list table for retrieving a record R of which a value of the order field is said $d_3$, to acquire a list $M_1, M_2, \ldots$ of the monomial described in said monomial list field of said record R, when $I_1$ and $I_2$ are different, to calculate a remainder equation $r_i$ of dividing each said monomial $M_i$ by $I_1$, to generate a vector $w^{(i)}_1$ that is composed of coefficients of the remainder equation $r_i$ according to the monomial order described in said algebraic curve parameter file, furthermore to calculate a remainder equation $s_i$ of dividing $M_i$ by $I_2$, to generate a vector $w^{(i)}_2$ that is composed of coefficients of the remainder equation $s_i$ according to the monomial order described in an algebraic curve parameter file A, to connect the above-mentioned two vectors $w^{(i)}_1$ and $w^{(i)}_2$ for generating a vector $v_i$, also, when $I_1$ and $I_2$ are equal, to calculate a remainder equation $r_i$ of dividing each said monomial $M_i$ by $I_1$, to generate a vector $w^{(i)}_1$ that is composed of coefficients of the remainder equation $r_i$ according to the monomial order described in said algebraic curve parameter file, furthermore to construct a defining polynomial F employing the coefficient list and the monomial order described in said algebraic curve parameter file, when a differential of a polynomial M with regard to by its X is expressed by $D_X(M)$, and a differential of the polynomial M with regard to by its Y is expressed by $D_Y(M)$, to calculate a remainder equation $s_i$ of dividing a polynomial $D_X(M_i)D_Y(F) - D_Y(M_i)D_X(F)$ by $I_1$, to generate a vector $w^{(i)}_2$ that is composed of coefficients of the remainder equation $s_i$ according to the monomial order described in said algebraic curve parameter file, and to connect the above-mentioned two vectors $w^{(i)}_1$ and $w^{(i)}_2$ for generating a vector $v_i$; and basis construction means for inputting said plurality of said vectors $v_1, v_2, \ldots$ into said linear-relation derivation means, to acquire a plurality of vectors $m_1, m_2, \ldots$ as an output, to make an reference to said table for a Groebner basis construction for retrieving a record $R_2$, of which a value of the order field is said value $d_3$, and in which a vector of which the components that correspond to all component numbers described in the component number list field are all zero does not lie in said plurality of said vectors $m_1, m_2, \ldots,$ to select a vector m that accords with a first vector type of said record $R_2$ from among said plurality of said vectors $m_1, m_2, \ldots,$ to generate a polynomial $f_1$ of which the coefficient is a value of a component of the vector m according to the monomial order described in said algebraic curve parameter file, hereinafter, similarly, to generate a polynomial $f_2$ employing a vector that accords with a second vector type, and also a polynomial $f_3$ employing a vector that accords with a third vector type, to obtain a set $J=\{f_1,f_2,f_3\}$ of the polynomial, and to output it as said Groebner basis J.

3. The Jacobian group element adder according to one of claim 1 and claim 2, wherein each of said first and said second ideal reduction means has:

linear-relation derivation means for, for a plurality of vectors $v_1, v_2, \ldots,$ and $v_n$ that were input, outputting a plurality of vectors $\{m_1=(m_{1,1},m_{1,2}, \ldots ,m_{1,n}), m_2=(m_{2,1},m_{2,2}, \ldots ,m_{2,n}), \ldots \}$ representing linear dependence relations $\Sigma_i m_{j,i} v_i = 0 (j=1,2, \ldots )$ of all of them employing a discharging method;

an ideal type table that is composed of the record number field, the ideal type number field, a reduction order field, and the ideal type field;

a monomial list table that is composed of the record number field, the order field, and the monomial list field;

a table for a Groebner basis construction that is composed of the record number field, the order field, the component number list field, the first vector type field, the second vector type field, and the third vector type field;

ideal type classification means for acquiring said algebraic curve parameter file to make a reference to said ideal type table, to retrieve a record in which the ideal type described in the ideal type field accords with the type of an input ideal J, to acquires a value N of the ideal type number field and a value d of the reduction order field of the retrieved record;

polynomial vector generation means for, when said d is zero, outputting the input ideal J as said Groebner basis $J^*$, when said d is not zero, to make a reference to said monomial list table for retrieving a record R of which a value of the order field is said d, to acquire a list $M_1, M_2, \ldots$ of the monomial described in the monomial list field of said record R, to construct a defining polynomial F employing the coefficient list and the monomial order described in said algebraic curve parameter file, to acquire a first polynomial f, a second polynomial g, and a third polynomial h of the input ideal J, to calculate a remainder equation $r_i$ of a product $M_i \cdot g$ of each said monomial $M_i$ and the polynomial g by the polynomials f and F, to generate a vector $w^{(i)}_1$ that is composed of coefficients of the remainder equation $r_i$ according to the monomial order described in said algebraic curve parameter file, furthermore to calculate a remainder equation $s_i$ of a product $M_i \cdot h$ of each said monomial $M_i$ and the polynomial h by the polynomials f and F, to generate a vector $w^{(i)}_2$ that is composed of coefficients of the remainder equation $s_i$ according to the monomial order described in said algebraic curve parameter file, and to connect the above-mentioned two vectors $w^{(i)}_1$ and $w^{(i)}_2$ for generating a vector $v_i$;

and basis construction means for inputting said plurality of said vectors $v_1, v_2, \ldots$ into said linear-relation derivation means, to obtain a plurality of vectors $m_1, m_2, \ldots$ as an output, to make a reference to said table for a Groebner basis construction for retrieving a record $R_2$ of which a value of the order field is said value d, and in which a vector of which the components that correspond to all component numbers described in the component number list field are all zero does not lie in said plurality of said vectors $m_1, m_2, \ldots,$ to select a vector m that accords with a first vector type of said record $R_2$ from among said plurality of said vectors $m_1, m_2, \ldots,$ to generate a polynomial $f_1$ of which a coefficient is a value of the component of the vector m according to the monomial order described in said algebraic curve parameter file, hereinafter, similarly, to generate a polynomial $f_2$ employing the vector that accords with a second vector type, and also a polynomial $f_3$ employing the vector that accords with a third vector type, to obtain a set $\{f_1,f_2,f_3\}$ of the polynomial, and to output it as said Groebner basis $J^*$ or $J^{**}$.

4. A record medium having a program recorded for causing an information processing unit configuring an arithmetic unit for executing addition in a Jacobian group of an algebraic curve defined by a polynomial defined over a finite field that is $$Y^3+\alpha_0 X^4+\alpha_1 XY^2+\alpha_2 X^2 Y+\alpha_3 X^3+\alpha_4 Y^2+\alpha_5 XY+\alpha_6 X^2+\alpha_7 Y+\alpha_8 X+\alpha_9$$

or $$Y^2+\alpha_0 X^5+\alpha_1 X^2 Y+\alpha_2 X^4+\alpha_3 XY+\alpha_4 X^3+\alpha_5 Y+\alpha_6 X^2+\alpha_7 X+\alpha_8$$

or $$Y_2+\alpha_0 X^7+\alpha_1 X^3 Y+\alpha_2 X^6+\alpha_3 X^2 Y+\alpha_4 X^5+\alpha_5 XY+\alpha_6 X^4+\alpha_7 Y+\alpha_8 X^3+\alpha_9 X^2+\alpha_{10} X+\alpha_{11} \text{ to perform:}$$

a process of inputting an algebraic curve parameter file having an order of a field of definition, a monomial order, and a coefficient list described as a parameter representing said algebraic curve;

a process of inputting Groebner bases $I_1$ and $I_2$ of ideals of the coordinate ring of the algebraic curve designated by said algebraic curve parameter file, said Groebner bases representing an element of said Jacobian group;

an ideal composition process of, in the coordinate ring of the algebraic curve designated by said algebraic curve parameter file, performing arithmetic of producing a Groebner basis J of an ideal which is a product of the ideal that the Groebner basis $I_1$ generates, and an ideal that the Groebner basis $I_2$ generates;

a first ideal reduction process of, in the coordinate ring of the algebraic curve designated by said algebraic curve parameter file, performing arithmetic of producing a Groebner basis $J^*$ of the ideal, which is smallest in the monomial order designated by said algebraic curve parameter file among the ideals equivalent to an inverse ideal of the ideal that the Groebner basis J generates; and a second ideal reduction process of, in the coordinate ring of the algebraic curve designated by said algebraic curve parameter file, performing arithmetic of producing a Groebner basis $J^{**}$ of the ideal, which is smallest in the monomial order designated by said algebraic curve parameter file among the ideals equivalent to an inverse ideal of the ideal that the Groebner basis $J^*$ generates, to output it, said record medium being readable by said information processing unit.

5. The record medium according to claim 4, said record medium having a program recorded for causing said information processing unit to further perform in said ideal composition process:

a linear-relation derivation process of, for a plurality of vectors $v_1, v_2, \ldots,$ and $v_n$ that were input, outputting a plurality of vectors $\{m_1=(m_{1,1},m_{2,1}, \ldots ,m_{1,n}), m_2=(m_{2,1},m_{2,2}, \ldots ,m_{2,n}), \ldots \}$ representing linear dependence relations $\Sigma_i m_{j,i} v_i = 0 (j=1,2, \ldots)$ of all of them employing a discharging method;

an ideal type classification process of acquiring said algebraic curve parameter file to make a reference to an ideal type table, which is composed of a record number field, an ideal type number field, an order field, and an ideal type field, for each of Groebner bases $I_1$ and $I_2$ that were input, to retrieve a record in which the ideal type described in the ideal type field accords with the type of an input ideal $I_i (i=1,2)$, and to acquire a value $N_i$ of the ideal type number field and a value $d_i$ of the order field of the retrieved record;

a monomial vector generation process of calculating a sum $d_3 = d_1 + d_2$ of said values $d_1$ and $d_2$ of said order field to make a reference to a monomial list table, which is composed of the record number field, the order field, and a monomial list field, for retrieving a record R of which a value of the order field is said $d_3$, to acquire a list $M_1, M_2, \ldots$ of the monomial described in said monomial list field of said record R, when $I_1$ and $I_2$ are different, to calculate a remainder equation $r_i$ of dividing each said monomial $M_i$ by $I_1$, to generate a vector $w^{(i)}_1$ that is composed of coefficients of the remainder equation $r_i$ according to the monomial order described in said algebraic curve parameter file, furthermore to calculate a remainder equation $s_i$ of dividing $M_i$ by $I_2$, to generate a vector $w^{(i)}_2$ that is composed of coefficients of the remainder equation $s_i$ according to the monomial order described in an algebraic curve parameter file A, to connect the above-mentioned two vectors $w^{(i)}_1$ and $w^{(i)}_2$ for generating a vector $v_i$, also, when $I_1$ and $I_2$ are equal, to calculate a remainder equation $r_i$ of dividing each said monomial $M_i$ by $I_1$, to generate a vector $w^{(i)}_1$ that is composed of coefficients of the remainder equation $r_i$ according to the monomial order described in said algebraic curve parameter file, furthermore to construct a defining polynomial F employing the coefficient list and the monomial order described in said algebraic curve parameter file, when a differential of a polynomial M with regard to by its X is expressed by $D_X(M)$, and a differential of the polynomial M with regard to by its Y is expressed by $D_Y(M)$, to calculate a remainder equation $s_i$ of dividing a polynomial $D_X(M_i)D_Y(F) - D_Y(M_i)D_X(F)$ by $I_1$, to generate a vector $w^{(i)}_2$ that is composed of coefficients of the remainder equation $s_i$ according to the monomial order described in said algebraic curve parameter file, and to connect the above-mentioned two vectors $w^{(i)}_1$ and $w^{(i)}_2$ for generating a vector $v_i$; and a basis construction process of obtaining a plurality of vectors $m_1, m_2, \ldots$ output in said linear-relation derivation process, to make an reference to a table for a Groebner basis construction, which is composed of the record number field, the order field, a component number list field, a first vector type field, a second vector type field, and a third vector type field, for retrieving a record $R_2$, of which a value of the order field is said value $d_3$, and in which a vector of which the components that correspond to all component numbers described in the component number list field are all zero does not lie in said plurality of said vectors $m_1, m_2, \ldots,$ to select a vector m that accords with a first vector type of said record $R_2$ from among said plurality of said vectors $m_1, m_2, \ldots,$ to generate a polynomial $f_1$ of which the coefficient is a value of a component of the vector m according to the monomial order described in said algebraic curve parameter file, hereinafter, similarly, to generate a polynomial $f_2$ employing a vector that accords with a second vector type, and also a polynomial $f_3$ employing a vector that accords with a third vector type, to obtain a set $J=\{f_1,f_2,f_3\}$ of the polynomial, and to output it as said Groebner basis J.

6. The record medium according to one of claim 4 and claim 5, said record medium having a program recorded for causing said information processing to further perform in each of said first and second ideal reduction processes:

a linear-relation derivation process of, for a plurality of vectors $v_1, v_2, \ldots,$ and $v_n$ that were input, outputting a plurality of vectors $\{m_1=(m_{1,1},m_{1,2}, \ldots ,m_{1,n}), m_2=(m_{2,1},m_{2,2}, \ldots ,m_{2,n}), \ldots \}$ representing linear dependence relations $\Sigma_i m_{j,i} v_i = 0 (j=1,2, \ldots)$ of all of them employing a discharging method;

an ideal type classification process of acquiring said algebraic curve parameter file to make a reference to a ideal type table, which is composed of the record number field, the ideal type number field, a reduction order field, and the ideal type field, to retrieve a record in which the ideal type described in the ideal type field accords with the type of an input ideal J, and to acquire a value N of the ideal type number field and a value d of the reduction order field of the retrieved record;

a polynomial vector generation process of, when said d is zero, outputting the input ideal J as said Groebner basis J*, when said d is not zero, to make a reference to a monomial list table, which is composed of the record number field, the order field, and the monomial list field, for retrieving a record R of which a value of the order field is said d, to acquire a list $M_1, M_2, \ldots$ of the monomial described in the monomial list field of said record R, to construct a defining polynomial F employing the coefficient list and the monomial order described in said algebraic curve parameter file, to acquire a first polynomial f, a second polynomial g, and a third polynomial h of the input ideal J, to calculate a remainder equation $r_i$ of a product $M_i \cdot g$ of each said monomial $M_i$ and said polynomial g by the polynomials f and F, to generate a vector $w^{(i)}_1$ that is composed of coefficients of the remainder equation $r_i$ according to the monomial order described in said algebraic curve parameter file, furthermore to calculate a remainder equation $s_i$ of a product $M_i \cdot h$ of each said monomial $M_i$ and the polynomial h by the polynomials f and F, to generate a vector $w^{(i)}_2$ that is composed of coefficients of the remainder equation $s_i$ according to the monomial order described in said algebraic curve parameter file, and to connect the above-mentioned two vectors $w^{(i)}_1$ and $w^{(i)}_2$ for generating a vector $v_i$; and a basis construction process of obtaining a plurality of vectors $m_1, m_2, \ldots$ output in said linear-relation derivation process to make a reference to a table for a Groebner basis construction, which is composed of the record number field, the order field, the component number list field, the first vector type field, the second vector type field, and the third vector type field, for retrieving a record $R_2$ of which a value of the order field is said value d, and in which a vector of which the components that correspond to all component numbers described in the component number list field are all zero does not lie in said plurality of said vectors $m_1$, $m_2, \ldots$, to select a vector m that accords with a first vector type of said record $R_2$ from among said plurality of said vectors $m_1, m_2, \ldots$, to generate a polynomial $f_1$ of which a coefficient is a value of the component of the vector m according to the monomial order described in said algebraic curve parameter file, hereinafter, similarly, to generate a polynomial $f_2$ employing the vector that accords with a second vector type, and also a polynomial $f_3$ employing the vector that accords with a third vector type, to obtain a set $\{f_1, f_2, f_3\}$ of the polynomial, and to output it as said Groebner basis J* or J**.

* * * * *